United States Patent
Platzer et al.

(10) Patent No.: US 11,586,348 B2
(45) Date of Patent: Feb. 21, 2023

(54) PORTABLE MULTIFUNCTION DEVICE, METHOD, AND GRAPHICAL USER INTERFACE SUPPORTING USER NAVIGATIONS OF GRAPHICAL OBJECTS ON A TOUCH SCREEN DISPLAY

(71) Applicant: Apple Inc., Cupertino, CA (US)

(72) Inventors: Andrew Emilio Platzer, Santa Clara, CA (US); Charles J. Pisula, San Jose, CA (US); Imran Chaudhri, San Francisco, CA (US); Steven P. Jobs, Palo Alto, CA (US); Gregory Christie, San Jose, CA (US); Scott Forstall, Los Altos, CA (US); Stephen O. Lemay, Palo Alto, CA (US); Michael Matas, Healdsburg, CA (US); Gregory Novick, San Francisco, CA (US); Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/521,768

(22) Filed: Nov. 8, 2021

(65) Prior Publication Data
US 2022/0137765 A1    May 5, 2022

Related U.S. Application Data

(63) Continuation of application No. 16/926,530, filed on Jul. 10, 2020, now Pat. No. 11,169,691, which is a
(Continued)

(51) Int. Cl.
*G06F 3/041* (2006.01)
*G06F 3/0488* (2022.01)
(Continued)

(52) U.S. Cl.
CPC .......... *G06F 3/0488* (2013.01); *G06F 1/1626* (2013.01); *G06F 1/1656* (2013.01);
(Continued)

(58) Field of Classification Search
CPC .... G06F 3/0488; G06F 1/1626; G06F 1/1656; G06F 1/1684; G06F 3/0412;
(Continued)

(56) References Cited

U.S. PATENT DOCUMENTS

| 4,899,136 A | 2/1990 | Beard et al. |
| 5,051,736 A | 9/1991 | Bennett et al. |

(Continued)

FOREIGN PATENT DOCUMENTS

| AU | 2006338183 A1 | 8/2007 |
| AU | 2012202140 A1 | 5/2012 |

(Continued)

OTHER PUBLICATIONS

Advisory Action received for U.S. Appl. No. 12/689,834, dated Aug. 19, 2015, 3 pages.

(Continued)

*Primary Examiner* — Adam R. Giesy
(74) *Attorney, Agent, or Firm* — Dentons US LLP

(57) ABSTRACT

A portable multifunction device displays a first user interface object and a second user interface object on a touch screen display. Upon detecting a finger-down event at the first user interface object and one or more finger-dragging events on the touch screen display, the device moves the first user interface object on the touch screen display along a path determined by the finger-dragging events until the first user interface object at least in part overlaps the second user interface object. Upon detecting a finger-up event at the
(Continued)

second user interface object, the device visually replaces the second user interface object with the first user interface object.

15 Claims, 34 Drawing Sheets

Related U.S. Application Data continuation of application No. 16/378,291, filed on Apr. 8, 2019, now Pat. No. 10,732,821, which is a continuation of application No. 15/153,617, filed on May 12, 2016, now Pat. No. 10,254,949, which is a continuation of application No. 14/011,639, filed on Aug. 27, 2013, now Pat. No. 9,367,232, which is a continuation of application No. 11/969,809, filed on Jan. 4, 2008, now Pat. No. 8,519,964.

(60) Provisional application No. 60/937,990, filed on Jun. 29, 2007, provisional application No. 60/937,993, filed on Jun. 29, 2007, provisional application No. 60/879,469, filed on Jan. 8, 2007, provisional application No. 60/879,253, filed on Jan. 7, 2007.

(51) Int. Cl.
| | |
|---|---|
| *G06F 1/16* | (2006.01) |
| *G06F 3/04883* | (2022.01) |
| *G06F 3/04886* | (2022.01) |
| *H04M 1/72403* | (2021.01) |
| *H04M 1/72436* | (2021.01) |
| *H04M 1/72448* | (2021.01) |
| *H04M 1/72466* | (2021.01) |
| *G06F 3/0486* | (2013.01) |
| *G06F 3/04817* | (2022.01) |
| *G06F 3/0481* | (2022.01) |
| *H04M 1/67* | (2006.01) |
| *H04M 1/72442* | (2021.01) |
| *H04M 1/72469* | (2021.01) |

(52) U.S. Cl.
CPC .......... *G06F 1/1684* (2013.01); *G06F 3/0412* (2013.01); *G06F 3/0481* (2013.01); *G06F 3/0486* (2013.01); *G06F 3/04817* (2013.01); *G06F 3/04883* (2013.01); *G06F 3/04886* (2013.01); *H04M 1/72403* (2021.01); *H04M 1/72436* (2021.01); *H04M 1/72448* (2021.01); *H04M 1/72466* (2021.01); *G06F 2200/1614* (2013.01); *H04M 1/67* (2013.01); *H04M 1/72442* (2021.01); *H04M 1/72469* (2021.01); *H04M 2250/12* (2013.01); *H04M 2250/22* (2013.01)

(58) Field of Classification Search
CPC .. G06F 3/0481; G06F 3/04817; G06F 3/0486; G06F 3/04883; G06F 3/04886; G06F 2200/1614; H04M 1/72403; H04M 1/72436; H04M 1/72448; H04M 1/72466; H04M 1/67; H04M 1/72442; H04M 1/72469; H04M 2250/12; H04M 2250/22
See application file for complete search history.

(56) References Cited

U.S. PATENT DOCUMENTS

| | | |
|---|---|---|
| 5,124,959 A | 6/1992 | Yamazaki et al. |
| 5,146,556 A | 9/1992 | Hullot et al. |
| 5,196,838 A | 3/1993 | Meier et al. |
| 5,237,679 A | 8/1993 | Wang et al. |
| 5,312,478 A | 5/1994 | Reed et al. |
| 5,452,414 A | 9/1995 | Rosendahl et al. |
| 5,491,778 A | 2/1996 | Gordon et al. |
| 5,497,454 A | 3/1996 | Bates et al. |
| 5,515,486 A | 5/1996 | Amro et al. |
| 5,544,295 A | 8/1996 | Capps |
| 5,546,529 A | 8/1996 | Bowers et al. |
| 5,572,238 A | 11/1996 | Krivacic |
| 5,598,524 A | 1/1997 | Johnston et al. |
| 5,610,653 A | 3/1997 | Abecassis |
| 5,612,719 A | 3/1997 | Beernink et al. |
| 5,621,878 A | 4/1997 | Owens et al. |
| 5,625,818 A | 4/1997 | Zarmer et al. |
| 5,642,490 A | 6/1997 | Morgan et al. |
| 5,644,739 A | 7/1997 | Moursund |
| 5,657,049 A | 8/1997 | Ludolph et al. |
| 5,671,381 A | 9/1997 | Strasnick et al. |
| 5,678,015 A | 10/1997 | Goh |
| 5,726,687 A | 3/1998 | Belfiore et al. |
| 5,736,974 A | 4/1998 | Selker |
| 5,745,096 A | 4/1998 | Ludolph et al. |
| 5,745,116 A | 4/1998 | Pisutha-arnond |
| 5,745,718 A | 4/1998 | Cline et al. |
| 5,745,910 A | 4/1998 | Piersol et al. |
| 5,754,179 A | 5/1998 | Hocker et al. |
| 5,754,809 A | 5/1998 | Gandre |
| 5,757,371 A | 5/1998 | Oran et al. |
| 5,760,773 A | 6/1998 | Berman et al. |
| 5,774,119 A | 6/1998 | Alimpich et al. |
| 5,796,401 A | 8/1998 | Winer |
| 5,801,699 A | 9/1998 | Hocker et al. |
| 5,801,704 A | 9/1998 | Oohara et al. |
| 5,812,862 A | 9/1998 | Smith et al. |
| 5,825,349 A | 10/1998 | Meier et al. |
| 5,825,352 A | 10/1998 | Bisset et al. |
| 5,825,357 A | 10/1998 | Malamud et al. |
| 5,835,079 A | 11/1998 | Shieh |
| 5,835,094 A | 11/1998 | Ermel et al. |
| 5,838,326 A | 11/1998 | Card et al. |
| 5,861,885 A | 1/1999 | Strasnick et al. |
| 5,870,683 A | 2/1999 | Wells et al. |
| 5,870,734 A | 2/1999 | Kao |
| 5,877,765 A | 3/1999 | Dickman et al. |
| 5,877,775 A | 3/1999 | Theisen et al. |
| 5,880,733 A | 3/1999 | Horvitz et al. |
| 5,900,876 A | 5/1999 | Yagita et al. |
| 5,914,716 A | 6/1999 | Rubin et al. |
| 5,914,717 A | 6/1999 | Kleewein et al. |
| 5,923,327 A | 7/1999 | Smith et al. |
| 5,923,908 A | 7/1999 | Schrock et al. |
| 5,934,707 A | 8/1999 | Johnson |
| 5,943,679 A | 8/1999 | Niles et al. |
| 5,956,025 A | 9/1999 | Goulden et al. |
| 5,963,204 A | 10/1999 | Ikeda et al. |
| 5,995,106 A | 11/1999 | Naughton et al. |
| 6,005,579 A | 12/1999 | Sugiyama et al. |
| 6,012,072 A | 1/2000 | Lucas et al. |
| 6,025,842 A | 2/2000 | Filetto et al. |
| 6,043,818 A | 3/2000 | Nakano et al. |
| 6,049,336 A | 4/2000 | Liu et al. |
| 6,054,989 A | 4/2000 | Robertson et al. |
| 6,069,626 A | 5/2000 | Cline et al. |
| 6,072,486 A | 6/2000 | Sheldon et al. |
| 6,073,036 A | 6/2000 | Heikkinen et al. |
| 6,088,032 A | 7/2000 | Mackinlay |
| 6,111,573 A | 8/2000 | Mccomb et al. |
| 6,121,969 A | 9/2000 | Jain et al. |
| 6,133,914 A | 10/2000 | Rogers et al. |
| 6,144,863 A | 11/2000 | Charron |
| 6,145,083 A | 11/2000 | Shaffer et al. |
| 6,166,738 A | 12/2000 | Robertson et al. |
| 6,177,936 B1 | 1/2001 | Cragun |
| 6,188,407 B1 | 2/2001 | Smith et al. |
| 6,195,094 B1 | 2/2001 | Celebiler |
| 6,199,082 B1 | 3/2001 | Ferrel et al. |
| 6,211,858 B1 | 4/2001 | Moon et al. |
| 6,222,465 B1 | 4/2001 | Kumar et al. |
| 6,229,542 B1 | 5/2001 | Miller |

(56) References Cited

U.S. PATENT DOCUMENTS

| | | |
|---|---|---|
| 6,243,080 B1 | 6/2001 | Molne |
| 6,253,218 B1 | 6/2001 | Aoki et al. |
| 6,256,008 B1 | 7/2001 | Sparks et al. |
| 6,262,732 B1 | 7/2001 | Coleman et al. |
| 6,262,735 B1 | 7/2001 | Eteläperä |
| 6,271,841 B1 | 8/2001 | Tsujimoto |
| 6,275,935 B1 | 8/2001 | Barlow et al. |
| 6,278,454 B1 | 8/2001 | Krishnan |
| 6,297,795 B1 | 10/2001 | Kato et al. |
| 6,313,853 B1 | 11/2001 | Lamontagne et al. |
| 6,313,855 B1 | 11/2001 | Shuping et al. |
| 6,317,140 B1 | 11/2001 | Livingston |
| 6,323,846 B1 | 11/2001 | Westerman et al. |
| 6,326,970 B1 | 12/2001 | Mott et al. |
| 6,349,410 B1 | 2/2002 | Lortz |
| 6,353,451 B1 | 3/2002 | Teibel et al. |
| 6,359,615 B1 | 3/2002 | Singh |
| 6,377,698 B1 | 4/2002 | Cumoli et al. |
| 6,396,520 B1 | 5/2002 | Ording |
| 6,407,757 B1 | 6/2002 | Ho et al. |
| 6,411,283 B1 | 6/2002 | Murphy |
| 6,433,801 B1 | 8/2002 | Moon et al. |
| 6,466,198 B1 | 10/2002 | Feinstein |
| 6,466,203 B2 | 10/2002 | Van Ee |
| 6,477,117 B1 | 11/2002 | Narayanaswami et al. |
| 6,486,895 B1 | 11/2002 | Robertson et al. |
| 6,489,975 B1 | 12/2002 | Patil et al. |
| 6,496,182 B1 | 12/2002 | Wong et al. |
| 6,496,206 B1 | 12/2002 | Mernyk et al. |
| 6,496,209 B2 | 12/2002 | Horii |
| 6,525,997 B1 | 2/2003 | Narayanaswami et al. |
| 6,545,669 B1 | 4/2003 | Kinawi et al. |
| 6,549,218 B1 | 4/2003 | Gershony et al. |
| 6,570,557 B1 | 5/2003 | Westerman et al. |
| 6,570,583 B1 | 5/2003 | Kung et al. |
| 6,571,245 B2 | 5/2003 | Huang et al. |
| 6,590,568 B1 | 7/2003 | Astala et al. |
| 6,597,378 B1 | 7/2003 | Shiraishi et al. |
| 6,597,391 B2 | 7/2003 | Hudson |
| 6,613,100 B2 | 9/2003 | Miller |
| 6,621,509 B1 | 9/2003 | Eiref et al. |
| 6,621,768 B1 | 9/2003 | Keller et al. |
| 6,628,309 B1 | 9/2003 | Dodson et al. |
| 6,628,310 B1 | 9/2003 | Hiura et al. |
| 6,629,793 B1 | 10/2003 | Miller |
| 6,639,584 B1 | 10/2003 | Li |
| 6,647,534 B1 | 11/2003 | Graham |
| 6,677,932 B1 | 1/2004 | Westerman |
| 6,683,628 B1 | 1/2004 | Nakagawa et al. |
| 6,690,623 B1 | 2/2004 | Maano |
| 6,700,612 B1 | 3/2004 | Anderson et al. |
| 6,710,788 B1 | 3/2004 | Freach et al. |
| 6,714,222 B1 | 3/2004 | Björn et al. |
| 6,727,916 B1 | 4/2004 | Ballard |
| 6,763,388 B1 | 7/2004 | Tsimelzon |
| 6,771,250 B1 | 8/2004 | Oh |
| 6,774,914 B1 | 8/2004 | Benayoun |
| 6,781,575 B1 | 8/2004 | Hawkins et al. |
| 6,798,429 B2 | 9/2004 | Bradski |
| 6,809,724 B1 | 10/2004 | Shiraishi et al. |
| 6,816,175 B1 | 11/2004 | Hamp et al. |
| 6,820,111 B1 | 11/2004 | Rubin et al. |
| 6,822,638 B2 | 11/2004 | Dobies et al. |
| 6,847,387 B2 | 1/2005 | Roth |
| 6,874,128 B1 | 3/2005 | Moore et al. |
| 6,880,132 B2 | 4/2005 | Uemura |
| 6,915,294 B1 | 7/2005 | Singh et al. |
| 6,915,490 B1 | 7/2005 | Ewing |
| 6,928,461 B2 | 8/2005 | Tuli |
| 6,931,601 B2 | 8/2005 | Vronay et al. |
| 6,934,911 B2 | 8/2005 | Salmimaa et al. |
| 6,940,494 B2 | 9/2005 | Hoshino et al. |
| 6,950,949 B1 | 9/2005 | Gilchrist |
| 6,956,564 B1 | 10/2005 | Williams |
| 6,963,349 B1 | 11/2005 | Nagasaki |
| 6,970,749 B1 | 11/2005 | Chinn et al. |
| 6,976,210 B1 | 12/2005 | Silva et al. |
| 6,976,228 B2 | 12/2005 | Bernhardson |
| 6,978,127 B1 | 12/2005 | Bulthuis et al. |
| 6,987,991 B2 | 1/2006 | Nelson |
| 6,990,452 B1 | 1/2006 | Osterman et al. |
| 7,003,495 B1 | 2/2006 | Burger et al. |
| 7,007,239 B1 | 2/2006 | Hawkins et al. |
| 7,010,755 B2 | 3/2006 | Anderson et al. |
| 7,017,118 B1 | 3/2006 | Carroll |
| 7,030,861 B1 | 4/2006 | Westerman et al. |
| 7,043,701 B2 | 5/2006 | Gordon |
| 7,054,965 B2 | 5/2006 | Bell et al. |
| 7,071,943 B2 | 7/2006 | Adler |
| 7,075,512 B1 | 7/2006 | Fabre et al. |
| 7,080,326 B2 | 7/2006 | Molander et al. |
| 7,085,590 B2 | 8/2006 | Kennedy et al. |
| 7,093,201 B2 | 8/2006 | Duarte |
| 7,107,549 B2 | 9/2006 | Deaton et al. |
| 7,117,453 B2 | 10/2006 | Drucker et al. |
| 7,119,819 B1 | 10/2006 | Robertson et al. |
| 7,126,579 B2 | 10/2006 | Ritter |
| 7,133,859 B1 | 11/2006 | Wong |
| 7,134,092 B2 | 11/2006 | Fung et al. |
| 7,134,095 B1 | 11/2006 | Smith et al. |
| 7,142,210 B2 | 11/2006 | Schwuttke et al. |
| 7,146,576 B2 | 12/2006 | Chang et al. |
| 7,149,549 B1 | 12/2006 | Ortiz et al. |
| 7,155,667 B1 | 12/2006 | Kotler et al. |
| 7,166,791 B2 | 1/2007 | Robbin et al. |
| 7,167,731 B2 | 1/2007 | Nelson |
| 7,171,625 B1 | 1/2007 | Sacchi |
| 7,173,604 B2 | 2/2007 | Marvit et al. |
| 7,178,111 B2 | 2/2007 | Glein et al. |
| 7,194,527 B2 | 3/2007 | Drucker et al. |
| 7,194,698 B2 | 3/2007 | Gottfurcht et al. |
| 7,215,323 B2 | 5/2007 | Gombert et al. |
| 7,216,305 B1 | 5/2007 | Jaeger |
| 7,221,933 B2 | 5/2007 | Sauer et al. |
| 7,231,229 B1 | 6/2007 | Hawkins et al. |
| 7,242,406 B2 | 7/2007 | Johnson et al. |
| 7,249,327 B2 | 7/2007 | Nelson et al. |
| 7,278,115 B1 | 10/2007 | Robertson et al. |
| 7,283,845 B2 | 10/2007 | De Bast |
| 7,287,232 B2 | 10/2007 | Tsuchimura et al. |
| 7,292,243 B1 | 11/2007 | Burke |
| 7,310,636 B2 | 12/2007 | Bodin et al. |
| 7,340,678 B2 | 3/2008 | Chiu et al. |
| 7,346,855 B2 | 3/2008 | Hellyar et al. |
| 7,355,593 B2 | 4/2008 | Hill et al. |
| 7,360,166 B1 | 4/2008 | Krzanowski |
| 7,362,331 B2 | 4/2008 | Ording |
| 7,383,497 B2 | 6/2008 | Glenner et al. |
| 7,392,488 B2 | 6/2008 | Card et al. |
| 7,403,211 B2 | 7/2008 | Sheasby et al. |
| 7,403,910 B1 | 7/2008 | Hastings et al. |
| 7,404,151 B2 | 7/2008 | Borchardt et al. |
| 7,406,666 B2 | 7/2008 | Davis et al. |
| 7,412,650 B2 | 8/2008 | Gallo |
| 7,415,677 B2 | 8/2008 | Arend et al. |
| 7,417,680 B2 | 8/2008 | Aoki et al. |
| 7,432,928 B2 | 10/2008 | Shaw et al. |
| 7,433,179 B2 | 10/2008 | Hisano et al. |
| 7,434,177 B1 | 10/2008 | Ording et al. |
| 7,437,005 B2 | 10/2008 | Drucker et al. |
| 7,456,823 B2 | 11/2008 | Poupyrev et al. |
| 7,461,353 B2 | 12/2008 | Rohrabaugh et al. |
| 7,468,742 B2 | 12/2008 | Ahn et al. |
| 7,478,437 B2 | 1/2009 | Hatanaka et al. |
| 7,479,948 B2 | 1/2009 | Kim et al. |
| 7,480,870 B2 | 1/2009 | Anzures et al. |
| 7,480,872 B1 | 1/2009 | Ubillos |
| 7,480,873 B2 | 1/2009 | Kawahara |
| 7,487,467 B1 | 2/2009 | Kawahara et al. |
| 7,490,295 B2 | 2/2009 | Chaudhri et al. |
| 7,493,573 B2 | 2/2009 | Wagner |
| 7,496,595 B2 | 2/2009 | Accapadi |
| 7,506,268 B2 | 3/2009 | Jennings et al. |
| 7,509,321 B2 | 3/2009 | Wong et al. |

(56) References Cited

U.S. PATENT DOCUMENTS

| | | |
|---|---|---|
| 7,509,588 B2 | 3/2009 | Van Os et al. |
| 7,511,710 B2 | 3/2009 | Barrett |
| 7,512,898 B2 | 3/2009 | Jennings et al. |
| 7,523,414 B2 | 4/2009 | Schmidt et al. |
| 7,526,738 B2 | 4/2009 | Ording et al. |
| 7,546,548 B2 | 6/2009 | Chew et al. |
| 7,546,554 B2 | 6/2009 | Chiu et al. |
| 7,552,402 B2 | 6/2009 | Bilow |
| 7,557,804 B1 | 7/2009 | Mcdaniel et al. |
| 7,561,874 B2 | 7/2009 | Wang et al. |
| 7,584,278 B2 | 9/2009 | Rajarajan et al. |
| 7,587,671 B2 | 9/2009 | Saft et al. |
| 7,587,683 B2 | 9/2009 | Ito et al. |
| 7,594,185 B2 | 9/2009 | Anderson et al. |
| 7,603,105 B2 | 10/2009 | Bocking et al. |
| 7,606,819 B2 | 10/2009 | Audet et al. |
| 7,607,150 B1 | 10/2009 | Kobayashi et al. |
| 7,614,008 B2 | 11/2009 | Ording |
| 7,620,894 B1 | 11/2009 | Kahn |
| 7,624,357 B2 | 11/2009 | De Bast |
| 7,633,076 B2 | 12/2009 | Huppi et al. |
| 7,642,934 B2 | 1/2010 | Scott |
| 7,650,137 B2 | 1/2010 | Jobs et al. |
| 7,650,575 B2 | 1/2010 | Cummins et al. |
| 7,653,883 B2 | 1/2010 | Hotelling et al. |
| 7,657,252 B2 | 2/2010 | Futami |
| 7,657,842 B2 | 2/2010 | Matthews et al. |
| 7,657,845 B2 | 2/2010 | Drucker et al. |
| 7,657,849 B2 | 2/2010 | Chaudhri et al. |
| 7,663,607 B2 | 2/2010 | Hotelling et al. |
| 7,663,620 B2 | 2/2010 | Robertson et al. |
| 7,665,033 B2 | 2/2010 | Byrne et al. |
| 7,667,703 B2 | 2/2010 | Hong et al. |
| 7,669,135 B2 | 2/2010 | Cunningham et al. |
| 7,680,817 B2 | 3/2010 | Audet et al. |
| 7,683,883 B2 | 3/2010 | Touma et al. |
| 7,683,889 B2 | 3/2010 | Rimas Ribikauskas et al. |
| 7,694,231 B2 | 4/2010 | Kocienda et al. |
| 7,698,658 B2 | 4/2010 | Ohwa et al. |
| 7,710,423 B2 | 5/2010 | Drucker et al. |
| 7,716,604 B2 | 5/2010 | Kataoka et al. |
| 7,719,523 B2 | 5/2010 | Hillis |
| 7,719,542 B1 | 5/2010 | Gough et al. |
| 7,720,893 B2 | 5/2010 | Boudreau et al. |
| 7,724,242 B2 | 5/2010 | Hillis et al. |
| 7,725,839 B2 | 5/2010 | Michaels |
| 7,728,821 B2 | 6/2010 | Hillis et al. |
| 7,730,401 B2 | 6/2010 | Gillespie et al. |
| 7,730,423 B2 | 6/2010 | Graham |
| 7,735,021 B2 | 6/2010 | Padawer et al. |
| 7,739,271 B2 | 6/2010 | Cook et al. |
| 7,739,604 B1 | 6/2010 | Lyons et al. |
| 7,747,289 B2 | 6/2010 | Wang et al. |
| 7,761,813 B2 | 7/2010 | Kim et al. |
| 7,765,266 B2 | 7/2010 | Kropivny et al. |
| 7,770,125 B1 | 8/2010 | Young et al. |
| 7,783,583 B2 | 8/2010 | Sendhoff et al. |
| 7,783,990 B2 | 8/2010 | Amadio et al. |
| 7,788,583 B1 | 8/2010 | Amzallag et al. |
| 7,797,637 B2 | 9/2010 | Marcjan et al. |
| 7,805,684 B2 | 9/2010 | Arvilommi |
| 7,810,038 B2 | 10/2010 | Matsa et al. |
| 7,831,926 B2 | 11/2010 | Rohrabaugh et al. |
| 7,835,729 B2 | 11/2010 | Hyon |
| 7,840,901 B2 | 11/2010 | Lacey et al. |
| 7,840,907 B2 | 11/2010 | Kikuchi et al. |
| 7,840,912 B2 | 11/2010 | Elias et al. |
| 7,844,889 B2 | 11/2010 | Rohrabaugh et al. |
| 7,844,914 B2 | 11/2010 | Andre et al. |
| 7,853,972 B2 | 12/2010 | Brodersen et al. |
| 7,856,602 B2 | 12/2010 | Armstrong |
| 7,873,916 B1 | 1/2011 | Chaudhri et al. |
| 7,880,726 B2 | 2/2011 | Nakadaira et al. |
| 7,904,832 B2 | 3/2011 | Ubillos |
| 7,907,124 B2 | 3/2011 | Hillis et al. |
| 7,907,476 B2 | 3/2011 | Lee |
| 7,917,846 B2 | 3/2011 | Decker et al. |
| 7,917,869 B2 | 3/2011 | Anderson |
| 7,924,444 B2 | 4/2011 | Takahashi |
| 7,934,152 B2 | 4/2011 | Krishnamurthy et al. |
| 7,940,250 B2 | 5/2011 | Forstall |
| 7,956,869 B1 | 6/2011 | Gilra |
| 7,957,762 B2 | 6/2011 | Herz et al. |
| 7,958,457 B1 | 6/2011 | Brandenberg et al. |
| 7,979,879 B2 | 7/2011 | Uchida et al. |
| 7,986,324 B2 | 7/2011 | Funaki et al. |
| 7,995,078 B2 | 8/2011 | Baar |
| 7,996,789 B2 | 8/2011 | Louch et al. |
| 8,006,002 B2 | 8/2011 | Kalayjian et al. |
| 8,020,110 B2 | 9/2011 | Hurst et al. |
| 8,024,671 B2 | 9/2011 | Lee et al. |
| 8,046,714 B2 | 10/2011 | Yahiro et al. |
| 8,059,101 B2 | 11/2011 | Westerman et al. |
| 8,064,704 B2 | 11/2011 | Kim et al. |
| 8,065,618 B2 | 11/2011 | Kumar et al. |
| 8,069,404 B2 | 11/2011 | Audet |
| 8,072,439 B2 | 12/2011 | Hillis et al. |
| 8,078,966 B2 | 12/2011 | Audet |
| 8,099,441 B2 | 1/2012 | Surasinghe |
| 8,103,963 B2 | 1/2012 | Ikeda et al. |
| 8,111,255 B2 | 2/2012 | Park |
| 8,125,481 B2 | 2/2012 | Gossweiler et al. |
| 8,130,211 B2 | 3/2012 | Abernathy |
| 8,139,043 B2 | 3/2012 | Hillis |
| 8,151,185 B2 | 4/2012 | Audet |
| 8,156,175 B2 | 4/2012 | Hopkins |
| 8,161,419 B2 | 4/2012 | Palahnuk et al. |
| 8,185,842 B2 | 5/2012 | Chang et al. |
| 8,188,985 B2 | 5/2012 | Hillis et al. |
| 8,205,172 B2 | 6/2012 | Wong et al. |
| 8,209,628 B1 | 6/2012 | Davidson et al. |
| 8,214,793 B1 | 7/2012 | Muthuswamy |
| 8,230,358 B1 | 7/2012 | Chaudhri |
| 8,232,990 B2 | 7/2012 | King et al. |
| 8,239,784 B2 | 8/2012 | Hotelling et al. |
| 8,255,808 B2 | 8/2012 | Lindgren et al. |
| 8,259,163 B2 | 9/2012 | Bell |
| 8,266,550 B1 | 9/2012 | Cleron et al. |
| 8,269,729 B2 | 9/2012 | Han et al. |
| 8,269,739 B2 | 9/2012 | Hillis et al. |
| 8,279,180 B2 | 10/2012 | Hotelling et al. |
| 8,306,515 B2 | 11/2012 | Ryu et al. |
| 8,335,784 B2 | 12/2012 | Gutt et al. |
| 8,365,084 B1 | 1/2013 | Lin et al. |
| 8,381,135 B2 | 2/2013 | Hotelling et al. |
| 8,423,911 B2 | 4/2013 | Chaudhri |
| 8,434,027 B2 | 4/2013 | Jones |
| 8,446,371 B2 | 5/2013 | Fyke et al. |
| 8,458,615 B2 | 6/2013 | Chaudhri |
| 8,479,122 B2 | 7/2013 | Hotelling et al. |
| 8,519,964 B2 | 8/2013 | Platzer et al. |
| 8,519,972 B2 | 8/2013 | Forstall |
| 8,525,839 B2 | 9/2013 | Chaudhri et al. |
| 8,558,808 B2 | 10/2013 | Forstall |
| 8,564,544 B2 | 10/2013 | Jobs et al. |
| 8,601,370 B2 | 12/2013 | Chiang et al. |
| 8,619,038 B2 | 12/2013 | Chaudhri et al. |
| 8,626,762 B2 | 1/2014 | Seung et al. |
| 8,672,885 B2 | 3/2014 | Kriesel et al. |
| 8,683,349 B2 | 3/2014 | Roberts et al. |
| 8,713,011 B2 | 4/2014 | Asai et al. |
| 8,713,469 B2 | 4/2014 | Park et al. |
| 8,730,188 B2 | 5/2014 | Pasquera et al. |
| 8,788,954 B2 | 7/2014 | Lemay et al. |
| 8,799,777 B1 | 8/2014 | Lee et al. |
| 8,799,821 B1 | 8/2014 | Sullivan et al. |
| 8,826,170 B1 | 9/2014 | Shah et al. |
| 8,839,128 B2 | 9/2014 | Krishnaraj et al. |
| 8,881,060 B2 | 11/2014 | Chaudhri et al. |
| 8,881,061 B2 | 11/2014 | Chaudhri et al. |
| 8,957,866 B2 | 2/2015 | Law et al. |
| 8,972,898 B2 | 3/2015 | Carter |
| 9,026,508 B2 | 5/2015 | Nagai |
| 9,032,438 B2 | 5/2015 | Ozawa et al. |

(56) References Cited

U.S. PATENT DOCUMENTS

| | | |
|---|---|---|
| 9,053,462 B2 | 6/2015 | Cadiz et al. |
| 9,082,314 B2 | 7/2015 | Tsai |
| 9,152,312 B1 | 10/2015 | Terleski et al. |
| 9,170,708 B2 | 10/2015 | Chaudhri et al. |
| 9,237,855 B2 | 1/2016 | Hong et al. |
| 9,239,673 B2 | 1/2016 | Shaffer et al. |
| 9,256,627 B2 | 2/2016 | Surasinghe |
| 9,259,615 B2 | 2/2016 | Weast et al. |
| 9,367,232 B2 | 6/2016 | Platzer et al. |
| 9,386,432 B2 | 7/2016 | Chu et al. |
| 9,417,787 B2 | 8/2016 | Fong et al. |
| 9,448,691 B2 | 9/2016 | Suda |
| 9,619,143 B2 | 4/2017 | Christie et al. |
| 9,715,277 B2 | 7/2017 | Lee et al. |
| 9,772,749 B2 | 9/2017 | Chaudhri et al. |
| 9,794,397 B2 | 10/2017 | Min et al. |
| 9,933,913 B2 | 4/2018 | Van Os et al. |
| 9,993,913 B2 | 6/2018 | Mccardle et al. |
| 10,025,458 B2 | 7/2018 | Chaudhri et al. |
| 10,250,735 B2 | 4/2019 | Butcher et al. |
| 10,359,907 B2 | 7/2019 | Van Os et al. |
| 10,684,592 B2 | 6/2020 | Chang et al. |
| 10,788,953 B2 | 9/2020 | Chaudhri et al. |
| 10,788,976 B2 | 9/2020 | Chaudhri et al. |
| 10,884,579 B2 | 1/2021 | Van Os et al. |
| 10,915,224 B2 | 2/2021 | Van Os et al. |
| 2001/0024195 A1 | 9/2001 | Hayakawa |
| 2001/0024212 A1 | 9/2001 | Ohnishi |
| 2001/0038394 A1 | 11/2001 | Tsuchimura et al. |
| 2002/0008691 A1 | 1/2002 | Hanajima et al. |
| 2002/0015024 A1 | 2/2002 | Westerman et al. |
| 2002/0015042 A1 | 2/2002 | Robotham et al. |
| 2002/0015064 A1 | 2/2002 | Robotham et al. |
| 2002/0018051 A1 | 2/2002 | Singh |
| 2002/0024540 A1 | 2/2002 | Mccarthy |
| 2002/0038299 A1 | 3/2002 | Zernik et al. |
| 2002/0054090 A1 | 5/2002 | Silva et al. |
| 2002/0057287 A1 | 5/2002 | Crow et al. |
| 2002/0067376 A1 | 6/2002 | Martin et al. |
| 2002/0078037 A1 | 6/2002 | Hatanaka et al. |
| 2002/0085037 A1 | 7/2002 | Leavitt et al. |
| 2002/0091697 A1 | 7/2002 | Huang et al. |
| 2002/0093531 A1 | 7/2002 | Barile |
| 2002/0097261 A1 | 7/2002 | Gottfurcht et al. |
| 2002/0104096 A1 | 8/2002 | Cramer et al. |
| 2002/0109721 A1 | 8/2002 | Konaka et al. |
| 2002/0140698 A1 | 10/2002 | Robertson et al. |
| 2002/0140736 A1 | 10/2002 | Chen et al. |
| 2002/0143949 A1 | 10/2002 | Rajarajan et al. |
| 2002/0149561 A1 | 10/2002 | Fukumoto et al. |
| 2002/0152222 A1 | 10/2002 | Holbrook |
| 2002/0152283 A1 | 10/2002 | Dutta et al. |
| 2002/0167683 A1 | 11/2002 | Hanamoto et al. |
| 2002/0188948 A1 | 12/2002 | Florence |
| 2002/0191029 A1 | 12/2002 | Gillespie et al. |
| 2002/0196238 A1 | 12/2002 | Tsukada et al. |
| 2003/0001898 A1 | 1/2003 | Bernhardson |
| 2003/0007012 A1 | 1/2003 | Bate |
| 2003/0013483 A1 | 1/2003 | Ausems et al. |
| 2003/0014415 A1 | 1/2003 | Weiss et al. |
| 2003/0016241 A1 | 1/2003 | Burke |
| 2003/0025676 A1 | 2/2003 | Cappendijk |
| 2003/0030664 A1 | 2/2003 | Parry |
| 2003/0033331 A1 | 2/2003 | Sena et al. |
| 2003/0048295 A1 | 3/2003 | Lilleness et al. |
| 2003/0063072 A1 | 4/2003 | Brandenberg et al. |
| 2003/0063125 A1 | 4/2003 | Miyajima et al. |
| 2003/0080991 A1 | 5/2003 | Crow et al. |
| 2003/0081135 A1 | 5/2003 | Boll |
| 2003/0085931 A1 | 5/2003 | Card et al. |
| 2003/0090572 A1 | 5/2003 | Belz et al. |
| 2003/0095135 A1 | 5/2003 | Kaasila et al. |
| 2003/0095155 A1 | 5/2003 | Johnson |
| 2003/0098894 A1 | 5/2003 | Sheldon et al. |
| 2003/0117427 A1 | 6/2003 | Haughawout et al. |
| 2003/0117440 A1 | 6/2003 | Hellyar et al. |
| 2003/0122787 A1 | 7/2003 | Zimmerman et al. |
| 2003/0128242 A1 | 7/2003 | Gordon |
| 2003/0132938 A1 | 7/2003 | Shibao |
| 2003/0142136 A1 | 7/2003 | Carter et al. |
| 2003/0156119 A1 | 8/2003 | Bonadio |
| 2003/0156140 A1 | 8/2003 | Watanabe et al. |
| 2003/0156756 A1 | 8/2003 | Gokturk et al. |
| 2003/0160825 A1 | 8/2003 | Weber |
| 2003/0164827 A1 | 9/2003 | Gottesman et al. |
| 2003/0164861 A1 | 9/2003 | Barbanson et al. |
| 2003/0169298 A1 | 9/2003 | Ording |
| 2003/0169302 A1 | 9/2003 | Davidsson et al. |
| 2003/0174170 A1 | 9/2003 | Jung et al. |
| 2003/0174172 A1 | 9/2003 | Conrad et al. |
| 2003/0179240 A1 | 9/2003 | Gest |
| 2003/0184552 A1 | 10/2003 | Chadha |
| 2003/0184587 A1 | 10/2003 | Ording et al. |
| 2003/0189597 A1 | 10/2003 | Anderson et al. |
| 2003/0193524 A1 | 10/2003 | Bates et al. |
| 2003/0195950 A1 | 10/2003 | Huang et al. |
| 2003/0200289 A1 | 10/2003 | Kemp et al. |
| 2003/0206195 A1 | 11/2003 | Matsa et al. |
| 2003/0206197 A1 | 11/2003 | Mcinerney |
| 2003/0210278 A1 | 11/2003 | Kyoya et al. |
| 2003/0210280 A1 | 11/2003 | Baker et al. |
| 2003/0225811 A1 | 12/2003 | Ali et al. |
| 2004/0008224 A1 | 1/2004 | Molander et al. |
| 2004/0021643 A1 | 2/2004 | Hoshino et al. |
| 2004/0027330 A1 | 2/2004 | Brad |
| 2004/0041849 A1 | 3/2004 | Mock et al. |
| 2004/0056809 A1 | 3/2004 | Prassmayer et al. |
| 2004/0056839 A1 | 3/2004 | Yoshihara |
| 2004/0070608 A1 | 4/2004 | Saka |
| 2004/0093582 A1 | 5/2004 | Segura |
| 2004/0103156 A1 | 5/2004 | Quillen et al. |
| 2004/0103371 A1 | 5/2004 | Chen et al. |
| 2004/0109013 A1 | 6/2004 | Goertz |
| 2004/0109025 A1 | 6/2004 | Hullot et al. |
| 2004/0121823 A1 | 6/2004 | Noesgaard et al. |
| 2004/0125088 A1 | 7/2004 | Zimmerman et al. |
| 2004/0138569 A1 | 7/2004 | Grunwald et al. |
| 2004/0141011 A1 | 7/2004 | Smethers et al. |
| 2004/0143598 A1 | 7/2004 | Drucker et al. |
| 2004/0143796 A1 | 7/2004 | Lerner et al. |
| 2004/0155909 A1 | 8/2004 | Wagner |
| 2004/0160462 A1 | 8/2004 | Sheasby et al. |
| 2004/0169674 A1 | 9/2004 | Linjama |
| 2004/0177148 A1 | 9/2004 | Tsimelzon, Jr. |
| 2004/0196267 A1 | 10/2004 | Kawai et al. |
| 2004/0201595 A1 | 10/2004 | Manchester |
| 2004/0205492 A1 | 10/2004 | Newsome |
| 2004/0205496 A1 | 10/2004 | Dutta et al. |
| 2004/0215719 A1 | 10/2004 | Altshuler |
| 2004/0218104 A1 | 11/2004 | Smith et al. |
| 2004/0221006 A1 | 11/2004 | Gopalan et al. |
| 2004/0222975 A1 | 11/2004 | Nakano et al. |
| 2004/0236769 A1 | 11/2004 | Smith et al. |
| 2004/0257375 A1 | 12/2004 | Cowperthwaite |
| 2004/0268400 A1 | 12/2004 | Barde et al. |
| 2005/0005246 A1 | 1/2005 | Card et al. |
| 2005/0005248 A1 | 1/2005 | Rockey et al. |
| 2005/0010955 A1 | 1/2005 | Elia et al. |
| 2005/0012862 A1 | 1/2005 | Lee |
| 2005/0020317 A1 | 1/2005 | Koyama |
| 2005/0024341 A1 | 2/2005 | Gillespie et al. |
| 2005/0026644 A1 | 2/2005 | Lien |
| 2005/0039134 A1 | 2/2005 | Wiggeshoff et al. |
| 2005/0043987 A1 | 2/2005 | Kumar et al. |
| 2005/0044509 A1 | 2/2005 | Hunleth et al. |
| 2005/0052471 A1 | 3/2005 | Nagasaki |
| 2005/0057524 A1 | 3/2005 | Hill et al. |
| 2005/0057530 A1 | 3/2005 | Hinckley et al. |
| 2005/0057548 A1 | 3/2005 | Kim |
| 2005/0060653 A1 | 3/2005 | Fukase et al. |
| 2005/0060664 A1 | 3/2005 | Rogers |
| 2005/0060665 A1 | 3/2005 | Rekimoto |
| 2005/0066286 A1 | 3/2005 | Makela |
| 2005/0071364 A1 | 3/2005 | Xie et al. |

(56) References Cited

U.S. PATENT DOCUMENTS

| | | |
|---|---|---|
| 2005/0071736 A1 | 3/2005 | Schneider et al. |
| 2005/0071778 A1 | 3/2005 | Tokkonen |
| 2005/0078804 A1 | 4/2005 | Yomoda |
| 2005/0079896 A1 | 4/2005 | Kokko et al. |
| 2005/0088423 A1 | 4/2005 | Keely et al. |
| 2005/0091596 A1 | 4/2005 | Anthony et al. |
| 2005/0091609 A1 | 4/2005 | Matthews et al. |
| 2005/0093826 A1 | 5/2005 | Huh |
| 2005/0097089 A1 | 5/2005 | Nielsen et al. |
| 2005/0108657 A1 | 5/2005 | Han |
| 2005/0114788 A1 | 5/2005 | Fabritius |
| 2005/0116026 A1 | 6/2005 | Burger et al. |
| 2005/0120142 A1 | 6/2005 | Hall |
| 2005/0131924 A1 | 6/2005 | Jones |
| 2005/0134578 A1 | 6/2005 | Chambers et al. |
| 2005/0138570 A1 | 6/2005 | Good et al. |
| 2005/0151742 A1 | 7/2005 | Hong et al. |
| 2005/0154798 A1 | 7/2005 | Nurmi |
| 2005/0156873 A1 | 7/2005 | Walter et al. |
| 2005/0166232 A1 | 7/2005 | Lamkin et al. |
| 2005/0169527 A1 | 8/2005 | Longe et al. |
| 2005/0177783 A1 | 8/2005 | Agrawala et al. |
| 2005/0177796 A1 | 8/2005 | Takahashi |
| 2005/0183017 A1 | 8/2005 | Cain |
| 2005/0190059 A1 | 9/2005 | Wehrenberg |
| 2005/0192924 A1 | 9/2005 | Drucker et al. |
| 2005/0204385 A1 | 9/2005 | Sull et al. |
| 2005/0210018 A1 | 9/2005 | Singh et al. |
| 2005/0210369 A1 | 9/2005 | Damm |
| 2005/0210403 A1 | 9/2005 | Satanek |
| 2005/0210410 A1 | 9/2005 | Ohwa et al. |
| 2005/0210412 A1 | 9/2005 | Matthews et al. |
| 2005/0216913 A1 | 9/2005 | Gemmell et al. |
| 2005/0227642 A1 | 10/2005 | Jensen |
| 2005/0229102 A1 | 10/2005 | Watson et al. |
| 2005/0229118 A1 | 10/2005 | Chiu et al. |
| 2005/0246331 A1 | 11/2005 | De Vorchik et al. |
| 2005/0250438 A1 | 11/2005 | Makipaa et al. |
| 2005/0251755 A1 | 11/2005 | Mullins et al. |
| 2005/0253817 A1 | 11/2005 | Rytivaara et al. |
| 2005/0259087 A1 | 11/2005 | Hoshino et al. |
| 2005/0262448 A1 | 11/2005 | Vronay et al. |
| 2005/0267869 A1 | 12/2005 | Horvitz et al. |
| 2005/0270276 A1 | 12/2005 | Sugimoto et al. |
| 2005/0275636 A1 | 12/2005 | Dehlin et al. |
| 2005/0278757 A1 | 12/2005 | Grossman et al. |
| 2005/0283734 A1 | 12/2005 | Santoro et al. |
| 2005/0285880 A1 | 12/2005 | Lai et al. |
| 2005/0289458 A1 | 12/2005 | Kylmanen |
| 2005/0289476 A1 | 12/2005 | Tokkonen |
| 2005/0289482 A1 | 12/2005 | Anthony et al. |
| 2006/0004685 A1 | 1/2006 | Pyhalammi et al. |
| 2006/0005207 A1 | 1/2006 | Louch et al. |
| 2006/0007182 A1 | 1/2006 | Sato et al. |
| 2006/0017692 A1 | 1/2006 | Wehrenberg et al. |
| 2006/0020903 A1 | 1/2006 | Wang et al. |
| 2006/0022955 A1 | 2/2006 | Kennedy |
| 2006/0025110 A1 | 2/2006 | Liu |
| 2006/0026170 A1 | 2/2006 | Kreitler et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031874 A1 | 2/2006 | Ok et al. |
| 2006/0033724 A1 | 2/2006 | Chaudhri et al. |
| 2006/0033751 A1 | 2/2006 | Keely et al. |
| 2006/0033761 A1 | 2/2006 | Suen et al. |
| 2006/0035628 A1 | 2/2006 | Miller et al. |
| 2006/0036568 A1 | 2/2006 | Moore et al. |
| 2006/0036944 A1 | 2/2006 | Wilson |
| 2006/0048069 A1 | 3/2006 | Igeta |
| 2006/0051073 A1 | 3/2006 | Jung et al. |
| 2006/0053386 A1 | 3/2006 | Kuhl et al. |
| 2006/0053387 A1 | 3/2006 | Ording |
| 2006/0053392 A1 | 3/2006 | Salmimaa et al. |
| 2006/0055662 A1 | 3/2006 | Rimas-ribikauskas et al. |
| 2006/0055700 A1 | 3/2006 | Niles et al. |
| 2006/0064647 A1 | 3/2006 | Tapuska et al. |
| 2006/0070007 A1 | 3/2006 | Cummins et al. |
| 2006/0075355 A1 | 4/2006 | Shiono et al. |
| 2006/0075396 A1 | 4/2006 | Surasinghe |
| 2006/0080386 A1 | 4/2006 | Roykkee et al. |
| 2006/0080616 A1 | 4/2006 | Vogel et al. |
| 2006/0080617 A1 | 4/2006 | Anderson et al. |
| 2006/0085743 A1 | 4/2006 | Baudisch et al. |
| 2006/0085763 A1 | 4/2006 | Leavitt et al. |
| 2006/0090022 A1 | 4/2006 | Flynn et al. |
| 2006/0092133 A1 | 5/2006 | Touma et al. |
| 2006/0092770 A1 | 5/2006 | Demas |
| 2006/0097991 A1 | 5/2006 | Hotelling et al. |
| 2006/0101354 A1 | 5/2006 | Hashimoto et al. |
| 2006/0105814 A1 | 5/2006 | Monden et al. |
| 2006/0107231 A1 | 5/2006 | Matthews et al. |
| 2006/0112335 A1 | 5/2006 | Hofmeister et al. |
| 2006/0112347 A1 | 5/2006 | Baudisch |
| 2006/0116578 A1 | 6/2006 | Grunwald et al. |
| 2006/0117197 A1 | 6/2006 | Nurmi |
| 2006/0117372 A1 | 6/2006 | Hopkins |
| 2006/0119619 A1 | 6/2006 | Fagans et al. |
| 2006/0123353 A1 | 6/2006 | Matthews et al. |
| 2006/0123359 A1 | 6/2006 | Schatzberger et al. |
| 2006/0123360 A1 | 6/2006 | Anwar et al. |
| 2006/0125799 A1 | 6/2006 | Hillis et al. |
| 2006/0129586 A1 | 6/2006 | Arrouye et al. |
| 2006/0129647 A1 | 6/2006 | Kaghazian |
| 2006/0143574 A1 | 6/2006 | Ito et al. |
| 2006/0146016 A1 | 7/2006 | Chan et al. |
| 2006/0146038 A1 | 7/2006 | Park et al. |
| 2006/0148526 A1 | 7/2006 | Kamiya et al. |
| 2006/0153531 A1 | 7/2006 | Kanegae et al. |
| 2006/0161863 A1 | 7/2006 | Gallo |
| 2006/0161871 A1 | 7/2006 | Hotelling et al. |
| 2006/0164418 A1 | 7/2006 | Hao et al. |
| 2006/0168510 A1 | 7/2006 | Bryar et al. |
| 2006/0174211 A1 | 8/2006 | Hoellerer et al. |
| 2006/0179415 A1 | 8/2006 | Cadiz et al. |
| 2006/0187212 A1 | 8/2006 | Park et al. |
| 2006/0190833 A1 | 8/2006 | Sangiovanni et al. |
| 2006/0197752 A1 | 9/2006 | Hurst et al. |
| 2006/0197753 A1 | 9/2006 | Hotelling |
| 2006/0209035 A1 | 9/2006 | Jenkins et al. |
| 2006/0210958 A1 | 9/2006 | Rimas-ribikauskas et al. |
| 2006/0212828 A1 | 9/2006 | Yahiro et al. |
| 2006/0212833 A1 | 9/2006 | Gallagher et al. |
| 2006/0224997 A1 | 10/2006 | Wong et al. |
| 2006/0236266 A1 | 10/2006 | Majava |
| 2006/0238625 A1 | 10/2006 | Sasaki et al. |
| 2006/0242145 A1 | 10/2006 | Krishnamurthy et al. |
| 2006/0242596 A1 | 10/2006 | Armstrong |
| 2006/0242604 A1 | 10/2006 | Wong et al. |
| 2006/0242607 A1 | 10/2006 | Hudson |
| 2006/0250578 A1 | 11/2006 | Pohl et al. |
| 2006/0253771 A1 | 11/2006 | Baschy |
| 2006/0262116 A1 | 11/2006 | Moshiri et al. |
| 2006/0265643 A1 | 11/2006 | Saft et al. |
| 2006/0267966 A1 | 11/2006 | Grossman et al. |
| 2006/0268100 A1 | 11/2006 | Karukka et al. |
| 2006/0271864 A1 | 11/2006 | Satterfield et al. |
| 2006/0271867 A1 | 11/2006 | Wang et al. |
| 2006/0271874 A1 | 11/2006 | Raiz et al. |
| 2006/0277460 A1 | 12/2006 | Forstall et al. |
| 2006/0277481 A1 | 12/2006 | Forstall et al. |
| 2006/0277486 A1 | 12/2006 | Skinner |
| 2006/0277588 A1 | 12/2006 | Harrington et al. |
| 2006/0278692 A1 | 12/2006 | Matsumoto et al. |
| 2006/0282786 A1 | 12/2006 | Shaw et al. |
| 2006/0282790 A1 | 12/2006 | Matthews et al. |
| 2006/0284852 A1 | 12/2006 | Hofmeister et al. |
| 2006/0290661 A1 | 12/2006 | Innanen et al. |
| 2007/0004451 A1 | 1/2007 | C. Anderson |
| 2007/0013665 A1 | 1/2007 | Vetelainen et al. |
| 2007/0016958 A1 | 1/2007 | Bodepudi et al. |
| 2007/0022386 A1 | 1/2007 | Boss et al. |
| 2007/0024468 A1 | 2/2007 | Quandel et al. |
| 2007/0024646 A1 | 2/2007 | Saarinen et al. |

(56) References Cited

U.S. PATENT DOCUMENTS

| | | |
|---|---|---|
| 2007/0028269 A1 | 2/2007 | Nezu et al. |
| 2007/0030362 A1 | 2/2007 | Ota et al. |
| 2007/0035513 A1 | 2/2007 | Sherrard et al. |
| 2007/0038612 A1 | 2/2007 | Sull et al. |
| 2007/0044029 A1 | 2/2007 | Fisher et al. |
| 2007/0050432 A1 | 3/2007 | Yoshizawa |
| 2007/0050726 A1 | 3/2007 | Wakai et al. |
| 2007/0055947 A1 | 3/2007 | Ostojic et al. |
| 2007/0061745 A1 | 3/2007 | Anthony et al. |
| 2007/0067272 A1 | 3/2007 | Flynt et al. |
| 2007/0067738 A1 | 3/2007 | Flynt et al. |
| 2007/0070066 A1 | 3/2007 | Bakhash |
| 2007/0083827 A1 | 4/2007 | Scott et al. |
| 2007/0083911 A1 | 4/2007 | Madden et al. |
| 2007/0091068 A1 | 4/2007 | Liberty |
| 2007/0101292 A1 | 5/2007 | Kupka |
| 2007/0101297 A1 | 5/2007 | Forstall et al. |
| 2007/0106950 A1 | 5/2007 | Hutchinson et al. |
| 2007/0106952 A1 | 5/2007 | Matas et al. |
| 2007/0113207 A1 | 5/2007 | Gritton |
| 2007/0121869 A1 | 5/2007 | Gorti et al. |
| 2007/0123205 A1 | 5/2007 | Lee et al. |
| 2007/0124677 A1 | 5/2007 | De Los Reyes et al. |
| 2007/0126696 A1 | 6/2007 | Boillot |
| 2007/0126732 A1 | 6/2007 | Robertson et al. |
| 2007/0132789 A1 | 6/2007 | Ording et al. |
| 2007/0136351 A1 | 6/2007 | Dames et al. |
| 2007/0146325 A1 | 6/2007 | Poston et al. |
| 2007/0150810 A1 | 6/2007 | Katz et al. |
| 2007/0150830 A1 | 6/2007 | Ording et al. |
| 2007/0150834 A1 | 6/2007 | Muller et al. |
| 2007/0150835 A1 | 6/2007 | Muller et al. |
| 2007/0152958 A1 | 7/2007 | Ahn et al. |
| 2007/0152980 A1 | 7/2007 | Kocienda et al. |
| 2007/0152984 A1 | 7/2007 | Ording et al. |
| 2007/0155434 A1 | 7/2007 | Jobs et al. |
| 2007/0156697 A1 | 7/2007 | Tsarkova |
| 2007/0157089 A1 | 7/2007 | Van Os et al. |
| 2007/0157094 A1 | 7/2007 | Lemay et al. |
| 2007/0157097 A1 | 7/2007 | Peters et al. |
| 2007/0157228 A1 | 7/2007 | Bayer et al. |
| 2007/0174785 A1 | 7/2007 | Perttula |
| 2007/0177803 A1 | 8/2007 | Elias et al. |
| 2007/0177804 A1 | 8/2007 | Elias et al. |
| 2007/0180395 A1 | 8/2007 | Yamashita et al. |
| 2007/0188518 A1 | 8/2007 | Vale et al. |
| 2007/0189737 A1 | 8/2007 | Chaudhri et al. |
| 2007/0192741 A1 | 8/2007 | Yoritate et al. |
| 2007/0200713 A1 | 8/2007 | Weber et al. |
| 2007/0204218 A1 | 8/2007 | Weber et al. |
| 2007/0226652 A1 | 9/2007 | Kikuchi et al. |
| 2007/0233695 A1 | 10/2007 | Boudreau et al. |
| 2007/0239760 A1 | 10/2007 | Simon |
| 2007/0240079 A1 | 10/2007 | Flynt et al. |
| 2007/0243862 A1 | 10/2007 | Coskun et al. |
| 2007/0243905 A1 | 10/2007 | Juh et al. |
| 2007/0245250 A1 | 10/2007 | Schechter et al. |
| 2007/0247425 A1 | 10/2007 | Liberty et al. |
| 2007/0250768 A1 | 10/2007 | Funakami et al. |
| 2007/0250793 A1 | 10/2007 | Miura et al. |
| 2007/0250794 A1 | 10/2007 | Miura et al. |
| 2007/0254722 A1 | 11/2007 | Kim et al. |
| 2007/0260999 A1 | 11/2007 | Amadio et al. |
| 2007/0263176 A1 | 11/2007 | Nozaki et al. |
| 2007/0266011 A1 | 11/2007 | Rohrs et al. |
| 2007/0266342 A1 | 11/2007 | Chang et al. |
| 2007/0271532 A1 | 11/2007 | Nguyen et al. |
| 2007/0288860 A1 | 12/2007 | Ording et al. |
| 2007/0288862 A1 | 12/2007 | Ording |
| 2007/0288868 A1 | 12/2007 | Rhee et al. |
| 2007/0294231 A1 | 12/2007 | Kaihotsu |
| 2007/0300160 A1 | 12/2007 | Ferrel et al. |
| 2008/0001924 A1 | 1/2008 | De Los Reyes et al. |
| 2008/0005702 A1 | 1/2008 | Skourup et al. |
| 2008/0005703 A1 | 1/2008 | Radivojevic et al. |
| 2008/0006762 A1 | 1/2008 | Fadell et al. |
| 2008/0016468 A1 | 1/2008 | Chambers et al. |
| 2008/0016471 A1 | 1/2008 | Park |
| 2008/0024454 A1 | 1/2008 | Everest et al. |
| 2008/0034013 A1 | 2/2008 | Cisler et al. |
| 2008/0034309 A1 | 2/2008 | Louch et al. |
| 2008/0034317 A1 | 2/2008 | Fard et al. |
| 2008/0040668 A1 | 2/2008 | Ala-rantala |
| 2008/0042984 A1 | 2/2008 | Lim et al. |
| 2008/0059906 A1 | 3/2008 | Toki |
| 2008/0059915 A1 | 3/2008 | Boillot |
| 2008/0062126 A1 | 3/2008 | Algreatly |
| 2008/0062137 A1 | 3/2008 | Brodersen et al. |
| 2008/0062141 A1 | 3/2008 | Chaudhri |
| 2008/0062257 A1 | 3/2008 | Corson |
| 2008/0067626 A1 | 3/2008 | Hirler et al. |
| 2008/0082930 A1 | 4/2008 | Omernick et al. |
| 2008/0089587 A1 | 4/2008 | Kim et al. |
| 2008/0091763 A1 | 4/2008 | Devonshire et al. |
| 2008/0094369 A1 | 4/2008 | Ganatra et al. |
| 2008/0104515 A1 | 5/2008 | Dumitru et al. |
| 2008/0109408 A1 | 5/2008 | Choi et al. |
| 2008/0117461 A1 | 5/2008 | Mitsutake et al. |
| 2008/0120568 A1 | 5/2008 | Jian et al. |
| 2008/0122796 A1 | 5/2008 | Jobs et al. |
| 2008/0125180 A1 | 5/2008 | Hoffman et al. |
| 2008/0126971 A1 | 5/2008 | Kojima |
| 2008/0130421 A1 | 6/2008 | Akaiwa et al. |
| 2008/0132252 A1 | 6/2008 | Altman et al. |
| 2008/0134088 A1 | 6/2008 | Tse et al. |
| 2008/0136785 A1 | 6/2008 | Baudisch et al. |
| 2008/0139176 A1 | 6/2008 | Kim |
| 2008/0151700 A1 | 6/2008 | Inoue et al. |
| 2008/0155453 A1 | 6/2008 | Othmer et al. |
| 2008/0155617 A1 | 6/2008 | Angiolillo et al. |
| 2008/0158145 A1 | 7/2008 | Westerman |
| 2008/0158172 A1 | 7/2008 | Hotelling et al. |
| 2008/0161045 A1 | 7/2008 | Vuorenmaa |
| 2008/0164468 A1 | 7/2008 | Chen et al. |
| 2008/0165140 A1 | 7/2008 | Christie et al. |
| 2008/0168075 A1 | 7/2008 | Kamiyabu |
| 2008/0168365 A1 | 7/2008 | Chaudhri |
| 2008/0168367 A1 | 7/2008 | Chaudhri et al. |
| 2008/0168368 A1 | 7/2008 | Louch et al. |
| 2008/0168382 A1 | 7/2008 | Louch et al. |
| 2008/0168401 A1 | 7/2008 | Boule et al. |
| 2008/0168478 A1 | 7/2008 | Platzer et al. |
| 2008/0171555 A1 | 7/2008 | Oh et al. |
| 2008/0174562 A1 | 7/2008 | Kim |
| 2008/0180406 A1 | 7/2008 | Han et al. |
| 2008/0182598 A1 | 7/2008 | Bowman |
| 2008/0182628 A1 | 7/2008 | Lee et al. |
| 2008/0184052 A1 | 7/2008 | Itoh et al. |
| 2008/0184112 A1 | 7/2008 | Chiang et al. |
| 2008/0189108 A1 | 8/2008 | Atar |
| 2008/0201452 A1 | 8/2008 | Athas et al. |
| 2008/0204424 A1 | 8/2008 | Jin et al. |
| 2008/0216017 A1 | 9/2008 | Kurtenbach et al. |
| 2008/0222545 A1 | 9/2008 | Lemay et al. |
| 2008/0225007 A1 | 9/2008 | Nakadaira et al. |
| 2008/0229254 A1 | 9/2008 | Warner |
| 2008/0231610 A1 | 9/2008 | Hotelling et al. |
| 2008/0244119 A1 | 10/2008 | Tokuhara et al. |
| 2008/0259045 A1 | 10/2008 | Kim et al. |
| 2008/0259057 A1 | 10/2008 | Brons |
| 2008/0266407 A1 | 10/2008 | Battles et al. |
| 2008/0268882 A1 | 10/2008 | Moloney |
| 2008/0268948 A1 | 10/2008 | Boesen |
| 2008/0276201 A1 | 11/2008 | Risch et al. |
| 2008/0282202 A1 | 11/2008 | Sunday |
| 2008/0294981 A1 | 11/2008 | Balzano et al. |
| 2008/0300055 A1 | 12/2008 | Lutnick et al. |
| 2008/0300572 A1 | 12/2008 | Rankers et al. |
| 2008/0307361 A1 | 12/2008 | Louch et al. |
| 2008/0307362 A1 | 12/2008 | Chaudhri et al. |
| 2008/0309632 A1 | 12/2008 | Westerman et al. |
| 2008/0310602 A1 | 12/2008 | Bhupati |
| 2008/0313110 A1 | 12/2008 | Kreamer et al. |
| 2008/0313596 A1 | 12/2008 | Kreamer et al. |

(56) References Cited

U.S. PATENT DOCUMENTS

| | | |
|---|---|---|
| 2009/0002324 A1 | 1/2009 | Harbeson et al. |
| 2009/0002335 A1 | 1/2009 | Chaudhri |
| 2009/0006991 A1 | 1/2009 | Lindberg et al. |
| 2009/0007017 A1 | 1/2009 | Res et al. |
| 2009/0019385 A1 | 1/2009 | Khatib et al. |
| 2009/0021488 A1 | 1/2009 | Kali et al. |
| 2009/0023433 A1 | 1/2009 | Walley et al. |
| 2009/0024946 A1 | 1/2009 | Gotz et al. |
| 2009/0034805 A1 | 2/2009 | Perlmutter et al. |
| 2009/0058821 A1 | 3/2009 | Chaudhri et al. |
| 2009/0063971 A1 | 3/2009 | White et al. |
| 2009/0064055 A1 | 3/2009 | Chaudhri et al. |
| 2009/0070708 A1 | 3/2009 | Finkelstein |
| 2009/0077501 A1 | 3/2009 | Partridge et al. |
| 2009/0103780 A1 | 4/2009 | Nishihara et al. |
| 2009/0122018 A1 | 5/2009 | Vymenets et al. |
| 2009/0125842 A1 | 5/2009 | Nakayama et al. |
| 2009/0128581 A1 | 5/2009 | Brid et al. |
| 2009/0132965 A1 | 5/2009 | Shimizu |
| 2009/0138194 A1 | 5/2009 | Geelen |
| 2009/0138827 A1 | 5/2009 | Van Os et al. |
| 2009/0144653 A1 | 6/2009 | Ubillos |
| 2009/0150775 A1 | 6/2009 | Miyazaki et al. |
| 2009/0158200 A1 | 6/2009 | Palahnuk et al. |
| 2009/0163193 A1 | 6/2009 | Fyke et al. |
| 2009/0164936 A1 | 6/2009 | Kawaguchi |
| 2009/0178008 A1 | 7/2009 | Herz et al. |
| 2009/0183080 A1 | 7/2009 | Thakkar et al. |
| 2009/0183125 A1 | 7/2009 | Magal et al. |
| 2009/0184936 A1 | 7/2009 | Algreatly |
| 2009/0189911 A1 | 7/2009 | Ono et al. |
| 2009/0199128 A1 | 8/2009 | Matthews et al. |
| 2009/0204920 A1 | 8/2009 | Beverley et al. |
| 2009/0204928 A1 | 8/2009 | Kallio et al. |
| 2009/0217187 A1 | 8/2009 | Kendall et al. |
| 2009/0217206 A1 | 8/2009 | Liu et al. |
| 2009/0217209 A1 | 8/2009 | Chen et al. |
| 2009/0222420 A1 | 9/2009 | Hirata |
| 2009/0222765 A1 | 9/2009 | Ekstrand |
| 2009/0228825 A1 | 9/2009 | Van Os et al. |
| 2009/0237371 A1 | 9/2009 | Kim et al. |
| 2009/0237372 A1 | 9/2009 | Kim et al. |
| 2009/0249252 A1 | 10/2009 | Lundy et al. |
| 2009/0254799 A1 | 10/2009 | Unger |
| 2009/0254869 A1 | 10/2009 | Ludwig et al. |
| 2009/0265669 A1 | 10/2009 | Kida et al. |
| 2009/0271723 A1 | 10/2009 | Matsushima et al. |
| 2009/0278812 A1 | 11/2009 | Yasutake et al. |
| 2009/0282369 A1 | 11/2009 | Jones |
| 2009/0288032 A1 | 11/2009 | Chang et al. |
| 2009/0295753 A1 | 12/2009 | King et al. |
| 2009/0303231 A1 | 12/2009 | Robinet et al. |
| 2009/0313567 A1 | 12/2009 | Kwon et al. |
| 2009/0313584 A1 | 12/2009 | Kerr et al. |
| 2009/0313585 A1 | 12/2009 | Hellinger et al. |
| 2009/0315848 A1 | 12/2009 | Ku et al. |
| 2009/0319928 A1 | 12/2009 | Alphin et al. |
| 2009/0319935 A1 | 12/2009 | Figura |
| 2009/0322676 A1 | 12/2009 | Kerr et al. |
| 2009/0327969 A1 | 12/2009 | Estrada |
| 2010/0011304 A1 | 1/2010 | Van |
| 2010/0013780 A1 | 1/2010 | Ikeda et al. |
| 2010/0031203 A1 | 2/2010 | Morris et al. |
| 2010/0050133 A1 | 2/2010 | Nishihara et al. |
| 2010/0053151 A1 | 3/2010 | Marti et al. |
| 2010/0058182 A1 | 3/2010 | Jung |
| 2010/0063813 A1 | 3/2010 | Richter et al. |
| 2010/0082661 A1 | 4/2010 | Beaudreau et al. |
| 2010/0083165 A1 | 4/2010 | Andrews et al. |
| 2010/0095206 A1 | 4/2010 | Kim |
| 2010/0095238 A1 | 4/2010 | Baudet |
| 2010/0095248 A1 | 4/2010 | Karstens et al. |
| 2010/0100841 A1 | 4/2010 | Shin et al. |
| 2010/0105454 A1 | 4/2010 | Weber et al. |
| 2010/0107101 A1 | 4/2010 | Shaw et al. |
| 2010/0110025 A1 | 5/2010 | Lim et al. |
| 2010/0115428 A1 | 5/2010 | Shuping et al. |
| 2010/0122195 A1 | 5/2010 | Hwang |
| 2010/0124152 A1 | 5/2010 | Lee |
| 2010/0153844 A1 | 6/2010 | Hwang et al. |
| 2010/0153878 A1 | 6/2010 | Lindgren et al. |
| 2010/0157742 A1 | 6/2010 | Relyea et al. |
| 2010/0159909 A1 | 6/2010 | Stifelman |
| 2010/0162170 A1 | 6/2010 | Johns et al. |
| 2010/0169357 A1 | 7/2010 | Ingrassia et al. |
| 2010/0179991 A1 | 7/2010 | Lorch et al. |
| 2010/0199227 A1 | 8/2010 | Xiao et al. |
| 2010/0211872 A1 | 8/2010 | Rolston et al. |
| 2010/0223563 A1 | 9/2010 | Green |
| 2010/0223574 A1 | 9/2010 | Wang et al. |
| 2010/0229129 A1 | 9/2010 | Price et al. |
| 2010/0229130 A1 | 9/2010 | Edge et al. |
| 2010/0241955 A1 | 9/2010 | Price et al. |
| 2010/0241967 A1 | 9/2010 | Lee et al. |
| 2010/0241999 A1 | 9/2010 | Russ et al. |
| 2010/0248788 A1 | 9/2010 | Yook et al. |
| 2010/0251085 A1 | 9/2010 | Zearing et al. |
| 2010/0257468 A1 | 10/2010 | Bernardo et al. |
| 2010/0281408 A1 | 11/2010 | Fujioka et al. |
| 2010/0283743 A1 | 11/2010 | Coddington |
| 2010/0315413 A1 | 12/2010 | Izadi et al. |
| 2010/0318709 A1 | 12/2010 | Bell et al. |
| 2010/0325529 A1 | 12/2010 | Sun |
| 2010/0332497 A1 | 12/2010 | Valliani et al. |
| 2010/0333017 A1 | 12/2010 | Ortiz |
| 2011/0004835 A1 | 1/2011 | Yanchar et al. |
| 2011/0007000 A1 | 1/2011 | Lim et al. |
| 2011/0007009 A1 | 1/2011 | Ishihara et al. |
| 2011/0012921 A1 | 1/2011 | Cholewin et al. |
| 2011/0029934 A1 | 2/2011 | Locker et al. |
| 2011/0041098 A1 | 2/2011 | Kajiya et al. |
| 2011/0055722 A1 | 3/2011 | Ludwig et al. |
| 2011/0059733 A1 | 3/2011 | Kim et al. |
| 2011/0061010 A1 | 3/2011 | Wasko et al. |
| 2011/0078597 A1 | 3/2011 | Rapp et al. |
| 2011/0083104 A1 | 4/2011 | Minton |
| 2011/0093821 A1 | 4/2011 | Wigdor et al. |
| 2011/0119610 A1 | 5/2011 | Hackborn et al. |
| 2011/0119629 A1 | 5/2011 | Huotari et al. |
| 2011/0124376 A1 | 5/2011 | Kim et al. |
| 2011/0131534 A1 | 6/2011 | Subramanian et al. |
| 2011/0145758 A1 | 6/2011 | Rosales et al. |
| 2011/0148786 A1 | 6/2011 | Day et al. |
| 2011/0148798 A1 | 6/2011 | Dahl |
| 2011/0167058 A1 | 7/2011 | Van Os |
| 2011/0167365 A1 | 7/2011 | Wingrove et al. |
| 2011/0173556 A1 | 7/2011 | Czerwinski et al. |
| 2011/0179368 A1 | 7/2011 | King et al. |
| 2011/0225549 A1 | 9/2011 | Kim |
| 2011/0246918 A1 | 10/2011 | Henderson |
| 2011/0252346 A1 | 10/2011 | Chaudhri |
| 2011/0252349 A1 | 10/2011 | Chaudhri |
| 2011/0252372 A1 | 10/2011 | Chaudhri |
| 2011/0252373 A1 | 10/2011 | Chaudhri |
| 2011/0283334 A1 | 11/2011 | Choi et al. |
| 2011/0285659 A1 | 11/2011 | Kuwabara et al. |
| 2011/0298723 A1 | 12/2011 | Fleizach et al. |
| 2011/0302513 A1 | 12/2011 | Ademar et al. |
| 2011/0310005 A1 | 12/2011 | Chen et al. |
| 2011/0310058 A1 | 12/2011 | Yamada et al. |
| 2011/0314098 A1 | 12/2011 | Farrell et al. |
| 2012/0023471 A1 | 1/2012 | Fischer et al. |
| 2012/0030623 A1 | 2/2012 | Hoellwarth |
| 2012/0066630 A1 | 3/2012 | Kim et al. |
| 2012/0084692 A1 | 4/2012 | Bae |
| 2012/0084694 A1 | 4/2012 | Sirpal et al. |
| 2012/0110031 A1 | 5/2012 | Lahcanski et al. |
| 2012/0151331 A1 | 6/2012 | Pallakoff et al. |
| 2012/0169617 A1 | 7/2012 | Mäenpää |
| 2012/0216146 A1 | 8/2012 | Korkonen |
| 2012/0304092 A1 | 11/2012 | Jarrett et al. |
| 2012/0324390 A1 | 12/2012 | Tao et al. |
| 2013/0019175 A1 | 1/2013 | Kotler et al. |
| 2013/0067411 A1 | 3/2013 | Kataoka et al. |

(56) References Cited

U.S. PATENT DOCUMENTS

| | | |
|---|---|---|
| 2013/0111400 A1 | 5/2013 | Miwa |
| 2013/0194066 A1 | 8/2013 | Rahman et al. |
| 2013/0205244 A1 | 8/2013 | Decker et al. |
| 2013/0234924 A1 | 9/2013 | Janefalkar et al. |
| 2013/0321340 A1 | 12/2013 | Seo et al. |
| 2013/0332886 A1 | 12/2013 | Cranfill et al. |
| 2014/0015786 A1 | 1/2014 | Honda |
| 2014/0068483 A1 | 3/2014 | Platzer et al. |
| 2014/0108978 A1 | 4/2014 | Yu et al. |
| 2014/0109024 A1 | 4/2014 | Miyazaki |
| 2014/0135631 A1 | 5/2014 | Brumback et al. |
| 2014/0139637 A1 | 5/2014 | Mistry et al. |
| 2014/0143784 A1 | 5/2014 | Mistry et al. |
| 2014/0165006 A1 | 6/2014 | Chaudhri et al. |
| 2014/0195972 A1 | 7/2014 | Lee et al. |
| 2014/0200742 A1 | 7/2014 | Mauti |
| 2014/0215457 A1 | 7/2014 | Gava et al. |
| 2014/0237360 A1 | 8/2014 | Chaudhri et al. |
| 2014/0276244 A1 | 9/2014 | Kamyar |
| 2014/0293755 A1 | 10/2014 | Geiser et al. |
| 2014/0317555 A1 | 10/2014 | Choi et al. |
| 2014/0328151 A1 | 11/2014 | Serber |
| 2014/0365126 A1 | 12/2014 | Vulcano et al. |
| 2015/0012853 A1 | 1/2015 | Chaudhri et al. |
| 2015/0015500 A1 | 1/2015 | Lee et al. |
| 2015/0089407 A1 | 3/2015 | Suzuki |
| 2015/0105125 A1 | 4/2015 | Min et al. |
| 2015/0112752 A1 | 4/2015 | Wagner et al. |
| 2015/0117162 A1 | 4/2015 | Tsai et al. |
| 2015/0160812 A1 | 6/2015 | Yuan et al. |
| 2015/0172438 A1 | 6/2015 | Yang |
| 2015/0242092 A1 | 8/2015 | Van et al. |
| 2015/0242989 A1 | 8/2015 | Lee et al. |
| 2015/0281945 A1 | 10/2015 | Seo et al. |
| 2015/0301506 A1 | 10/2015 | Koumaiha |
| 2015/0366518 A1 | 12/2015 | Sampson |
| 2015/0379476 A1 | 12/2015 | Chaudhri et al. |
| 2016/0034148 A1 | 2/2016 | Wilson et al. |
| 2016/0034167 A1 | 2/2016 | Wilson et al. |
| 2016/0048296 A1 | 2/2016 | Gan et al. |
| 2016/0054710 A1 | 2/2016 | Jo et al. |
| 2016/0058337 A1 | 3/2016 | Blahnik et al. |
| 2016/0062572 A1 | 3/2016 | Yang et al. |
| 2016/0077495 A1 | 3/2016 | Brown et al. |
| 2016/0117141 A1 | 4/2016 | Ro et al. |
| 2016/0124626 A1 | 5/2016 | Lee et al. |
| 2016/0179310 A1 | 6/2016 | Chaudhri |
| 2016/0182805 A1 | 6/2016 | Emmett et al. |
| 2016/0224211 A1 | 8/2016 | Xu et al. |
| 2016/0253065 A1 | 9/2016 | Platzer et al. |
| 2016/0269540 A1 | 9/2016 | Butcher et al. |
| 2016/0313913 A1 | 10/2016 | Leem et al. |
| 2017/0039535 A1 | 2/2017 | Park et al. |
| 2017/0075305 A1 | 3/2017 | Ryu et al. |
| 2017/0147198 A1 | 5/2017 | Herz et al. |
| 2017/0223176 A1 | 8/2017 | Res et al. |
| 2017/0255169 A1 | 9/2017 | Lee et al. |
| 2017/0357426 A1 | 12/2017 | Wilson et al. |
| 2017/0357427 A1 | 12/2017 | Wilson et al. |
| 2017/0357433 A1 | 12/2017 | Boule et al. |
| 2017/0374205 A1 | 12/2017 | Panda |
| 2018/0307388 A1 | 10/2018 | Chaudhri et al. |
| 2019/0171349 A1 | 6/2019 | Van Os et al. |
| 2019/0173996 A1 | 6/2019 | Butcher et al. |
| 2019/0179514 A1 | 6/2019 | Van Os et al. |
| 2019/0235724 A1 | 8/2019 | Platzer et al. |
| 2019/0320057 A1 | 10/2019 | Omernick et al. |
| 2019/0369842 A1 | 12/2019 | Dolbakian et al. |
| 2020/0000035 A1 | 1/2020 | Calmer |
| 2020/0142554 A1 | 5/2020 | Lin et al. |
| 2020/0192683 A1 | 6/2020 | Lin et al. |
| 2020/0225843 A1 | 7/2020 | Herz et al. |
| 2020/0333945 A1 | 10/2020 | Wilson et al. |
| 2020/0348814 A1 | 11/2020 | Platzer et al. |
| 2020/0348822 A1 | 11/2020 | Oascola et al. |
| 2020/0356242 A1 | 11/2020 | Wilson et al. |
| 2020/0379615 A1 | 12/2020 | Chaudhri et al. |
| 2021/0109647 A1 | 4/2021 | Van Os et al. |
| 2021/0112152 A1 | 4/2021 | Omernick et al. |
| 2021/0132758 A1 | 5/2021 | Xu |
| 2021/0141506 A1 | 5/2021 | Chaudhri et al. |
| 2021/0195013 A1 | 6/2021 | Butcher et al. |
| 2021/0271374 A1 | 9/2021 | Chaudhri et al. |
| 2021/0311438 A1 | 10/2021 | Wilson et al. |

FOREIGN PATENT DOCUMENTS

| | | |
|---|---|---|
| AU | 2015100115 A4 | 3/2015 |
| CA | 2349649 A1 | 1/2002 |
| CA | 2800123 C | 7/2016 |
| CH | 700242 A2 | 7/2010 |
| CN | 1257247 A | 6/2000 |
| CN | 1392977 A | 1/2003 |
| CN | 1464719 A | 12/2003 |
| CN | 1695105 A | 11/2005 |
| CN | 1773875 A | 5/2006 |
| CN | 1786906 A | 6/2006 |
| CN | 1818843 A | 8/2006 |
| CN | 1940833 A | 4/2007 |
| CN | 1998150 A | 7/2007 |
| CN | 101072410 A | 11/2007 |
| CN | 101308443 A | 11/2008 |
| CN | 102081502 A | 6/2011 |
| CN | 102244676 A | 11/2011 |
| CN | 102446059 A | 5/2012 |
| CN | 102801649 A | 11/2012 |
| CN | 103210366 A | 7/2013 |
| CN | 103649897 A | 3/2014 |
| CN | 104281405 A | 1/2015 |
| CN | 104580576 A | 4/2015 |
| CN | 105335087 A | 2/2016 |
| EP | 0163032 A2 | 12/1985 |
| EP | 0322332 A2 | 6/1989 |
| EP | 0404373 A1 | 12/1990 |
| EP | 0476972 A2 | 3/1992 |
| EP | 0626635 A2 | 11/1994 |
| EP | 0651544 A2 | 5/1995 |
| EP | 0689134 A1 | 12/1995 |
| EP | 0701220 A1 | 3/1996 |
| EP | 0844553 A1 | 5/1998 |
| EP | 0880090 A2 | 11/1998 |
| EP | 1003098 A2 | 5/2000 |
| EP | 1049305 A1 | 11/2000 |
| EP | 1143334 A2 | 10/2001 |
| EP | 1186997 A2 | 3/2002 |
| EP | 1231763 A1 | 8/2002 |
| EP | 1517228 A2 | 3/2005 |
| EP | 1632874 A2 | 3/2006 |
| EP | 1674976 A2 | 6/2006 |
| EP | 1724996 A2 | 11/2006 |
| EP | 1744242 A2 | 1/2007 |
| EP | 1752880 A1 | 2/2007 |
| EP | 2150031 A1 | 2/2010 |
| EP | 1964022 B1 | 3/2010 |
| EP | 2911377 A1 | 8/2015 |
| EP | 2993602 A1 | 3/2016 |
| FR | 2819675 A1 | 7/2002 |
| GB | 2301217 A | 11/1996 |
| GB | 2329813 A | 3/1999 |
| GB | 2407900 A | 5/2005 |
| JP | 5-225302 A | 9/1993 |
| JP | 6-51930 A | 2/1994 |
| JP | 6-208446 A | 7/1994 |
| JP | 7-225829 A | 8/1995 |
| JP | 8-221203 A | 8/1996 |
| JP | 9-73381 A | 3/1997 |
| JP | 9-97162 A | 4/1997 |
| JP | 9-101874 A | 4/1997 |
| JP | 9-138745 A | 5/1997 |
| JP | 9-258971 A | 10/1997 |
| JP | 9-292262 A | 11/1997 |
| JP | 9-297750 A | 11/1997 |
| JP | 10-40067 A | 2/1998 |
| JP | 10-96648 A | 4/1998 |

(56) References Cited

FOREIGN PATENT DOCUMENTS

| | | |
|---|---|---|
| JP | 10-214350 A | 8/1998 |
| JP | 11-143604 A | 5/1999 |
| JP | 11-508116 A | 7/1999 |
| JP | 11-242539 A | 9/1999 |
| JP | 11-327433 A | 11/1999 |
| JP | 2000-10702 A | 1/2000 |
| JP | 2000-20213 A | 1/2000 |
| JP | 2000-105772 A | 4/2000 |
| JP | 2000-163031 A | 6/2000 |
| JP | 2000-163193 A | 6/2000 |
| JP | 2000-163444 A | 6/2000 |
| JP | 2000-181436 A | 6/2000 |
| JP | 2000-242390 A | 9/2000 |
| JP | 2001-92430 A | 4/2001 |
| JP | 2001-92586 A | 4/2001 |
| JP | 2001-142604 A | 5/2001 |
| JP | 2001-175386 A | 6/2001 |
| JP | 2001-265481 A | 9/2001 |
| JP | 2001-312347 A | 11/2001 |
| JP | 2001-318751 A | 11/2001 |
| JP | 2002-41197 A | 2/2002 |
| JP | 2002-41206 A | 2/2002 |
| JP | 2002-62966 A | 2/2002 |
| JP | 2002-99370 A | 4/2002 |
| JP | 2002-132412 A | 5/2002 |
| JP | 2002-149312 A | 5/2002 |
| JP | 2002-149616 A | 5/2002 |
| JP | 2002-189567 A | 7/2002 |
| JP | 2002-244635 A | 8/2002 |
| JP | 2002-525705 A | 8/2002 |
| JP | 2002-297514 A | 10/2002 |
| JP | 2002-312105 A | 10/2002 |
| JP | 2002-323850 A | 11/2002 |
| JP | 2003-66941 A | 3/2003 |
| JP | 2003-139546 A | 5/2003 |
| JP | 2003-162356 A | 6/2003 |
| JP | 2003-198705 A | 7/2003 |
| JP | 2003-248538 A | 9/2003 |
| JP | 2003-256142 A | 9/2003 |
| JP | 2003-271310 A | 9/2003 |
| JP | 2003-295994 A | 10/2003 |
| JP | 2003-536125 A | 12/2003 |
| JP | 2004-38260 A | 2/2004 |
| JP | 2004-38310 A | 2/2004 |
| JP | 2004-62645 A | 2/2004 |
| JP | 2004-70492 A | 3/2004 |
| JP | 2004-118478 A | 4/2004 |
| JP | 2004-132741 A | 4/2004 |
| JP | 2004-152075 A | 5/2004 |
| JP | 2004-164242 A | 6/2004 |
| JP | 2004-206230 A | 7/2004 |
| JP | 2004-208217 A | 7/2004 |
| JP | 2004-227393 A | 8/2004 |
| JP | 2004-288208 A | 10/2004 |
| JP | 2004-318505 A | 11/2004 |
| JP | 2004-341886 A | 12/2004 |
| JP | 2004-341892 A | 12/2004 |
| JP | 2004-343662 A | 12/2004 |
| JP | 2005-4396 A | 1/2005 |
| JP | 2005-4419 A | 1/2005 |
| JP | 2005-18229 A | 1/2005 |
| JP | 2005-115896 A | 4/2005 |
| JP | 2005-515530 A | 5/2005 |
| JP | 2005-198064 A | 7/2005 |
| JP | 2005-202703 A | 7/2005 |
| JP | 2005-227826 A | 8/2005 |
| JP | 2005-227951 A | 8/2005 |
| JP | 2005-228088 A | 8/2005 |
| JP | 2005-228091 A | 8/2005 |
| JP | 2005-234291 A | 9/2005 |
| JP | 2005-242669 A | 9/2005 |
| JP | 2005-267049 A | 9/2005 |
| JP | 2005-309933 A | 11/2005 |
| JP | 2005-321915 A | 11/2005 |
| JP | 2005-327064 A | 11/2005 |
| JP | 2005-352924 A | 12/2005 |
| JP | 2005-352943 A | 12/2005 |
| JP | 2006-18645 A | 1/2006 |
| JP | 2006-99733 A | 4/2006 |
| JP | 2006-155232 A | 6/2006 |
| JP | 2006-259376 A | 9/2006 |
| JP | 2007-25998 A | 2/2007 |
| JP | 2007-124667 A | 5/2007 |
| JP | 2007-132676 A | 5/2007 |
| JP | 2007-512635 A | 5/2007 |
| JP | 2007-334984 A | 12/2007 |
| JP | 2008-15698 A | 1/2008 |
| JP | 2008-503007 A | 1/2008 |
| JP | 2008-52705 A | 3/2008 |
| JP | 2008-102860 A | 5/2008 |
| JP | 2008-123553 A | 5/2008 |
| JP | 2008-518330 A | 5/2008 |
| JP | 2008-262251 A | 10/2008 |
| JP | 2008-304959 A | 12/2008 |
| JP | 2008-306667 A | 12/2008 |
| JP | 2009-9350 A | 1/2009 |
| JP | 2009-508217 A | 2/2009 |
| JP | 2009-51921 A | 3/2009 |
| JP | 2009-136456 A | 6/2009 |
| JP | 2009-522666 A | 6/2009 |
| JP | 2009-151821 A | 7/2009 |
| JP | 2009-265929 A | 11/2009 |
| JP | 2009-277192 A | 11/2009 |
| JP | 2010-61402 A | 3/2010 |
| JP | 2010-97552 A | 4/2010 |
| JP | 2010-187096 A | 8/2010 |
| JP | 2010-538394 A | 12/2010 |
| JP | 2012-208645 A | 10/2012 |
| JP | 2013-25357 A | 2/2013 |
| JP | 2013-25409 A | 2/2013 |
| JP | 2013-47919 A | 3/2013 |
| JP | 2013-106271 A | 5/2013 |
| JP | 2013-120468 A | 6/2013 |
| JP | 2013-191234 A | 9/2013 |
| JP | 2013-203283 A | 10/2013 |
| JP | 2013-206274 A | 10/2013 |
| JP | 2013-211055 A | 10/2013 |
| JP | 2013 218698 A | 10/2013 |
| JP | 2014-503891 A | 2/2014 |
| KR | 2002-0010863 A | 2/2002 |
| KR | 10-0490373 B1 | 5/2005 |
| KR | 10-2006-0085850 A | 7/2006 |
| KR | 10-2009-0035499 A | 4/2009 |
| KR | 10-2009-0100320 A | 9/2009 |
| KR | 10-2010-0019887 A | 2/2010 |
| KR | 10-2011-0078008 A | 7/2011 |
| KR | 10-2011-0093729 A | 8/2011 |
| KR | 10-2012-0057800 A | 6/2012 |
| KR | 10-2012-0091495 A | 8/2012 |
| KR | 10-2013-0016329 A | 2/2013 |
| KR | 10-2015-0022599 A | 3/2015 |
| WO | 1996/06401 A1 | 2/1996 |
| WO | 1998/44431 A2 | 10/1998 |
| WO | 1999/28815 A1 | 6/1999 |
| WO | 1999/38149 A1 | 7/1999 |
| WO | 1999/54807 A1 | 10/1999 |
| WO | 2000/08757 A1 | 2/2000 |
| WO | 2000/16186 A2 | 3/2000 |
| WO | 2001/16690 A2 | 3/2001 |
| WO | 2001/46790 A2 | 6/2001 |
| WO | 2001/57716 A2 | 8/2001 |
| WO | 2002/08881 A2 | 1/2002 |
| WO | 2002/13176 A2 | 2/2002 |
| WO | 2002/32088 A2 | 4/2002 |
| WO | 2002/46903 A1 | 6/2002 |
| WO | 2002/082418 A2 | 10/2002 |
| WO | 2002/093542 A1 | 11/2002 |
| WO | 2003/052626 A1 | 6/2003 |
| WO | 2003/060622 A2 | 7/2003 |
| WO | 2003/107168 A1 | 12/2003 |
| WO | 2004/021166 A1 | 3/2004 |
| WO | 2004/040481 A1 | 5/2004 |
| WO | 2004/063862 A2 | 7/2004 |
| WO | 2005/036416 A2 | 4/2005 |

(56) References Cited

FOREIGN PATENT DOCUMENTS

| | | | |
|---|---|---|---|
| WO | 2005/041020 | A1 | 5/2005 |
| WO | 2005/055034 | A1 | 6/2005 |
| WO | 2005/074268 | A1 | 8/2005 |
| WO | 2005/106684 | A1 | 11/2005 |
| WO | 2006/003591 | A2 | 1/2006 |
| WO | 2006/012343 | A2 | 2/2006 |
| WO | 2006/019639 | A2 | 2/2006 |
| WO | 2006/020304 | A2 | 2/2006 |
| WO | 2006/020305 | A2 | 2/2006 |
| WO | 2006/036069 | A1 | 4/2006 |
| WO | 2006/037545 | A2 | 4/2006 |
| WO | 2006/092464 | A1 | 9/2006 |
| WO | 2006/117438 | A1 | 11/2006 |
| WO | 2006/119269 | A2 | 11/2006 |
| WO | 2007/031816 | A1 | 3/2007 |
| WO | 2007/032908 | A1 | 3/2007 |
| WO | 2007/032972 | A1 | 3/2007 |
| WO | 2006/020304 | A3 | 5/2007 |
| WO | 2007/069835 | A1 | 6/2007 |
| WO | 2007/080559 | A2 | 7/2007 |
| WO | 2007/094894 | A2 | 8/2007 |
| WO | 2007/142256 | A1 | 12/2007 |
| WO | 2008/017936 | A2 | 2/2008 |
| WO | 2008/030874 | A1 | 3/2008 |
| WO | 2008/030976 | A2 | 3/2008 |
| WO | 2008/086303 | A1 | 7/2008 |
| WO | 2007/100944 | A3 | 8/2008 |
| WO | 2008/114491 | A1 | 9/2008 |
| WO | 2009/032638 | A2 | 3/2009 |
| WO | 2009/032750 | A1 | 3/2009 |
| WO | 2009/089222 | A2 | 7/2009 |
| WO | 2011/126501 | A1 | 10/2011 |
| WO | 2012/078079 | A2 | 6/2012 |
| WO | 2013/017736 | A1 | 2/2013 |
| WO | 2013/157330 | A1 | 10/2013 |

OTHER PUBLICATIONS

Advisory Action received for U.S. Appl. No. 12/217,029, dated Dec. 14, 2016, 3 pages.
Advisory Action received for U.S. Appl. No. 12/888,362, dated May 7, 2013, 3 pages.
Advisory Action received for U.S. Appl. No. 14/261,112, dated Nov. 30, 2017, 3 pages.
Advisory Action received for U.S. Appl. No. 14/710,125, dated Mar. 14, 2017, 3 pages.
Advisory Action received for U.S. Appl. No. 15/421,865, dated Apr. 16, 2020, 7 pages.
Advisory Action received for U.S. Appl. No. 11/960,669, dated Nov. 3, 2011, 3 pages.
Applicant Initiated Interview Summary received for U.S. Appl. No. 15/411,110, dated Apr. 21, 2020, 5 pages.
Applicant Initiated Interview Summary received for U.S. Appl. No. 15/411,110, dated Nov. 17, 2020, 7 pages.
Applicant Initiated Interview Summary received for U.S. Appl. No. 15/411,110, dated Oct. 28, 2019, 6 pages.
Applicant Initiated Interview Summary received for U.S. Appl. No. 16/270,801, dated Mar. 11, 2020, 3 pages.
Applicant Initiated Interview Summary received for U.S. Appl. No. 16/270,902, dated Mar. 11, 2020, 3 pages.
Applicant-Initiated Interview Summary received for U.S. Appl. No. 15/418,537, dated Dec. 23, 2019, 6 pages.
Applicant-Initiated Interview Summary received for U.S. Appl. No. 15/421,865, dated Dec. 15, 2020, 6 pages.
Applicant-Initiated Interview Summary received for U.S. Appl. No. 15/421,865, dated Feb. 3, 2020, 5 pages.
Applicant-Initiated Interview Summary received for U.S. Appl. No. 16/020,804, dated Apr. 13, 2020, 3 pages.
Applicant-Initiated Interview Summary received for U.S. Appl. No. 16/267,817, dated Dec. 1, 2020, 5 pages.
Applicant-Initiated Interview Summary received for U.S. Appl. No. 16/267,817, dated Jul. 14, 2020, 5 pages.
"Asus Eee News, Mods, and Hacks: Asus Eee PC Easy Mode Internet Tab Options Tour", asuseeehacks.blogspot.com, Available online at <http://asuseeehacks.blogspot.com/2007/11/asus-eee-pc-user-interface-tour.html>, Nov. 10, 2007, 33 pages.
"Autocomplete Plugin", Emesene Forum, available at <http://emeseme.org/smf/index.olm?topic-1276.0>, Jun. 20, 2008, 5 pages.
Board Opinion received for Chinese Patent Application No. 200780041309.3, dated Apr. 1, 2016, 16 pages (9 pages of English Translation and 7 pages of Official copy).
Board Opinion received for Chinese Patent Application No. 201480001676.0, dated Oct. 21, 2019, 10 pages (1 page of English Translation and 9 pages of Official Copy).
Communication of the Board of Appeal received for European Patent Application No. 09170697.8, dated Jan. 25, 2021, 6 pages.
Corrected Notice of Allowance received for U.S. Appl. No. 12/689,834, dated Feb. 8, 2018, 4 pages.
Corrected Notice of Allowance received for U.S. Appl. No. 12/689,834, dated May 17, 2018, 2 pages.
Corrected Notice of Allowance received for U.S. Appl. No. 12/888,362, dated Jun. 6, 2018, 3 pages.
Corrected Notice of Allowance received for U.S. Appl. No. 14/142,640, dated Feb. 5, 2020, 4 pages.
Corrected Notice of Allowance received for U.S. Appl. No. 14/142,648, dated May 20, 2020, 2 pages.
Corrected Notice of Allowance received for U.S. Appl. No. 12/888,362, dated Apr. 25, 2018, 3 pages.
Decision of Board of Appeal received for European Patent Application No. 09170697.8 dated Oct. 24, 2016, 24 pages.
Decision of Board of Appeal received for European Patent Application No. 09170697.8, dated Apr. 23, 2021, 17 pages.
Decision on Acceptance received for Australian Patent Application No. 2017202587, dated Oct. 8, 2019, 19 pages.
Decision on Appeal received for U.S. Appl. No. 14/142,640, dated Oct. 7, 2019, 9 pages.
Decision on Appeal received for U.S. Appl. No. 14/142,648, dated Feb. 28, 2020, 6 pages.
Decision on Appeal received for U.S. Appl. No. 14/261,112, dated Oct. 29, 2020, 20 pages.
Decision on Appeal received for U.S. Appl. No. 14/710,125, dated Mar. 11, 2019, 7 pages.
Decision to Grant received for European Patent Application No. 10762813.3, dated May 11, 2018, 3 pages.
Decision to Grant received for European Patent Application No. 12177813.8, dated Nov. 24, 2016, 3 pages.
Decision to Grant received for European Patent Application No. 12194312.0, dated Feb. 1, 2018, 2 pages.
Decision to Grant Received for European Patent Application No. 12194315.3, dated Oct. 12, 2017, 2 pages.
Decision to Grant received for European Patent Application No. 13795330.3, dated Jan. 16, 2020, 2 pages.
Decision to Grant received for European Patent Application No. 17198398.4, dated Jun. 14, 2019, 3 pages.
Decision to Grant received for European Patent Application No. 17210062.0, dated Oct. 1, 2020, 2 pages.
Decision to Refuse received for European Patent Application No. 06846840.4, dated Mar. 4, 2010, 10 pages.
Decision to Refuse received for European Patent Application No. 09170697.8, dated Jul. 10, 2018, 31 pages.
"Desktop Icon Toy-History", Available online at <http://www.idesksoft.com/history.html>, retrieved on Jan. 2, 2010, retrieved on Jan. 2, 2010, 2 pages.
Examiner's Answer for Appeal Brief received for U.S. Appl. No. 11/850,005, dated Apr. 10, 2018, 34 pages.
Examiner's Answer to Appeal Brief received for U.S. Appl. No. 14/142,648, dated Apr. 10, 2018, 15 pages.
Examiner's Answer to Appeal Brief received for U.S. Appl. No. 14/261,112, dated Oct. 29, 2019, 10 pages.
Examiner's Answer to Appeal Brief received for U.S. Appl. No. 14/710,125, dated Jan. 26, 2018, 6 pages.

(56) References Cited

OTHER PUBLICATIONS

Examiner's Pre-review report received for Japanese Patent Application No. 2014-253365, dated Dec. 12, 2017, 7 pages (3 page of English Translation and 4 pages of Official Copy).
Examiner's Pre-Review Report received for Japanese Patent Application No. 2018-121118, dated Jun. 2, 2020, 4 pages (2 pages of English Translation and 2 pages of Official Copy).
Extended European Search Report received for European Patent Application No. 17198398.4, dated Feb. 8, 2018, 8 pages.
Extended European Search Report received for European Patent Application No. 17210062.0, dated Feb. 20, 2018, 12 pages.
Extended European Search Report received for European Patent Application No. 17810723.1, dated Nov. 12, 2019, 9 pages.
Extended European Search Report received for European Patent Application No. 17810739.7, dated Mar. 22, 2019, 9 pages.
Extended European Search Report received for European Patent Application No. 17813879.8, dated Jan. 8, 2020, 8 pages.
Extended European Search Report received for European Patent Application No. 19176224.4, dated Dec. 13, 2019, 7 pages.
Extended European Search Report received for European Patent Application No. 20203888.1, dated Feb. 10, 2021, 8 pages.
Final Office Action received for U.S. Appl. No. 11/960,669, dated Aug. 18, 2011, 13 pages.
Final Office Action received for U.S. Appl. No. 11/620,686, dated Aug. 3, 2009, 11 pages.
Final Office Action received for U.S. Appl. No. 11/620,686, dated Jul. 12, 2010, 10 pages.
Final Office Action received for U.S. Appl. No. 11/850,010, dated Aug. 14, 2018, 21 pages.
Final Office Action received for U.S. Appl. No. 11/850,010, dated May 11, 2018, 24 pages.
Final Office Action received for U.S. Appl. No. 12/242,851, dated Jul. 1, 2016, 90 pages.
Final Office Action received for U.S. Appl. No. 12/689,834, dated Mar. 26, 2015, 30 pages.
Final Office Action received for U.S. Appl. No. 12/689,834, dated May 4, 2017, 41 pages.
Final Office Action received for U.S. Appl. No. 12/689,834, dated Oct. 15, 2012, 22 pages.
Final Office Action received for U.S. Appl. No. 14/142,648, dated Dec. 7, 2016, 12 pages.
Final Office Action received for U.S. Appl. No. 14/261,112, dated Aug. 10, 2017, 35 pages.
Final Office Action received for U.S. Appl. No. 14/261,112, dated Nov. 7, 2018, 34 pages.
Final Office Action received for U.S. Appl. No. 14/710,125, dated Oct. 27, 2016, 13 pages.
Final Office Action received for U.S. Appl. No. 15/411,110, dated Mar. 5, 2020, 30 pages.
Final Office Action received for U.S. Appl. No. 15/411,110, dated Mar. 15, 2021, 28 pages.
Final Office Action received for U.S. Appl. No. 15/418,537, dated Sep. 23, 2019, 53 pages.
Final Office Action received for U.S. Appl. No. 15/421,865, dated Dec. 2, 2019, 19 pages.
Final Office Action received for U.S. Appl. No. 15/421,865, dated Mar. 19, 2021, 20 pages.
Final Office Action received for U.S. Appl. No. 15/426,836, dated Mar. 29, 2019, 49 pages.
Final Office Action received for U.S. Appl. No. 16/267,817, dated Aug. 24, 2020, 23 pages.
"ImageShack—Hosting", available at <http://img129.imageshack.us/mv.php?image=autocompleteemoticonprexw0.jpg>, Nov. 10, 2008, 1 page.
Intention to Grant received for European Patent Application No. 10762813.3, dated Dec. 18, 2017, 11 pages.
Intention to Grant received for European Patent Application No. 12177813.8, dated Jul. 6, 2016, 8 pages.
Intention to Grant received for European Patent Application No. 12189764.9, dated Mar. 5, 2021, 14 pages.
Intention to Grant received for European Patent Application No. 12194312.0, dated Aug. 3, 2017, 8 pages.
Intention to Grant received for European Patent Application No. 12194315.3, dated May 31, 2017, 8 pages.
Intention to Grant received for European Patent Application No. 13795330.3, dated Aug. 9, 2019, 13 pages.
Intention to Grant received for European Patent Application No. 17198398.4, dated Jan. 28, 2019, 8 pages.
Intention to Grant received for European Patent Application No. 17210062.0, dated Jun. 23, 2020, 8 pages.
International Preliminary Report on Patentability for PCT Patent Application No. PCT/US2008/050047, dated Sep. 15, 2009, 11 pages.
International Preliminary Report on Patentability received for PCT Patent Application No. PCT/US2017/034834, dated Dec. 20, 2018, 9 pages.
International Preliminary Report on Patentability received for PCT Patent Application No. PCT/US2017/035331, dated Dec. 20, 2018, 13 pages.
International Preliminary Report on Patentability received for PCT Patent Application No. PCT/US2017/037057, dated Dec. 27, 2018, 24 pages.
International Search Report and Written Opinion received for PCT Patent Application No. PCT/US2008/050047, dated Sep. 3, 2009, 15 pages.
International Search Report and Written Opinion received for PCT Patent Application No. PCT/US2017/034834, dated Aug. 23, 2017, 10 pages.
International Search Report and Written Opinion received for PCT Patent Application No. PCT/US2017/035331, dated Oct. 6, 2017, 18 pages.
International Search Report and Written Opinion received for PCT Patent Application No. PCT/US2017/037057, dated Aug. 29, 2017, 26 pages.
Invitation to Pay Additional Fee received for PCT Patent Application No. PCT/US2017/035331, dated Aug. 7, 2017, 4 Pages.
"ISO 9241-10:1996 Ergonomic Requirements for Office Work with Visual Display Terminals (VDTs)—Part 10", Dialogue Principles, International Standard—ISO, Zuerich, CH, vol. 9241-10, May 1, 1996, 17 pages.
"ISO 9241-11:1998 Ergonomic requirements for office work with visual display terminals (VDTs)—Part 11", Guidance on usability, International Standard—ISO, Zuerich, CH, vol. 9241-11, Mar. 15, 1998, 27 pages.
"ISO 9241-12:1998 Ergonomic requirements for office work with visual display terminals (VDTs)—Part 12", Presentation of Information, International Standard—ISO, Zuerich, CH, vol. 9241-12, Dec. 1, 1998, 52 pages.
"Launch 'Em Version 3.1", Retrieved from the Internet: http://www.fladnag.net/downloads/telephone/palm/APPS/Inchem31/Documentation/LaunchEm.pdf, 2001, pp. 1-39.
"Macintosh Human Interface Guidelines (chapter 1)", 1995, pp. 3-14.
Minutes of Meeting received for European Patent Application No. 09170697.8, dated Jul. 10, 2018, 6 pages.
Minutes of Oral Proceedings received for European Patent Application No. 17210062.0, mailed on Jun. 17, 2020, 5 pages.
Minutes of the Oral Proceedings received for European Application No. 08798713.7, mailed on Aug. 6, 2018, 4 pages.
Minutes of the Oral Proceedings received for European Patent Application No. 12189764.9, mailed on Oct. 13, 2020, 6 pages.
Minutes of the Oral Proceedings received for European Patent Application No. 13795330.3, mailed on Aug. 2, 2019, 7 pages.
"N1 Quick Start Guide", Version 0.5, Available at <http://www.instructionsmanuals.com/download/telefonos_movil/Neonode-N1-en.pdf>, Jul. 29, 2004, pp. 1-24.
"Nokia 7710", https://www.nokia.com/en_int/phones/sites/default/files/user-guides/Nokia_7710_UG_en.pdf, 2005, pp. 1-153.
Non-Final Office Action received for U.S. Appl. No. 12/689,834, dated Aug. 26, 2016, 26 pages.
Non-Final Office Action received for U.S. Appl. No. 12/689,834, dated May 24, 2012, 21 pages.

(56) References Cited

OTHER PUBLICATIONS

Non-Final Office Action received for U.S. Appl. No. 15/033,551, dated May 24, 2018, 26 pages.
Non-Final Office Action received for U.S. Appl. No. 15/421,865, dated Mar. 21, 2019, 18 pages.
Non-Final Office Action received for U.S. Appl. No. 11/960,669, dated Mar. 17, 2011, 23 pages.
Non-Final Office Action received for U.S. Appl. No. 11/459,602, dated Sep. 4, 2008, 13 pages.
Non-Final Office Action received for U.S. Appl. No. 11/620,686, dated Dec. 22, 2009, 10 pages.
Non-Final Office Action received for U.S. Appl. No. 11/620,686, dated Dec. 31, 2008, 17 pages.
Non-Final Office Action received for U.S. Appl. No. 11/850,005, dated Apr. 12, 2017, 11 pages.
Non-Final Office Action received for U.S. Appl. No. 11/850,010, dated Jul. 24, 2017, 19 pages.
Non-Final Office Action received for U.S. Appl. No. 12/689,834, dated Jun. 10, 2014, 25 pages.
Non-Final Office Action received for U.S. Appl. No. 14/261,112, dated Apr. 5, 2018, 40 pages.
Non-Final Office Action received for U.S. Appl. No. 14/261,112, dated Nov. 29, 2016, 34 pages.
Non-Final Office Action received for U.S. Appl. No. 15/153,617, dated Apr. 2, 2018, 12 pages.
Non-Final Office Action received for U.S. Appl. No. 15/411,110, dated Dec. 13, 2018, 23 pages.
Non-Final Office Action received for U.S. Appl. No. 15/411,110, dated Jul. 22, 2019, 29 pages.
Non-Final Office Action received for U.S. Appl. No. 15/411,110, dated Jun. 26, 2020, 32 pages.
Non-Final Office Action received for U.S. Appl. No. 15/418,537, dated Dec. 13, 2018, 53 pages.
Non-Final Office Action received for U.S. Appl. No. 15/421,865, dated Oct. 7, 2020, 20 pages.
Non-Final Office Action received for U.S. Appl. No. 15/426,836, dated Oct. 18, 2018, 40 pages.
Non-Final Office Action received for U.S. Appl. No. 16/020,804, dated Nov. 20, 2019, 13 pages.
Non-Final Office Action received for U.S. Appl. No. 16/267,817, dated Apr. 15, 2020, 25 pages.
Non-Final Office Action received for U.S. Appl. No. 16/270,801, dated Mar. 27, 2020, 11 pages.
Non-Final Office Action received for U.S. Appl. No. 16/270,902, dated Mar. 27, 2020, 11 pages.
Notice of Acceptance received for Australian Patent Application No. 2013404001, dated Nov. 21, 2017, 3 pages.
Notice of Acceptance received for Australian Patent Application No. 2014204422, dated Apr. 28, 2016, 2 pages.
Notice of Acceptance received for Australian Patent Application No. 2014274556, dated Jul. 27, 2016, 2 Pages.
Notice of Acceptance received for Australian Patent Application No. 2016203168, dated Feb. 14, 2018, 3 pages.
Notice of Acceptance received for Australian Patent Application No. 2016203309, dated Feb. 14, 2018, 3 pages.
Notice of Acceptance received for Australian Patent Application No. 2016213886, dated Feb. 9, 2018, 3 pages.
Notice of Acceptance received for Australian Patent Application No. 2017201768, dated Nov. 21, 2018, 3 pages.
Notice of Acceptance received for Australian Patent Application No. 2017202587, dated Nov. 6, 2019, 3 pages.
Notice of Acceptance received for Australian Patent Application No. 2017276153, dated Feb. 19, 2018, 4 pages.
Notice of Acceptance received for Australian Patent Application No. 2017276153, dated Jan. 17, 2018, 3 pages.
Notice of Acceptance received for Australian Patent Application No. 2017277813, dated Jun. 16, 2020, 3 pages.
Notice of Acceptance received for Australian Patent Application No. 2017277851, dated Dec. 9, 2019, 3 pages.
Notice of Acceptance received for Australian Patent Application No. 2018200272, dated Apr. 23, 2019, 3 pages.
Notice of Acceptance received for Australian Patent Application No. 2018203512, dated Jul. 26, 2019, 3 pages.
Notice of Acceptance received for Australian Patent Application No. 2019200692, dated Apr. 7, 2020, 3 pages.
Notice of Acceptance received for Australian Patent Application No. 2019204835, dated Dec. 7, 2020, 3 pages.
Notice of Acceptance received for Australian Patent Application No. 2019210673, dated Oct. 17, 2020, 3 pages.
Notice of Acceptance received for Australian Patent Application No. 2019219816, dated Sep. 23, 2020, 3 pages.
Notice of Acceptance received for Australian Patent Application No. 2020201723, dated May 6, 2021, 3 pages.
Notice of Acceptance received for Australian Patent Application No. 2021200102, dated Mar. 16, 2021, 3 pages.
Notice of Allowance received for Australian Patent Application No. 2015202076, dated Apr. 5, 2017, 3 pages.
Notice of Allowance received for Canadian Patent Application No. 2,890,778, dated Apr. 24, 2017, 1 page.
Notice of Allowance received for Canadian Patent Application No. 2,983,178, dated Oct. 20, 2020, 1 page.
Notice of Allowance received for Chinese Patent Application No. 200780041309.3, dated Jul. 31, 2017, 2 pages.
Notice of Allowance received for Chinese Patent Application No. 201080063832.8, dated May 24, 2016, 4 pages (2 pages of English Translation and 2 pages of Official Copy).
Notice of Allowance received for Chinese Patent Application No. 201210399033.9, dated Jun. 20, 2016, 3 pages (2 pages of English Translation and 1 page of Official Copy).
Notice of Allowance received for Chinese Patent Application No. 201310724733.5, dated Dec. 27, 2018, 2 pages (1 page of English translation and 1 page of Official Copy).
Notice of Allowance received for Chinese Patent Application No. 201380080659.6, dated Jul. 29, 2019, 2 pages (1 page of English Translation and 1 page of Official Copy).
Notice of Allowance received for Chinese Patent Application No. 201410250648.4, dated Aug. 20, 2018, 2 pages (1 page of English Translation and 1 page of Official Copy).
Notice of Allowance received for Chinese Patent Application No. 201410250688.9, dated May 21, 2018, 3 pages (1 page of English Translation and 2 pages of Official Copy).
Notice of Allowance received for Chinese Patent Application No. 201410251370.2, dated Jul. 31, 2018, 2 pages (1 page of English Translation and 1 page of Official Copy).
Notice of Allowance received for Chinese Patent Application No. 201410251400.X, dated Aug. 20, 2018, 3 pages (1 page of English Translation and 2 pages of Official Copy).
Notice of Allowance received for Japanese Patent Application No. 2013252338, dated Jun. 23, 2017, 3 pages.
Notice of Allowance received for Japanese Patent Application No. 2014-139095, dated Apr. 1, 2016, 3 pages.
Notice of Allowance received for Japanese Patent Application No. 2014-253365, dated Nov. 26, 2018, 3 pages (1 page of English Translation and 2 pages of Official Copy).
Notice of Allowance received for Japanese Patent Application No. 2015-532193 dated Jan. 23, 2017, 3 pages.
Notice of Allowance received for Japanese Patent Application No. 2016-091460, dated Oct. 9, 2018, 3 pages (1 page of English Translation and 2 pages of Official Copy).
Notice of Allowance received for Japanese Patent Application No. 2016-092789, dated Feb. 3, 2017, 3 pages.
Notice of Allowance received for Japanese Patent Application No. 2016-527367, dated Jul. 30, 2018, 4 pages (1 page of English Translation and 3 pages of Official Copy).
Notice of Allowance received for Japanese Patent Application No. 2017-042050, dated Apr. 24, 2017, 3 pages.
Notice of Allowance received for Japanese Patent Application No. 2017-102031, dated Jun. 23, 2017, 3 pages.
Notice of Allowance received for Japanese Patent Application No. 2017-142812, dated Jul. 19, 2019, 4 pages (1 page of English Translation and 3 pages of Official copy).

(56) References Cited

OTHER PUBLICATIONS

Notice of Allowance received for Japanese Patent Application No. 2017-204561, dated Mar. 12, 2019, 4 pages (1 page of English Translation and 3 pages of Official Copy).
Notice of Allowance received for Japanese Patent Application No. 2017-223021, dated Dec. 18, 2020, 3 pages (1 page of English Translation and 2 pages of Official Copy).
Notice of Allowance received for Japanese Patent Application No. 2018-201088, dated Sep. 18, 2020, 4 pages (1 page of English Translation and 3 pages of Official Copy).
Notice of Allowance received for Japanese Patent Application No. 2013-011209, dated Jun. 13, 2016, 2 pages.
Notice of Allowance received for Korean Patent Application No. 10-2014-7036624, dated Sep. 26, 2016, 3 pages (1 page of English Translation and 2 pages of Official Copy).
Notice of Allowance received for Korean Patent Application No. 10-2016-7014051, dated Nov. 27, 2018, 4 pages (1 page of English Translation and 3 pages of Official Copy).
Notice of Allowance received for Korean Patent Application No. 10-2019-7005262, dated Mar. 25, 2020, 5 pages (2 pages of English Translation and 3 pages of Official Copy).
Notice of Allowance received for U.S. Appl. No. 11/459,602, dated Jan. 9, 2009, 6 pages.
Notice of Allowance received for U.S. Appl. No. 11/968,067, dated Mar. 2, 2017, 5 pages.
Notice of Allowance received for U.S. Appl. No. 12/217,029, dated Jan. 17, 2017, 10 pages.
Notice of Allowance received for U.S. Appl. No. 12/242,851, dated Dec. 27, 2016, 20 pages.
Notice of Allowance received for U.S. Appl. No. 12/364,470, dated Nov. 24, 2017, 9 pages.
Notice of Allowance received for U.S. Appl. No. 12/689,834, dated Jan. 17, 2018, 9 pages.
Notice of Allowance received for U.S. Appl. No. 12/888,362, dated Apr. 11, 2018, 7 pages.
Notice of Allowance received for U.S. Appl. No. 14/142,640, dated Dec. 11, 2019, 7 pages.
Notice of Allowance received for U.S. Appl. No. 14/142,648, dated Jul. 15, 2020, 6 pages.
Notice of Allowance received for U.S. Appl. No. 14/142,648, dated Mar. 13, 2020, 5 pages.
Notice of Allowance received for U.S. Appl. No. 14/261,112, dated Apr. 9, 2021, 2 pages.
Notice of Allowance received for U.S. Appl. No. 14/261,112, dated Nov. 18, 2020, 6 pages.
Notice of Allowance received for U.S. Appl. No. 14/710,125, dated Apr. 19, 2019, 8 pages.
Notice of Allowance received for U.S. Appl. No. 14/710,125, dated May 7, 2019, 9 pages.
Notice of Allowance received for U.S. Appl. No. 15/033,551, dated Nov. 14, 2018, 10 pages.
Notice of Allowance received for U.S. Appl. No. 15/056,913, dated May 24, 2017, 19 pages.
Notice of Allowance received for U.S. Appl. No. 15/153,617, dated Nov. 23, 2018, 10 pages.
Notice of Allowance received for U.S. Appl. No. 15/418,537, dated Apr. 6, 2020, 9 pages.
Notice of Allowance received for U.S. Appl. No. 15/426,836, dated Dec. 16, 2019, 16 pages.
Notice of Allowance received for U.S. Appl. No. 16/020,804, dated May 28, 2020, 18 pages.
Notice of Allowance received for U.S. Appl. No. 16/267,817, dated Dec. 18, 2020, 11 pages.
Notice of Allowance received for U.S. Appl. No. 16/270,801, dated Sep. 16, 2020, 9 pages.
Notice of Allowance received for U.S. Appl. No. 16/270,902, dated Sep. 22, 2020, 9 pages.
Notice of Allowance received for U.S. Appl. No. 16/378,291, dated Mar. 25, 2020, 11 pages.
Notice of Allowance received for U.S. Appl. No. 16/428,634, dated May 8, 2020, 16 pages.
Notice of Allowance received for U.S. Appl. No. 16/918,855, dated Apr. 6, 2021, 7 pages.
Notice of Allowance received for U.S. Appl. No. 16/926,530, dated Jun. 24, 2021, 10 pages.
Notice of Allowance received for U.S. Appl. No. 11/850,010, dated Feb. 6, 2019, 25 pages.
Office Action received for Danish Patent Application No. PA201670595, dated Nov. 25, 2016, 9 pages.
Office Action received for European Patent Application No. 13174706.5, dated Oct. 16, 2017, 8 pages.
Office Action received for European Patent Application No. 13795330.3, dated Oct. 9, 2017, 8 pages.
Office Action received for Australian Patent Application No. 2013404001, dated Aug. 3, 2017, 5 pages.
Office Action received for Australian Patent Application No. 2013404001, dated Nov. 26, 2016, 3 pages.
Office Action received for Australian Patent Application No. 2014274537, dated Jul. 25, 2016, 3 pages.
Office Action received for Australian Patent Application No. 2015202076, dated May 5, 2016, 3 pages.
Office Action received for Australian Patent Application No. 2015215876, dated Aug. 1, 2016, 4 pages.
Office Action received for Australian Patent Application No. 2015215876, dated Jul. 26, 2017, 6 pages.
Office Action received for Australian Patent Application No. 2015215876, dated Jun. 28, 2017, 4 pages.
Office Action received for Australian Patent Application No. 2015215876, dated May 24, 2017, 4 pages.
Office Action received for Australian Patent Application No. 2016203168, dated Feb. 8, 2017, 2 pages.
Office Action received for Australian Patent Application No. 2016203309, dated Feb. 8, 2017, 11 pages.
Office Action received for Australian Patent Application No. 2016213886, dated May 18, 2017, 2 pages.
Office Action received for Australian Patent Application No. 2017201768, dated Feb. 28, 2018, 4 pages.
Office Action received for Australian Patent Application No. 2017202587, dated Apr. 26, 2019, 4 pages.
Office Action received for Australian Patent Application No. 2017202587, dated Jul. 4, 2018, 4 pages.
Office Action received for Australian Patent Application No. 2017202587, dated Jul. 4, 2019, 4 pages.
Office Action received for Australian Patent Application No. 2017277813, dated Jun. 11, 2019, 3 pages.
Office Action received for Australian Patent Application No. 2017277813, dated Mar. 20, 2020, 4 pages.
Office Action received for Australian Patent Application No. 2017277851, dated Jul. 5, 2019, 3 pages.
Office Action received for Australian Patent Application No. 2018200272, dated Jan. 17, 2019, 2 pages.
Office Action received for Australian Patent Application No. 2018203512, dated Apr. 15, 2019, 4 pages.
Office Action received for Australian Patent Application No. 2019200692, dated Dec. 24, 2019, 2 pages.
Office Action received for Australian Patent Application No. 2019204835, dated Sep. 16, 2020, 6 pages.
Office Action received for Australian Patent Application No. 2019210673, dated Jul. 28, 2020, 4 pages.
Office Action received for Australian Patent Application No. 2019210673, dated Sep. 28, 2020, 2 pages.
Office Action received for Australian Patent Application No. 2019219816, dated Apr. 17, 2020, 3 pages.
Office Action received for Australian Patent Application No. 2020201723, dated Feb. 4, 2021, 6 pages.
Office Action received for Canadian Patent Application No. 2,890,778, dated May 19, 2016, 6 pages.
Office Action received for Canadian Patent Application No. 2,983,178, dated Aug. 16, 2018, 5 pages.
Office Action received for Canadian Patent Application No. 2,983,178, dated Jul. 22, 2019, 6 pages.

(56) References Cited

OTHER PUBLICATIONS

Office Action received for Chinese Patent Application No. 200780041309.3, dated Feb. 8, 2017, 4 pages (1 page of English Translation and 3 pages of Official Copy).
Office Action received for Chinese Patent Application No. 201310724733.5, dated Apr. 9, 2018, 11 pages (2 pages of English Translation and 9 pages of Official copy).
Office Action received for Chinese Patent Application No. 201310724733.5, dated Aug. 15, 2018, 2 pages (1 page of English Translation and 1 page of Official copy).
Office Action received for Chinese Patent Application No. 201310724733.5, dated Aug. 28, 2018, 6 pages (3 pages of English Translation and 3 pages of Official copy).
Office Action received for Chinese Patent Application No. 201310724733.5, dated Oct. 30, 2017, 14 pages (3 pages of English Translation and 11 pages of Official Copy).
Office Action received for Chinese Patent Application No. 201310724733.5, dated Apr. 12, 2016, 14 pages (3 pages of English Translation and 11 pages of Official Copy).
Office Action received for Chinese Patent Application No. 201310724733.5, dated Apr. 21, 2017, 18 pages (5 pages of English Translation and 13 pages of Official Copy).
Office Action received for Chinese Patent Application No. 201310724733.5, dated Dec. 30, 2016, 13 pages (3 pages of English Translation and 10 pages of Official Copy).
Office Action received for Chinese Patent Application No. 201380080659.6, dated Apr. 4, 2018, 15 pages (5 pages of English Translation and 10 pages of Official Copy).
Office Action received for Chinese Patent Application No. 201380080659.6, dated Mar. 4, 2019, 9 pages (5 pages of English Translation and 4 pages of Official Copy).
Office Action received for Chinese Patent Application No. 201380080659.6, dated Oct. 26, 2018, 11 pages (3 pages of English Translation and 8 pages of Official Copy).
Office action received for Chinese Patent Application No. 201410250648.4, dated Feb. 14, 2018, 6 pages (3 pages of English Translation and 3 pages of Official Copy).
Office Action received for Chinese Patent Application No. 201410250648.4, dated Jun. 29, 2017, 13 pages (5 pages of English Translation and 8 pages of Official Copy).
Office Action received for Chinese Patent Application No. 201410250648.4, dated Oct. 9, 2016, 6 pages (3 pages of English Translation and 3 pages of Official Copy).
Office Action received for Chinese Patent Application No. 201410250688.9, dated Nov. 16, 2017, 6 pages (3 pages of English Translation and 3 pages of Official Copy).
Office Action received for Chinese Patent Application No. 201410250688.9, dated Jun. 1, 2017, 12 pages (5 pages of English Translation and 7 pages of Official Copy).
Office Action received for Chinese Patent Application No. 201410250688.9, dated Sep. 28, 2016, 7 pages (3 pages of English Translation and 4 pages of Official Copy).
Office Action received for Chinese Patent Application No. 201410251370.2, dated Feb. 11, 2018, 14 pages (5 pages of English Translation and 9 pages of Official Copy).
Office Action received for Chinese Patent Application No. 201410251370.2, dated May 12, 2017, 8 pages (4 pages of English Translation and 4 pages of Official Copy).
Office Action received for Chinese Patent Application No. 201410251370.2, dated Sep. 5, 2016, 7 pages (3 pages of English Translation and 4 pages of Official Copy).
Office Action received for Chinese Patent Application No. 201410251400.X, dated Feb. 8, 2018, 6 pages (3 pages of English Translation and 3 pages of Official Copy).
Office Action Received for Chinese Patent Application No. 201410251400.X, dated Jul. 4, 2016, 8 pages (2 pages of English Translation and 6 pages of Official Copy).
Office Action Received for Chinese Patent Application No. 201410251400.X, dated May 26, 2017, 11 pages (3 pages of English Translation and 8 pages of Official Copy).
Office Action received for Chinese Patent Application No. 201480001676.0, dated Mar. 20, 2018, 12 pages (3 pages of English Translation and 9 pages of Official Copy).
Office Action received for Chinese Patent Application No. 201480001676.0, dated May 12, 2017, 15 pages (5 pages of English Translation and 10 pages of Official Copy).
Office Action received for Chinese Patent Application No. 201480001676.0, dated Nov. 27, 2018, 8 pages (1 page of English Translation and 7 pages of Official Copy).
Office Action received for Chinese Patent Application No. 201780033621.1, dated Dec. 22, 2020, 30 pages (16 pages of English Translation and 14 pages of Official Copy).
Office Action received for Chinese Patent Application No. 201780033973.7, dated Jan. 22, 2021, 27 pages (11 pages of English Translation and 16 pages of Official Copy).
Office Action received for Danish Patent Application No. PA201670595, dated Aug. 23, 2018, 5 pages.
Office Action received for Danish Patent Application No. PA201670595, dated May 31, 2017, 3 pages.
Office Action received for Danish Patent Application No. PA201670595, dated Nov. 30, 2017, 4 pages.
Office Action received for European Patent Application No. 08829660.3, dated Jan. 3, 2020, 6 pages.
Office Action received for European Patent Application No. 08829660.3, mailed on Jan. 11, 2019, 7 pages.
Office Action received for European Patent Application No. 08829660.3, dated Jul. 5, 2016, 5 pages.
Office Action received for European Patent Application No. 09170697.8, dated Mar. 3, 2017, 8 pages.
Office Action Received for European Patent Application No. 12189764.9, dated Jan. 21, 2019, 7 pages.
Office Action received for European Patent Application No. 14734674.6, dated Aug. 30, 2019, 6 pages.
Office Action received for European Patent Application No. 14734674.6, dated Oct. 5, 2017, 6 pages.
Office Action received for European Patent Application No. 17210062.0, dated Jan. 3, 2019, 6 pages.
Office Action received for European Patent Application No. 17810739.7, dated Nov. 25, 2020, 4 pages.
Office Action received for Japanese Patent Application No. 2017-223021, dated Apr. 8, 2019, 7 pages (3 pages of English Translation and 4 pages of Official Copy).
Office Action received for Japanese Patent Application No. 2013-252338, dated Jan. 27, 2017, 10 pages (5 pages of English Translation and 5 pages of Official Copy).
Office Action received for Japanese Patent Application No. 2013-252338, dated Jun. 24, 2016, 4 pages (2 pages of English Translation and 2 pages of official copy).
Office Action received for Japanese Patent Application No. 2014-253365, dated Aug. 31, 2018, 6 pages (3 pages of English Translation and 3 pages of Official Copy).
Office Action received for Japanese Patent Application No. 2014-253365, dated Jul. 18, 2017, 9 pages (4 page of English Translation and 5 pages of Official Copy).
Office Action received for Japanese Patent Application No. 2014-253365, dated Oct. 17, 2016, 11 pages (5 pages of English Translation and 6 pages of Official Copy).
Office Action received for Japanese Patent Application No. 2016-042767, dated Mar. 3, 2017, 10 pages (6 pages of English Translation and 4 pages of Official Copy).
Office Action received for Japanese Patent Application No. 2016-091460, dated Jun. 1, 2018, 3 pages (1 page of English Translation and 2 pages of Official Copy).
Office Action received for Japanese Patent Application No. 2016-091460, dated Jun. 26, 2017, 6 pages (3 pages of English Translation and 3 pages of Official Copy).
Office Action received for Japanese Patent Application No. 2016-091460, dated Nov. 4, 2016, 6 pages (3 pages of English Translation and 3 pages of Official Copy).
Office Action received for Japanese Patent Application No. 2016-091460, dated Nov. 27, 2017, 7 pages (4 pages of English Translation and 3 pages of Official Copy).

(56) References Cited

OTHER PUBLICATIONS

Office Action received for Japanese Patent Application No. 2016-527367, dated Feb. 26, 2018, 15 pages (8 pages of English Translation and 7 pages of Official Copy).
Office Action received for Japanese Patent Application No. 2016-527367, dated Jul. 7, 2017, 16 pages (8 pages of English Translation and 8 pages of Official Copy).
Office Action received for Japanese Patent Application No. 2017-142812, dated Nov. 2, 2018, 6 pages (3 pages of English Translation and 3 pages of Official Copy).
Office Action received for Japanese Patent Application No. 2017-204561, dated Aug. 6, 2018, 7 pages (4 pages of English Translation and 3 pages of Official copy).
Office Action received for Japanese Patent Application No. 2017-204561, dated Nov. 6, 2018, 8 pages (4 pages of English Translation and 4 pages of Official copy).
Office Action received for Japanese Patent Application No. 2017-223021, dated Jul. 30, 2018, 12 pages (6 pages of English Translation and 6 pages of Official copy).
Office Action received for Japanese Patent Application No. 2017-223021, dated Sep. 11, 2020, 20 pages (10 pages of English Translation and 10 pages of Official Copy).
Office Action received for Japanese Patent Application No. 2017-223021, dated Sep. 24, 2019, 6 pages (3 pages of English Translation and 3 pages of Official Copy).
Office Action received for Japanese Patent Application No. 2018-121118, dated Feb. 19, 2021, 17 pages (9 pages of English Translation and 8 pages of Official Copy).
Office Action received for Japanese Patent Application No. 2018-121118, dated May 14, 2019, 10 pages (5 pages of English Translation and 5 pages of Official Copy).
Office Action received for Japanese Patent Application No. 2018-121118, dated Nov. 18, 2019, 10 pages (5 pages of English Translation and 5 pages of Official Copy).
Office Action received for Japanese Patent Application No. 2018-201088, dated Oct. 11, 2019, 9 pages (5 pages of English Translation and 4 pages of Official Copy).
Office Action received for Japanese Patent Application No. 2019-024663, dated Apr. 27, 2020, 8 pages (4 pages of English Translation and 4 pages of Official Copy).
Office Action received for Japanese Patent Application No. 2019-024663, dated Feb. 19, 2021, 8 pages (4 pages of English Translation and 4 pages of Official Copy).
Office Action received for Japanese Patent Application No. 2019-024663, dated Oct. 5, 2020, 7 pages (4 pages of English Translation and 3 pages of Official Copy).
Office Action received for Japanese Patent Application No. 2019-144763, dated Oct. 2, 2020, 6 pages (3 pages of English Translation and 3 pages of Official Copy).
Office Action received for Japanese Patent Application No. 2020-046707, dated Mar. 5, 2021, 8 pages (4 pages of English Translation and 4 pages of Official Copy).
Office Action received for Korean Patent Application No. 10-2011-7026583, dated Oct. 25, 2013, 4 pages (1 page of English Translation and 3 pages of Official Copy).
Office Action received for Korean Patent Application No. 10-2016-7014051, dated Apr. 30, 2018, 14 pages (7 pages of English Translation and 7 pages of Official Copy).
Office Action received for Korean Patent Application No. 10-2016-7014051, dated Jun. 20, 2017, 16 pages (8 pages of English Translation and 8 pages of Official Copy).
Office Action received for Korean Patent Application No. 10-2019-7005262, dated May 3, 2019, 5 pages (2 pages of English Translation and 3 pages of Official Copy).
Office Action received for Korean Patent Application No. 10-2020-7018655, dated Apr. 26, 2021, 9 pages (4 pages of English Translation and 5 pages of Official Copy).
Office Action received for Korean Patent Application No. 10-2020-7018655, dated Oct. 13, 2020, 5 pages (2 pages of English Translation and 3 pages of Official Copy).

Pre-Interview First Office Action received for U.S. Appl. No. 16/270,801, dated Feb. 10, 2020, 5 pages.
Pre-Interview First Office Action received for U.S. Appl. No. 16/270,902, dated Feb. 10, 2020, 5 pages.
"Qualcomm Toq-smartwatch-User Manual", Available Online at: URL:https://toq.qualcomm.com/sites/default/files/qualcomm_toq_user_manual.pdf [retrieved on Jun. 25, 2015], Nov. 27, 2013, pp. 1-38.
Record of Oral Hearing received for U.S. Appl. No. 14/142,640, dated Nov. 20, 2019, 15 pages.
Record of Oral Hearing received for U.S. Appl. No. 14/142,648, dated Mar. 2, 2020, 13 pages.
Record of Oral Hearing received for U.S. Appl. No. 14/261,112, dated Sep. 28, 2020, 20 pages.
Result of Consultation received for European Patent Application No. 08829660.3, dated Nov. 18, 2020, 5 pages.
Result of Consultation received for European Patent Application No. 17210062.0, dated Apr. 20, 2020, 2 pages.
"SilverScreen Theme Library", Online Available at <https://web.archive.org/web/20061113121041/http://www.pocketsensei.com/ss_themes.htm>, Nov. 13, 2006, 3 pages.
"SilverScreen User Guide", Online Available at <https://web.archive.org/web/20061113121032/http://www.pocketsensei.com/ss_guide.htm>, Nov. 13, 2006, 12 pages.
"Smiley Conversion Table", available at <http://surf-style.us/manual3.htm>, Dec. 5, 2008, 8 pages.
Summons to Attend oral proceedings received for European Application No. 09170697.8, mailed on Jul. 29, 2016, 9 pages.
Summons to Attend Oral Proceedings received for European Application No. 09170697.8, mailed on Oct. 19, 2017, 12 pages.
Summons to Attend oral proceedings received for European Patent Application No. 08798713.7, mailed on Mar. 26, 2018, 11 pages.
Summons to Attend Oral Proceedings Received for European Patent Application No. 10762813.3, mailed on Nov. 9, 2016, 9 pages.
Summons to Attend Oral Proceedings received for European Patent Application No. 12189764.9, mailed on Mar. 12, 2020, 11 pages.
Summons to Attend Oral Proceedings received for European Patent Application No. 12189764.9, mailed on May 20, 2020, 11 pages.
Summons to Attend Oral Proceedings received for European Patent Application No. 13795330.3, mailed on Oct. 19, 2018, 13 pages.
Summons to Attend Oral Proceedings received for European Patent Application No. 17210062.0, mailed on Oct. 30, 2019, 7 pages.
Summons to Oral Proceedings received for European Patent Application No. 09170697.8, mailed on Dec. 17, 2020, 4 pages.
Summons to Oral Proceedings received for European Patent Application No. 12194312.0, mailed on Dec. 8, 2016, 9 pages.
Summons to Oral Proceedings received for European Patent Application No. 12194315.3, mailed on Dec. 8, 2016, 9 pages.
"TH8000 Series Programmable Thermostats", Retrieved from the Internet: URL: https://ia802507.us.archive.org/1/items/generalmanual_000075065/generalmanual_000075065.pdf, 2004, 44 pages.
Third Party Proceedings received for European Patent Application No. 17210062.0, mailed on Apr. 23, 2020, 6 pages.
Office Action received from European Patent Application No. 06846840.4, dated Oct. 13, 2008, 3 pages.
Summons to Attend Oral proceedings received for European Patent Application No. 06846840.4, mailed on May 18, 2009, 7 pages.
Decision to Refuse received for European Patent Application No. 07814689.1, dated May 11, 2012, 15 pages.
Office Action received for European Patent Application No. 07814689.1, dated Mar. 4, 2011, 6 pages.
Summons to Attend Oral Proceedings received for European Patent Application No. 07814689.1, mailed on Dec. 1, 2011, 11 pages.
Office Action received for European Patent Application No. 07814690.9, dated Jun. 21, 2010, 5 pages.
Office Action received for European Patent Application No. 07814690.9, dated Oct. 19, 2010, 8 pages.
Summons to Attend Oral Proceedings received for European Patent Application No. 07814690.9, mailed on Nov. 22, 2011, 4 pages.
Office Action received for European Patent Application No. 07841980.1, dated Feb. 23, 2012, 5 pages.
Summons to Attend Oral Proceedings received for European Patent Application No. 07841980.1, mailed on Sep. 28, 2012, 8 pages.

(56) References Cited

OTHER PUBLICATIONS

Office Action received for European Patent Application No. 07869929.5, dated Dec. 27, 2010, 6 pages.
Summons to Attend Oral Proceedings received for European Patent Application No. 07869929.5, mailed on Dec. 13, 2011, 6 pages.
Summons to Attend Oral Proceedings received for European Patent Application No. 07869929.5, mailed on Jan. 23, 2012, 1 page.
Office Action received for European Patent Application No. 08705639.6, dated Dec. 19, 2013, 7 pages.
Communication received for European Patent Application No. 08798713.7, dated Apr. 28, 2010, 2 pages.
Office Action received for European Patent Application No. 08798713.7, dated Feb. 9, 2012, 7 pages.
Office Action received for European Patent Application No. 08798713.7, dated Jul. 29, 2014, 18 pages.
Office Action received for European Patent Application No. 08798713.7, dated Jun. 22, 2011, 10 pages.
Summons to Attend Oral Proceedings received for European Patent Application No. 08798713.7, mailed on Aug. 30, 2013, 15 pages.
Office Action received for European Patent Application No. 08829660.3, dated Aug. 2, 2013, 7 pages.
Office Action received for European Patent Application No. 08829660.3, dated Oct. 15, 2010, 8 pages.
Decision to Refuse received for European Patent Application No. 09170697.8, dated Oct. 23, 2013, 12 Pages.
Extended European Search Report received for European Patent Application No. 09170697.8, dated Apr. 28, 2010, 3 pages.
Office Action received for European Patent Application No. 09170697.8 dated Dec. 13, 2011, 4 pages.
Summons to Attend oral proceedings received for European Application No. 09170697.8 mailed on Apr. 22, 2013, 6 pages.
Decision to Refusal received for European Patent Application No. 09171787.6, dated Dec. 14, 2011, 22 pages.
Extended European Search Report (includes Partial European Search Report and European Search Opinion) received for European Patent Application No. 09171787.6, dated Jan. 26, 2010, 6 pages.
Office Action received for European Patent Application No. 09171787.6, dated Jul. 12, 2011, 5 pages.
Decision to Grant received for European Patent Application No. 09700333.9, dated Nov. 7, 2013, 2 pages.
Intention to Grant received for European Patent Application No. 09700333.9, dated Jun. 20, 2013, 7 pages.
Office Action received for European Patent Application No. 09700333.9, dated Jun. 10, 2011, 5 pages.
Office Action received for European Patent Application No. 09700333.9, dated Nov. 26, 2010, 5 pages.
Summons to Attend Oral Proceedings received for European Patent Application No. 09700333.9, mailed on Sep. 21, 2012, 4 pages.
Office Action received for Taiwan Patent Application No. 097100075, dated Dec. 29, 2011, 5 pages (English Translation only).
Notice of Allowance received for Korean Patent Application No. 10-2009-7007064, dated Sep. 30, 2011, 2 pages.
Notice of Allowance received for Korean Patent Application No. 10-2009-7007067, dated Dec. 1, 2011, 2 pages.
Office Action received for Korean Patent Application No. 10-2009-7007067, dated Aug. 30, 2011, 2 pages (English Translation only).
Office Action received for Korean Patent Application No. 10-2009-7007067, dated Nov. 12, 2010, 3 pages (English Translation only).
Notice of Allowance received for Korean Patent Application No. 10-2010-7007258, dated Nov. 20, 2013, 2 pages.
Office Action received for Korean Patent Application No. 10-2010-7007258, dated Aug. 8, 2011, 2 pages (English Translation only).
Office Action received for Korean Patent Application No. 10-2010-7007258, dated Jan. 30, 2013, 8 pages (4 pages of English Translation and 4 pages of Official Copy).
Notice of Allowance received for Korean Patent Application No. 10-2011-7014104, dated Aug. 29, 2013, 2 pages.
Office Action received for Korean Patent Application No. 10-2011-7014104, dated Jan. 17, 2013, 4 pages (1 page of English Translation and 3 pages of Official Copy).
Notice of Allowance received for Korean Patent Application No. 10-2011-7019633, dated May 18, 2012, 2 pages.
Notice of Allowance received for Korean Patent Application No. 10-2011-7026583, dated Apr. 29, 2015, 3 pages (1 page of English Translation and 2 pages of Official Copy).
Office Action received for Korean Patent Application No. 10-2011-7026583, dated Aug. 14, 2014, 6 pages (2 pages of English Translation and 4 pages of Official Copy).
Notice of Allowance received for Korean Patent Application No. 10-2012-7029270, dated Sep. 23, 2014, 2 pages.
Office Action Received for Korean Patent Application No. 10-2012-7029270, dated Dec. 4, 2013, 4 pages.
Notice of Allowance received for Korean Patent Application No. 10-2014-7011273, dated Apr. 28, 2015, 3 pages (1 page of English Translation and 2 pages of Official Copy).
Office Action received for Korean Patent Application No. 10-2014-7011273, dated Aug. 14, 2014, 5 pages (2 pages of English Translation and 3 pages of Official Copy).
Office Action received for Korean Patent Application No. 10-2014-7036624, dated Jan. 29, 2016, 10 pages (5 pages of office action and 5 pages of English Translation).
Office Action received for European Patent Application No. 10762813.3, dated Mar. 21, 2016, 6 pages.
Final Office Action received for U.S. Appl. No. 11/620,647, dated Dec. 23, 2010, 21 pages.
Non-Final Office Action received for U.S. Appl. No. 11/620,647 dated Jun. 24, 2010, 19 pages.
Non-Final Office Action received for U.S. Appl. No. 11/620,647 dated Nov. 17, 2009, 20 pages.
Non-Final Office Action received for U.S. Appl. No. 11/620,647, dated Oct. 13, 2011, 23 pages.
Notice of Allowance received for U.S. Appl. No. 11/620,647 dated Mar. 2, 2012, 8 pages.
Final Office Action received for U.S. Appl. No. 11/620,687, dated Aug. 18, 2009, 7 pages.
Non-Final Office Action received for U.S. Appl. No. 11/620,687, dated Dec. 22, 2008, 9 pages.
Non-Final Office Action received for U.S. Appl. No. 11/620,687, dated Jan. 11, 2010, 9 pages.
Final Office Action received for U.S. Appl. No. 11/849,938, dated Jan. 30, 2013, 31 pages.
Final Office Action received for U.S. Appl. No. 11/849,938, dated May 27, 2011, 21 pages.
Non-Final Office Action received for U.S. Appl. No. 11/849,938, dated Dec. 14, 2011, 26 pages.
Non-Final Office Action received for U.S. Appl. No. 11/849,938, dated Oct. 12, 2010, 19 pages.
Notice of Allowance received for U.S. Appl. No. 11/849,938, dated Nov. 27, 2013, 2 pages.
Notice of Allowance received for U.S. Appl. No. 11/849,938, dated Oct. 10, 2013, 28 pages.
Final Office Action received for U.S. Appl. No. 11/850,005, dated Jul. 8, 2011, 9 pages.
Final Office Action received for U.S. Appl. No. 11/850,005, dated May 22, 2014, 13 pages.
Final Office Action received for U.S. Appl. No. 11/850,005, dated Nov. 16, 2015, 13 pages.
Final Office Action received for U.S. Appl. No. 11/850,005, dated Sep. 14, 2012, 9 pages.
Non-Final Office Action received for U.S. Appl. No. 11/850,005, dated May 29, 2015, 12 pages.
Non-Final Office Action received for U.S. Appl. No. 11/850,005, dated Mar. 18, 2011, 10 pages.
Non-Final Office Action received for U.S. Appl. No. 11/850,005, dated Nov. 10, 2011, 11 pages.
Non-Final Office Action received for U.S. Appl. No. 11/850,005, dated Oct. 24, 2013, 11 pages.
Final Office Action received for U.S. Appl. No. 11/850,008, dated Dec. 29, 2010, 14 pages.
Non-Final Office Action received for U.S. Appl. No. 11/850,008, dated Aug. 2, 2010, 14 pages.
Notice of Allowance received for U.S. Appl. No. 11/850,008, dated Mar. 11, 2011, 7 pages.

(56) References Cited

OTHER PUBLICATIONS

Final Office Action received for U.S. Appl. No. 11/850,010 dated Oct. 17, 2011, 11 pages.
Final Office Action received for U.S. Appl. No. 11/850,010, dated Apr. 18, 2016, 16 pages.
Final Office Action received for U.S. Appl. No. 11/850,010, dated Feb. 15, 2013, 12 pages.
Final Office Action received for U.S. Appl. No. 11/850,010, dated May 8, 2014, 11 pages.
Non-Final Office Action received for U.S. Appl. No. 11/850,010, dated Dec. 17, 2014, 10 pages.
Non-Final Office Action received for U.S. Appl. No. 11/850,010 dated May 16, 2012, 12 pages.
Non-Final Office Action received for U.S. Appl. No. 11/850,010 dated May 2, 2011, 10 pages.
Non-Final Office Action received for U.S. Appl. No. 11/850,010, dated Jun. 25, 2015, 10 pages.
Non-Final Office Action received for U.S. Appl. No. 11/850,010, dated Oct. 24, 2013, 13 pages.
Final Office Action received for U.S. Appl. No. 11/850,011, dated Dec. 1, 2010, 15 pages.
Non-Final Office Action received for U.S. Appl. No. 11/850,011, dated Aug. 11, 2010, 19 pages.
Notice of Allowance received for U.S. Appl. No. 11/850,011, dated Feb. 11, 2011, 5 pages.
Notice of Allowance received for U.S. Appl. No. 11/850,011, dated Feb. 18, 2011, 4 pages.
Supplemental Notice of Allowance received for U.S. Appl. No. 11/850,011, dated Feb. 24, 2011, 6 pages.
Non-Final Office Action received for U.S. Appl. No. 11/850,013, dated Jun. 11, 2010, 32 pages.
Notice of Allowance received for U.S. Appl. No. 11/850,013, dated Oct. 20, 2010, 20 pages.
Final Office Action received for U.S. Appl. No. 11/850,638, dated Feb. 8, 2011, 14 pages.
Final Office Action received for U.S. Appl. No. 11/850,638, dated May 15, 2012, 16 pages.
Non-Final Office Action received for U.S. Appl. No. 11/850,638, dated Jan. 17, 2012, 15 pages.
Non-Final Office Action received for U.S. Appl. No. 11/850,638, dated Oct. 26, 2010, 17 pages.
Final Office Action received for U.S. Appl. No. 11/961,773, dated Nov. 2, 2011, 12 pages.
Final Office Action received for U.S. Appl. No. 11/961,773, dated Nov. 29, 2012, 15 pages.
Non-Final Office Action received for U.S. Appl. No. 11/961,773, dated Apr. 15, 2011, 21 pages.
Non-Final Office Action received for U.S. Appl. No. 11/961,773, dated May 10, 2012, 14 pages.
Final Office Action received for U.S. Appl. No. 11/969,809, dated Jul. 14, 2011, 26 pages.
Non-Final Office Action received for U.S. Appl. No. 11/969,809, dated Mar. 14, 2011, 25 pages.
Notice of Allowance received for U.S. Appl. No. 11/969,809, dated Apr. 26, 2013, 17 pages.
Final Office Action received for U.S. Appl. No. 11/969,912, dated Oct. 31, 2011, 11 pages.
Non-Final Office Action received for U.S. Appl. No. 11/969,912, dated Apr. 13, 2011, 9 pages.
Non-Final Office Action received for U.S. Appl. No. 11/969,912, dated Sep. 10, 2013, 12 pages.
Notice of Allowance received for U.S. Appl. No. 11/969,912, dated Jun. 11, 2014, 4 pages.
Notice of Allowance received for U.S. Appl. No. 11/969,912, dated Mar. 6, 2014, 12 pages.
Office Action received from German Patent Application No. 112006003600.9, dated Aug. 9, 2011, 4 pages (English Translation only).
Office Action received from German Patent Application No. 112006003600.9, dated Oct. 27, 2009, 9 pages (4 pages of English Translation and 5 pages of Official Copy).
Office Action received for German Patent Application No. 112007002107.1, dated Jun. 7, 2010, 3 pages (English Translation only).
Final Office Action received for U.S. Appl. No. 12/217,029, dated May 22, 2014, 12 pages.
Final Office Action received for U.S. Appl. No. 12/217,029, dated Oct. 5, 2012, 28 pages.
Non-Final Office Action received for U.S. Appl. No. 12/217,029, dated Apr. 18, 2011, 26 pages.
Non-Final Office Action received for U.S. Appl. No. 12/217,029, dated Aug. 19, 2013, 10 pages.
Non-Final Office Action received for U.S. Appl. No. 12/217,029, dated Jan. 25, 2012, 20 pages.
Non-Final Office Action received for U.S. Appl. No. 12/217,029, dated Oct. 28, 2015, 23 pages.
Advisory Action received for U.S. Appl. No. 12/242,851, dated Nov. 15, 2013, 4 pages.
Final Office Action received for U.S. Appl. No. 12/242,851, dated Dec. 12, 2011, 13 pages.
Final Office Action received for U.S. Appl. No. 12/242,851, dated May 10, 2013, 20 pages.
Non-Final Office Action received for U.S. Appl. No. 12/242,851, dated Apr. 15, 2011, 20 pages.
Non-Final Office Action received for U.S. Appl. No. 12/242,851, dated Jun. 26, 2015, 33 pages.
Non-Final Office Action received for U.S. Appl. No. 12/242,851, dated Oct. 6, 2014, 27 pages.
Non-Final Office Action received for U.S. Appl. No. 12/242,851, dated Sep. 20, 2012, 19 pages.
Final Office Action received for U.S. Appl. No. 12/274,346, dated Mar. 14, 2012, 39 pages.
Non-Final Office Action received for U.S. Appl. No. 12/274,346, dated Aug. 26, 2011, 26 pages.
Notice of Allowance received for U.S. Appl. No. 12/274,346, dated Jul. 17, 2013, 10 pages.
Notice of Allowance received for U.S. Appl. No. 12/274,346, dated Mar. 12, 2013, 18 pages.
Final Office Action received for U.S. Appl. No. 12/364,470, dated May 5, 2010, 16 pages.
Final Office Action received for U.S. Appl. No. 12/364,470, dated Oct. 19, 2011, 20 pages.
Non-Final Office Action received for U.S. Appl. No. 12/364,470, dated Mar. 4, 2011, 17 pages.
Non-Final Office Action received for U.S. Appl. No. 12/364,470, dated Nov. 13, 2009, 15 pages.
Non-Final Office Action received for U.S. Appl. No. 12/364,470, dated Sep. 2, 2010, 26 pages.
Final Office Action received for U.S. Appl. No. 12/365,887, dated Feb. 29, 2012, 15 pages.
Non-Final Office Action received for U.S. Appl. No. 12/365,887, dated Aug. 31, 2011, 22 pages.
Notice of Allowance received for U.S. Appl. No. 12/365,887, dated May 23, 2012, 5 pages.
Non-Final Office Action received for U.S. Appl. No. 12/365,888, dated Nov. 10, 2011, 8 pages.
Non-Final Office Action received for U.S. Appl. No. 12/788,278, dated Oct. 16, 2012, 19 pages.
Notice of Allowance received for U.S. Appl. No. 12/788,278, dated May 1, 2013, 8 pages.
Advisory Action received for U.S. Appl. No. 12/888,362, dated Sep. 4, 2015, 3 pages.
Final Office Action received for U.S. Appl. No. 12/888,362, dated Apr. 29, 2015, 12 pages.
Final Office Action received for U.S. Appl. No. 12/888,362, dated Jan. 3, 2013, 13 pages.
Non-Final Office Action received for U.S. Appl. No. 12/888,362, dated Sep. 4, 2014, 10 pages.
Non-Final Office Action received for U.S. Appl. No. 12/888,362, dated Jul. 20, 2012, 15 pages.

(56) References Cited

OTHER PUBLICATIONS

Non-Final Office Action received for U.S. Appl. No. 12/888,366, dated Jul. 31, 2012, 10 pages.
Notice of Allowance received for U.S. Appl. No. 12/888,366, dated Dec. 14, 2012, 11 pages.
Non-Final Office Action received for U.S. Appl. No. 12/888,370, dated Aug. 22, 2012, 13 pages.
Notice of Allowance received for U.S. Appl. No. 12/888,370, dated Feb. 12, 2013, 10 pages.
Notice of Allowance received for U.S. Appl. No. 12/888,370, dated Jul. 1, 2014, 8 pages.
Non-Final Office Action received for U.S. Appl. No. 12/888,373, dated Sep. 10, 2012, 12 pages.
Notice of Allowance received for U.S. Appl. No. 12/888,373, dated Jul. 1, 2014, 8 pages.
Notice of Allowance received for U.S. Appl. No. 12/888,373, dated Feb. 22, 2013, 12 pages.
Final Office Action received for U.S. Appl. No. 12/888,375, dated Nov. 7, 2012, 14 pages.
Non-Final Office Action received for U.S. Appl. No. 12/888,375, dated Jun. 7, 2012, 11 pages.
Non-Final Office Action received for U.S. Appl. No. 12/888,375, dated Sep. 30, 2013, 10 pages.
Final Office Action received for U.S. Appl. No. 12/888,376, dated Feb. 8, 2013, 11 pages.
Non-Final Office Action received for U.S. Appl. No. 12/888,376, dated Aug. 29, 2014, 12 pages.
Non-Final Office Action received for U.S. Appl. No. 12/888,376, dated Oct. 2, 2012, 12 pages.
Notice of Allowance received for U.S. Appl. No. 12/888,376, dated May 29, 2015, 14 pages.
Non-Final Office Action received for U.S. Appl. No. 12/888,377, dated Sep. 13, 2012, 13 pages.
Notice of Allowance received for U.S. Appl. No. 12/888,377, dated Jan. 30, 2013, 12 pages.
Non-Final Office Action received for U.S. Appl. No. 12/981,433, dated Oct. 11, 2012, 29 pages.
Extended European Search Report (includes Partial European Search Report and European Search Opinion) received for European Patent Application No. 12169786.6, dated Jul. 11, 2012, 10 pages.
Extended European Search Report received for European Patent Application No. 12177813.8, dated Feb. 1, 2013, 6 pages.
Extended European Search Report received for European Patent Application No. 12189764.9, dated Jan. 4, 2013, 6 pages.
Office Action received for European Patent Application No. 12189764.9, dated Mar. 1, 2016, 6 pages.
Extended European Search Report received for European Patent Application No. 12194312.0 dated Jan. 16, 2013, 7 pages.
Office Action received for European Patent Application No. 12194312.0, dated Jan. 13, 2014, 4 pages.
Office Action received for European Patent Application No. 12194312.0, dated Oct. 8, 2013, 5 pages.
Extended European Search Report received for European Patent Application No. 12194315.3, dated Jan. 16, 2013, 7 pages.
Office Action received for European Patent Application No. 12194315.3, dated Jan. 13, 2014, 4 pages.
Office Action received for European Patent Application No. 12194315.3, dated Oct. 8, 2013, 5 pages.
Non-Final Office Action received for U.S. Appl. No. 13/104,903, dated Nov. 13, 2012, 9 pages.
Notice of Allowance received for U.S. Appl. No. 13/104,903, dated Apr. 29, 2013, 6 pages.
Non-Final Office Action received for U.S. Appl. No. 13/104,911, dated Feb. 20, 2013, 11 pages.
Notice of Allowance received for U.S. Appl. No. 13/104,911, dated Jun. 10, 2013, 6 pages.
Non-Final Office Action received for U.S. Appl. No. 13/155,304, dated Sep. 5, 2012, 11 pages.
Extended European Search Report (includes Partial European Search Report and European Search Opinion) received for European Patent Application No. 13174706.5, dated Jan. 8, 2015, 8 pages.
Notice of Allowance received for U.S. Appl. No. 14/011,639, dated Sep. 29, 2015, 11 pages.
Notice of Allowance received for U.S. Appl. No. 14/011,639, dated Feb. 16, 2016, 5 pages.
Final Office Action received for U.S. Appl. No. 14/142,640, dated Mar. 8, 2016, 35 pages.
Non-Final Office Action received for U.S. Appl. No. 14/142,640, dated Jun. 5, 2015, 29 pages.
Non-Final Office Action received for U.S. Appl. No. 14/142,648, dated Apr. 12, 2016, 11 pages.
Advisory Action received for U.S. Appl. No. 14/261,112, dated Apr. 23, 2015, 3 pages.
Final Office Action received for U.S. Appl. No. 14/261,112, dated Mar. 3, 2016, 31 pages.
Final Office Action received for U.S. Appl. No. 14/261,112, dated Oct. 9, 2014, 29 pages.
Non-Final Office Action received for U.S. Appl. No. 14/261,112, dated Jul. 8, 2015, 29 pages.
Non-Final Office Action received for U.S. Appl. No. 14/261,112, dated Jun. 18, 2014, 25 pages.
Non-Final Office Action received for U.S. Appl. No. 14/710,125, dated Apr. 12, 2016, 12 pages.
Notice of Allowance received for Canadian Patent Application No. 2,633,759, dated Sep. 9, 2013, 1 page.
Office Action received for Canadian Patent Application No. 2,633,759, dated Aug. 12, 2010, 8 pages.
Office Action received from Canadian Patent Application No. 2,633,759, dated Apr. 18, 2013, 2 pages.
Notice of Allowance received for Canadian Patent Application No. 2,845,297, dated Nov. 10, 2014, 1 page.
Office Action received for Canadian Patent Application No. 2,845,297, dated Apr. 23, 2014, 2 pages.
Grant for Invention Patent Received in Chinese Patent Application No. 200680053441.1, dated Jan. 28, 2011, 1 page.
Office Action received for Chinese Patent Application No. 200680053441.1, dated Nov. 12, 2010, 4 pages (English Translation only).
Office Action received for Australian Patent Application No. 2007289019, dated Jul. 2, 2009, 3 pages.
Office Action received for Australian Patent Application No. 2007289019, dated Oct. 7, 2009, 2 pages.
Notice of Acceptance received for Australian Patent Application No. 2007292383, dated Jan. 4, 2012, 3 pages.
Office Action received for Australian Patent Application No. 2007292383, dated Dec. 22, 2011, 2 pages.
Office Action received for Australian Patent Application No. 2007292383, dated Mar. 24, 2010, 2 pages.
Office Action received for Australian Patent Application No. 2007292383, dated May 12, 2011, 2 pages.
Decision to Grant received for Chinese Patent Application No. 200780001140.9, dated Feb. 3, 2012, 4 pages (2 pages of English Translation and 2 pages of Official copy).
Office Action received for Chinese Patent Application No. 200780001140.9, dated Jan. 15, 2010, 5 pages (English Translation only).
Office Action received for Chinese Patent Application No. 200780001140.9, dated Jun. 10, 2011, 7 pages (English Translation only).
Office Action received for Chinese Patent Application No. 200780041222.6, dated Feb. 29, 2012, 6 pages (3 pages of English Translation and 3 pages of Official copy).
Office Action received for Chinese Patent Application No. 200780041222.6, dated Jul. 25, 2012, 3 pages (English Translation only).
Office Action received for Chinese Patent Application No. 200780041222.6, dated Oct. 13, 2010, 10 pages (English Translation only).
Office Action received for Chinese Patent Application No. 200780041309.3, dated Nov. 1, 2012, 5 pages (English Translation only).

(56) References Cited

OTHER PUBLICATIONS

Office Action received for Chinese Patent Application No. 200780041309.3, dated Jan. 18, 2012, 15 pages (English Translation only).
Office Action received from Chinese Patent Application No. 200780041309.3, dated Jul. 2, 2013, 12 pages (English Translation only).
Office Action received for Chinese Patent Application No. 200780052019.9, dated Feb. 29, 2012, 6 pages (3 pages of English Translation and 3 pages of Official Copy).
Notice of Acceptance received for Australian Patent Application No. 2008296445, dated Dec. 14, 2011, 4 pages.
Office Action received for Australian Patent Application No. 2008296445, dated Oct. 29, 2010, 2 pages.
Office Action received from Japanese Patent Application No. 2008-548858 dated May 30, 2011, 3 pages (English Translation only).
Office Action received from Japanese Patent Application No. 2008-548858, dated Jan. 20, 2012, 5 pages (English Translation only).
Patent Grant received for Japanese Patent Application No. 2008-548858, dated Sep. 24, 2012, 3 pages.
Decision to Grant received for Chinese Patent Application No. 200880110709.X, dated Aug. 6, 2012, 2 pages.
Office Action received for Chinese Patent Application No. 200880110709.X, dated Nov. 24, 2011, 10 pages (6 pages of English Translation and 4 pages of Official Copy).
Office Action received for Chinese Patent Application No. 200880112570.2, dated Aug. 24, 2011, 6 pages (English Translation Only).
Office Action received from Chinese Patent Application No. 200880112570.2, dated Feb. 20, 2013, 7 pages (English Translation only).
Office Action received from Japanese Patent Application No. 2009-51921 dated Jan. 20, 2012, 5 pages (English Translation only).
Notice of Allowance received for Japanese Patent Application No. 2009-051921, dated Jan. 20, 2014, 2 pages.
Office Action received for Japanese Patent Application No. 2009-051921, dated May 31, 2013, 7 pages (3 pages of English Translation and 4 pages of Official Copy).
Office Action received from Japanese Patent Application No. 2009-051921, dated Jun. 27, 2011, 6 pages (English Translation only).
Office Action received from Japanese Patent Application No. 2009-051921, dated Sep. 24, 2012, 3 pages (English Translation only).
Office Action received for Australian Patent Application No. 2009100760, dated Sep. 28, 2009, 2 pages.
Office Action received for Australian Patent Application No. 2009100812, dated Sep. 14, 2009, 2 pages.
Office Action received for Australian Patent Application No. 2009100813, dated Sep. 14, 2009, 2 pages.
Intention to Grant received for Chinese Patent Application No. 200910173272.0, dated Oct. 23, 2012, 1 page (English Translation Only).
Office Action received from Chinese Patent Application No. 200910173272.0, dated Nov. 30, 2011, 8 pages (5 pages of English Translation and 3 pages of Official Copy).
Office Action received for Chinese Patent Application No. 200910175852.3, dated Apr. 24, 2012, 10 pages (6 pages of English Translation and 4 pages of Official Copy).
Office Action received for Chinese Patent Application No. 200910175852.3, dated Jun. 2, 2011, 6 pages (English Translation only).
Notification of Acceptance received for Australian Patent Application No. 2009204252, dated Oct. 17, 2011, 3 pages.
Office Action received for Australian Patent Application No. 2009204252, dated Nov. 28, 2013, 2 pages.
Office Action received for Australian Patent Application No. 2009204252, dated Sep. 16, 2014, 6 pages.
Office Action received for Australian Patent Application No. 2009204252, dated Apr. 20, 2010, 3 pages.
Office Action received for Australian Patent Application No. 2009204252, dated May 18, 2011, 2 pages.
Response to Notice of Opposition filed for Australian Patent Application No. 2009204252, dated Apr. 28, 2014, 4 pages.
Office Action received for Japanese Patent Application No. 2009-527541, dated May 21, 2012, 3 pages (English Translation only).
Office Action received for Japanese Patent Application No. 2009-527541, dated Sep. 26, 2011, 3 pages (English Translation only).
Office Action received for Japanese Patent Application No. 2009-527566, dated Aug. 15, 2011, 3 pages (English Translation only).
Office Action received for Japanese Patent Application No. 2009-527566, dated Sep. 21, 2012, 3 pages (English Translation only).
Notice of Allowance received for Chinese Patent Application No. 200980000229.2, dated Oct. 24, 2014, 4 pages (2 pages of English Translation and 2 pages of Official Copy).
Office Action received for Chinese Patent Application No. 200980000229.2, dated Jan. 6, 2014, 6 pages (3 pages of English Translation and 3 pages of Official Copy).
Office Action received for Chinese Patent Application No. 200980000229.2, dated Jun. 27, 2014, 7 pages (4 pages of English Translation and 3 pages of Official copy).
Office Action received for Chinese Patent Application No. 200980000229.2, dated Nov. 30, 2011, 24 pages (English Translation only).
Office Action received for Chinese Patent Application No. 200980000229.2, dated Oct. 26, 2012, 22 pages (English Translation only).
Office Action received from Chinese Patent Application No. 200980000229.2, dated Jul. 2, 2013, 4 pages (English Translation only).
Office Action received for Chinese Patent Application No. 200980152822.9, dated Dec. 5, 2012, 10 pages (English Translation only).
Office Action received for Chinese Patent Application No. 200980152822.9, dated Oct. 21, 2013, 2 pages (English Translation Only).
Notice of Allowance received for Chinese Patent Application No. 201010592864.9, dated Jan. 30, 2015, 4 pages.
Notice of Acceptance received for Australian Patent Application No. 2010200763, dated Aug. 21, 2012, 1 page.
Office Action received for Australian Patent Application No. 2010200763, dated Jul. 28, 2011, 2 pages.
Notice of Allowance received for Australian Patent Application No. 2010350739, dated Sep. 8, 2014, 2 pages.
Decision to Grant received for Japanese Patent Application No. 2010-524102, dated May 31, 2013, 3 pages.
Office Action received for Japanese Patent Application No. 2010-524102, dated Feb. 13, 2012, 2 pages (English Translation only).
Office Action received for Japanese Patent Application No. 2010-524102, dated Oct. 26, 2012, 4 pages (English Translation only).
Certificate of Examination received for Australian Patent Application No. 2011101190, dated Nov. 23, 2011, 1 page.
Certification of Grant received for Australian Patent Application No. 2011101194, dated Mar. 2, 2012, 2 pages.
Office Action received for Australian Patent Application No. 2011101194, dated Oct. 21, 2011, 2 pages.
Notice of Allowance received for Japanese Patent Application No. 2011-537452, dated Jun. 14, 2013, 3 pages.
Office Action received for Japanese Patent Application No. 2011-537452, dated Jan. 25, 2013, 7 pages (3 pages of English Translation and 4 pages of Official Copy).
Office Action received for Chinese Patent Application No. 201210399033.9, dated Nov. 27, 2014, 7 pages.
Office Action received for Chinese Patent Application No. 201210399033.9, dated Oct. 8, 2015, 8 pages (3 pages of English Translation and 5 pages of Official Copy).
Notice of Acceptance received for Australian Patent Application No. 2012200475, dated Aug. 24, 2015, 2 pages.
Office Action received for Australian Patent Application No. 2012200475, dated Aug. 4, 2015, 3 pages.
Office Action received for Australian Patent Application No. 2012200475, dated Jun. 29, 2015, 3 pages.
Office Action received for Australian Patent Application No. 2012200475, dated Nov. 19, 2013, 4 pages.

(56) References Cited

OTHER PUBLICATIONS

Notice of Acceptance received for Australian Patent Application No. 2012202140, dated May 28, 2014, 2 pages.
Office Action received for Australian Patent Application No. 2012202140, dated Aug. 12, 2013, 2 pages.
Notice of Acceptance received for Australia Patent Application No. 2012261534, dated Jan. 6, 2015, 2 pages.
Office Action received for Australian Patent Application No. 2012261534, dated Dec. 3, 2013, 3 pages.
Office Action received for Japanese Patent Application No. 2013-011209, dated Feb. 7, 2014, 3 pages.
Office Action received for Japanese Patent Application No. 2013-011209, dated Nov. 2, 2015, 9 pages (2 pages of English Translation and 7 pages of Official Copy).
Office Action received for Japanese Patent Application No. 2013-011209, dated Oct. 27, 2014, 3 pages.
Notice of Allowance received for Japanese Patent Application No. 2013-127963, dated Oct. 9, 2015, 3 pages (1 page of English Translation and 2 pages of Official Copy).
Office Action received for Japanese Patent Application No. 2013-127963, dated Aug. 15, 2014, 8 pages (6 pages of English Translation and 2 pages of Official Copy).
Office Action received for Japanese Patent Application No. 2013-127963, dated Mar. 10, 2014, 7 pages (4 pages of English translation and 3 pages of Official copy).
Office Action received for Japanese Patent Application No. 2013-252338, dated Dec. 4, 2015, 4 pages (2 pages of English Translation and 2 pages of official copy).
Office Action received for Japanese Patent Application No. 2013-252338, dated Jan. 30, 2015, 4 pages.
Office Action received for Japanese Patent Application No. 2013-503721, dated Feb. 14, 2014, 8 pages (5 pages of English Translation and 3 pages of Official Copy).
Office Action Received for Japanese Patent Application No. 2013-503721, dated Jun. 6, 2014, 3 pages.
Office Action received for Australian Patent Application No. 2014100582, dated Aug. 7, 2014, 5 pages.
Office Action received for Australian Patent Application No. 2014100582, dated Feb. 4, 2015, 3 pages.
Office Action Received for Japanese Patent Application No. 2014-139095, dated Aug. 17, 2015, 6 pages (3 pages of English Translation and 3 pages of Official Copy).
Office Action received for Australian Patent Application No. 2014204422, dated Aug. 7, 2015, 3 pages.
Office Action received for Japanese Patent Application No. 2014-253365, dated Dec. 14, 2015, 6 pages (3 pages of English Translation and 3 pages Official Copy).
Office Action Received for Australian Patent Application No. 2014274537, dated Aug. 14, 2015, 3 pages.
Office Action received for Australian Patent Application No. 2014274556, dated Aug. 28, 2015, 2 pages.
Office Action received for Japanese Patent Application No. 2015-532193, dated Mar. 22, 2016, 7 pages (3 pages of English Translation and 4 pages of Official Copy).
Agarawala et al., "Database Compendex/EI", Engineering Information, Inc., Apr. 27, 2006, 1 page.
Agarawala et al., "Keepin' It Real: Pushing the Desktop Metaphor with Physics, Piles and the Pen", CHI 2006 Proceedings of the SIGCHI Conference on Human Factors in Computing Systems, Montreal, Quebec, Canada, Apr. 22-27, 2006, pp. 1283-1292.
Agarwal Amit, "iTunesInlineVideo", Digital Inspiration—The Tech Guide, available online at <http://labnol.blogspot.com/2006_09_17_labnol_archive.html>, 2006, 27 pages.
Ahmad et al., "Content-Based Image Retrieval on Mobile Devices", Proceedings of SPIE-IS&T Electronic Imaging, vol. 5684, 2005, pp. 255-264.
Alam et al., "Web Document Manipulation for Small Screen Devices: A Review", BCL Technologies Inc., Proceedings of the 2nd International Workshop on Web Document Analysis, 2003, pp. 33-36.

Alejandre Suzanne, "Graphing Linear Equations", Available at <http://mathforum.org/alejandre/palm/times.palm.html>, retrieved on Jun. 12, 2006, 3 pages.
Andrew's Widgets, "Developing Dashboard Widgets—A Brief Introduction to Building Widgets for Apple's Dashboard Environment", Available online at <http://andrew.hedges.name/widgets/dev/>, Retrieved on Mar. 13, 2015, 6 pages.
Apparao et al., "Level 1 Document Object Model Specification (Version 1.0)", W3C Working Draft, Available online at <http://www.w3.org/TR/WD-DOM/>, Jul. 20, 1998, 3 pages.
Apple, "Iphone User's Guide", iPhone first generation, Available at: <http://pocketpccentral.net/iphone/products/1_g_iphone.htm>, Jun. 29, 2007, 124 pages.
Apple, "iPhone User's Guide", Available at <http://mesnotices.20minutes.fr/manuel-notice-mode-emploi/APPLE/IPHONE%2D%5FE#>, Jun. 2007, 137 pages.
Apple, "Keynote '08 User's Guide", © Apple Inc., 2008, 204 pages.
Apple Computer, Inc., "Dashboard Tutorial", Apple Computer, Inc. © 2004, 2006, Jan. 10, 2006, 24 pages.
Apple Computer, Inc., "Welcome to Tiger", available at <http://www.maths.dundee.ac.uk/software/Welcome_to_Mac_Os_X_v10.4_Tiger.pdf>, 2005, pp. 1-32.
Apple Iphone School, "Customize 1.19 Update for the iPhone", 4:02 minutes video, available at <http://www.youtube.com/watch?v=5ogDzOM89oc>, uploaded on Dec. 8, 2007, 2 pages.
Apple Iphone School, "SummerBoard 3.0a9 for iPhone", 4:50 minutes video, available at <http://www.youtube.com/watch?v=s_P_9mrZTKs>, uploaded on Oct. 21, 2007, 2 pages.
apple.com, "Tiger Developer Overview Series—Developing Dashboard Widgets", Available online at <http://developer.apple.com/macosx/dashboard.html>, Jun. 26, 2006, 9 pages.
Barsch Bill, "3D Desktop! TouchScreen and XGL on Linux!", 2:42 minutes video, available at <http://www.youtube.com/watch?v=Yx9FgLr9oTk>, uploaded on Aug. 15, 2006, 2 pages.
Baudisch et al., "Collapse-to-Zoom: Viewing Web Pages on Small Screen Devices by Interactively Removing Irrelevant Content", Microsoft Research Available at <http://www.patrickbaudisch.com/publications/2004-Baudisch-UIST04-CollapseToZoom.pdf>, Oct. 27, 2004, 4 pages.
Berka, "iFuntastic 3 Opens Up New iPhone Functionality", ars technica, Available at: <http://arstechnica.com/journals/apple.ars/2007/08/30/ifuntastic-3-opens-up-new-iphone-functionality>, Aug. 30, 2007, 2 pages.
Bitstream®, "ThunderHawk Pocket PC Edition for End Users", Available at <http://www.bitstream.com/wireless/products/pocketpc/faq_using.html>, retrieved on Jun. 12, 2006, 4 pages.
Blickenstorfer Conradh., "NeoNode N1 Can a Unique Interface Put this Compelling Smart Phone on the Map?", available at <http://pencomputing.com/WinCE/neonode-n1-review.html>, retrieved on Sep. 1, 2014, 5 pages.
Blickenstorfer Conrad H., "Neonode N2 a new version of the phone that pioneered touchscreens", Pen Computing Magazine, Online Available at: http://www.pencomputing.com/WinCE/neonode-n2-review.html, Nov. 4, 2007, 9 pages.
Bos et al., "3 Conformance: Requirements and Recommendations", Cascading Style Sheets, level 2 CSS2 Specification, W3C Recommendation, available at <http://www.w3.org/TR/CSS21/conform.html#doctree>, May 12, 1998, 6 pages.
Bott et al., "Table of Contents/Chapter 20: Putting Pictures on Folder Icons", Microsoft Windows XP Inside Out Deluxe, Second Edition http://proquest.safaribooksonline.com/book/operating-systems/9780735642171, Oct. 6, 2004, pp. 1-8 and 669.
Buyukkokten et al., "Power Browser: Efficient Web Browsing for PDAs", Proceedings of the SIGCHI conference on Human Factors in Computing Systems, 2000, 8 pages.
Office Action received for Canadian Patent Application No. 2,633,759, dated Apr. 2, 2009, 5 pages.
Office Action received for Canadian Patent Application No. 2,633,759, dated Dec. 10, 2009, 6 pages.
Cerulean Studios, "Trillian Online User Manual", available at <http://www.ceruleanstudios.com/support/manual.php?hchap=4&hsub=1&hsect=5>, 2006, 11 pages.

(56) References Cited

OTHER PUBLICATIONS

Cha Bonnie, "HTC Touch Diamond (Sprint)", CNET Reviews, available at <http://www.cnet.com/products/htc-touch/>, updated on Sep. 12, 2008, 8 pages.
Chang et al., "Animation: From Cartoons to the User Interface", UIST '93 Proceedings of the 6th Annual ACM Symposium on User Interface Software and Technology, Nov. 1993, pp. 45-55.
Chartier David, "iPhone 1.1.3 Video Brings the Proof", ars TECHNICA, Available online at <http://arstechnica.com/journals/apple.are/2007/12/30/iphone-1-1-3-video-brings-the-proof>, Dec. 30, 2007, 3 pages.
Chen et al., "A Novel Navigation and Transmission Technique for Mobile Handheld Devices", Technical Report CSE-2003-1, Department of Computer Science, University of California at Davis, 2003, 8 pages.
Chen et al., "Detecting Web Pages Structure for Adaptive Viewing on Small Form Factor Devices", Proceedings of the 12th international conference on World Wide Web, 2003, 9 pages.
Chen et al., "DRESS: A Slicing Tree Based Web Representation for Various Display Sizes", Microsoft Research, Technical Report, Nov. 16, 2002, 9 pages.
Clifton Marc, "Detect if Another Process is Running and Bring it to the Foreground", Online Available at : https://www.codeproject.com/Articles/2976/Detect-if-another-process-is-running-andbring-it, Sep. 30, 2002, 6 pages.
Office Action received from Chinese Patent Application No. 200680053441.1, dated Mar. 30, 2010, 5 pages.
CNET, "Bounding Box", available at <http://www.cnet.com/Resources/Info/Glossary/Terms/boundingbox.html>, retrieved on Dec. 29, 2008, 1 page.
CNET, "Fujitsu LifeBook B6110D", Reviews, Nov. 24, 2005, 2 pages.
CNET, "Video: Create Custom Widgets with Web Clip", CNET News, Available at <http://news.cnet.com/1606-2-6103525.html>, Aug. 8, 2006, 3 pages.
cocoabuilder.com, "Single Instance of a Cocoa Application", Available at: http://www.cocoabuilder.com/archive/cocoa/167892-single-instance-of-cocoa-application.html, Jul. 19, 2006, 4 pages.
Collomb et al., "Improving drag-and-drop on wall-size displays", proceedings of Graphics Interlace, May 9, 2005, pp. 25-32.
Cooper Alan, "The Inmates Are Running the Asylum", Sams Publishing, Mar. 23, 1999, pp. 138-147.
Deanhill, "Run a Program or Switch to an Already Running Instance", Available Online at <https://autohotkey.com/board/topic/7129-run-a-program-or-switch-to-an-already-running-instance/>, Feb. 1, 2006, 16 pages.
Dearman et al., "Rendezvousing with Location-Aware Devices: Enhancing Social Coordination", Interacting with Computers, vol. 17, Issue 5, available at <http://www.dgp.toronto.edu/~dearman/publications/dearman_IWC05.pdf>, Sep. 2005, pp. 542-566.
Delltech, "Windows XP: The Complete Reference: Working with Graphics", http://web.archive.org/web/20050405151925/http:/delltech.150m.corn/XP/graphics/3.htm, Chapter 18,, Apr. 5, 2005, 4 pages.
Dodge et al., "Microsoft Office Excel 2003 Office Manual", Microsoft Press. vol. 1, Unable to Locate English Translation, Jul. 12, 2004, 5 pages.
Domshlak et al., "Preference-Based Configuration of Web Page Content", Proceedings of the 17th Int'l Joint Conf. on Artificial Intelligence (IJCAI), Seattle, W A, Aug. 4-10, 2001, pp. 1451-1456.
Edwards, "iPhone 1.1.3 Firmware Feature Gallery", Gear Live, Available at: <http://www.gearlive.com/news/article/q407-iphone-113-firmware-feature-gallery/>, Dec. 28, 2007, 7 pages.
Elo, "Touchscreen User Manual, Elo Projected Capacitance Driver Software Version 1.00 (Serial)", Elo TouchSystems, Inc., Dec. 30, 2005, 37 pages.
Expansystv, "HTC Touch Dual Demonstration by eXpansys", 5:26 minutes video, available at <http://www.youtube.com/watch?v=Tupk8MYLhMk>, uploaded on Oct. 1, 2007, 2 pages.
Eyemodule Springboard Compatible, "Turn Your Handspring™ Visor™ Handheld into a Digital Camera", User's Manual, 2000, 9 pages.

Fadhley Mohdn., "LauncherX", Online Available at <http://www.palmx.org/mambo/index2.php?option=com_content&task=view&id=65&1temid>, Nov. 21, 2002, 3 pages.
Farber Dan, "Jobs: Today Apple is Going to Reinvent the Phone", ZDNet, available at <http://www.zdnet.com/blog/btl/jobs-today-apple-is-going-to-reinvent-the-phone/4249>, Jan. 9, 2007, 3 pages.
Feist Jonathan, "Android customization—how to create a custom clock widget using Zooper Widget", Available Online at: https://www.androidauthority.com/zooper-widget-clock-366476/, May 15, 2014, 10 pages.
Fingerworks Forums, "Is the Multitouch Lemur?", Available at <http://64233.167.104/search?q=cache:sjVdtyFBvRMJ:forums.finger>, Dec. 24, 2004, 2 pages.
Fingerworks, Inc., "Installation and Operation Guide for the Touchstream and TouchStream LP", available at <http://www.fingerworks.com>, 2002, pp. 1-25.
Fingerworks, Inc., "Quick Reference Guide for iGesture Products", available at <http://www.fingerworks.com>, 1999-2002, 2 pages.
Fingerworks, Inc., "Quick Reference Guide for Touch Stream ST/LP", available at <http://www.fingerworks.com>, 2001-2003, 4 pages.
Fingerworks, Inc., "Touchstream LP Silver", available at <http://www.fingerworks.com>, Apr. 27, 2005, 18 pages.
Fondantfancies, "Dash Clipping: Don't Wait for Mac OS X 10.5 Leopard", fondantfancies.com, Available online at: <http://www.fondantfancies.com/blog/3001239/>, retrieved on Sep. 3, 2009, 9 pages.
Forsberg et al., "Aperture Based Selection for Immersive Virtual Environments", Proceedings of the ACM Symposium on User Interface Software and Technology, 1996, 2 pages.
Foxit, "Foxit Reader v. 1.3 Feature Description", available at <http://www.foxitsoftware.com/pdf/reader 2/verhistory.htm>, 2008, 4 pages.
Fujitsu Ltd, "SX/G Manual of Icons on Desktop, Edition 14/14A V14", 1st Edition, Mar. 27, 1998, 4 pages.
Gade Lisa, "Sprint HTC Touch", Smartphone Reviews by Mobile Tech Review, Available online at <http://www.mobiletechreview.com/phones/HTC-Touch.htm>, Nov. 2, 2007, 7 pages.
Gears Leigh, "Orange SPV C600 Review", Available at <http://www.coolsmartphone.com/article569.html>, retrieved on Apr. 14, 2006, 57 pages.
Getgreg,"Jeff Han's Multiple Touch Point Display, the Stuff Dreams are Made of", Available at <http://www.theyshoulddothat.com/2006/08/jeff_hanns_multiple_touch_poin.html>, Aug. 16, 2006, 2 pages.
GSM Arena, "Neonode N2 User Interface", 3:06 minutes video, available at <https://www.youtube.com/watch?v-MfDMHmlZRLc>, uploaded on Feb. 13, 2007, 2 pages.
Gsmarena Team, "HTC Touch Review: Smart to Touch the Spot", available at <http://www.gsmarena.com/htc_touch-review-189.php>, Nov. 28, 2007, 18 pages.
Gsmarena Team, "HTC Touch review", Online Available at: <twww.gsmarena.com/htc_touch-review-189p3.php>, Nov. 28, 2007, 5 Pages.
Guan et al., "Zoom Selector: A Pen-based Interaction Technique for Small Target Selection", Transactions of the Information Processing Society of Japan, vol. 45, No. 8, Aug. 2004, pp. 2087-2097.
Han Jeff, "Talks Jeff Han: Unveiling the Genius of Multi-touch Interface Design", Ted Ideas Worth Spreading, available at <http://www.ted.com/index.php/talks/view/id/65> Aug. 2006, 2 pages.
Hart Kim, "Rewriting the Web for Mobile Phones", washingtonpost.com, available at <http://www.washingtonpost.com/wp-dyn/content/article/2006/07/25/AR2006072501517_pf.html>, Jul. 26, 2006, 2 pages.
Hayama et al., "To change images of scaled-down representation", Windows XP SP3 & SP2, Dec. 1, 2008., 6 pages (2 pages of English Translation and 4 pages of official Copy).
Hesseldahl Arik, "An App the Mac can Brag About", Forbes.com, Available at <http://www.forbes.com/2003/12/15/cx_ah_1215tentech_print.html>, Dec. 15, 2003, 4 pages.
Higuchi Tadahiro, "Try API!, Making a cool application with Visual Basic 6.0", 1st edition, Japan, AI Publishing, AI Mook 221, Jul. 16, 1999, 23 pages.
Hinckley et al., "Input/Output Devices and Interaction Techniques", CRC Press, Nov. 2004, pp. 1-79.

(56) References Cited

OTHER PUBLICATIONS

Holmquist Larse., "The Zoom Browser Showing Simultaneous Detail and Overview in Large Documents", Human IT, Available at: <http://www.hb.se/bhs/ith/3-98/leh.htm>, 1998, 12 pages.
Huang et al., "Effects of Visual Vibratory Perception by Cross-Modali Matching with Tactile Sensation", Retrieved from the Internet:<URL:http://media.nuas.ac.jp/~robin/Research/ADC99.html>, 1999, pp. 1-7.
Infoworld Video, "Two Geeks and an iPhone: Part 3", available at <http://web.archive.org/web/20080124065641/http:/www.infoworld.com/video/interviews/Mobile-Tech-Apple-iPhone/Two-Geeks-and-an-iPhone-Part-3/video_1966.html>, Dec. 18, 2007, 2 pages.
Iphone Dev Wiki, "IPhone Customization", Available at: <http://iphone.fivefony.net/wiki/index.php/Iphone_Customization>, Dec. 13, 2007, 7 pages.
Iphone Hacks, "iPhone Firmware 1.1.1: Multi-Page SpringBoard Hack", Available at: <http://www.iphonehacks.com/2007/10/springboardhack.html>, Oct. 9, 2007, 4 pages.
Iphone Hacks, "SummerBoard for iPhone OS v1.1.1: iPhone Hack Enables Scrolling of iPhone's Home Screen", Available at: <http://www.iphonehacks.com/2007/10/summerboard-v3.html>, Dec. 2007, 3 pages.
Iphone Info, "Modifying the iPhone SpringBoard", Available at: <http://iphoneinfo.ca/modifying-the-iphone-springboard>, Dec. 2007, 6 pages.
Jazzmutant, "Jazzmutant Lemur", Available at <http://64.233.167.104/search?a=cache:3g4wFSaZiXIJ:www.nuloop.c, Nov. 16, 2005, 3 pages.
Jazzmutant, "The Lemur: Multitouch Control Surface", Available at <http://64233.167.104/search?q=cache:j0_nFbNVzOcJ:www.cycling7>, retrieved on Nov. 16, 2005, 3 Pages.
Jobs Steve, "iPhone Introduction in 2007 (Complete)", available at <https://www.youtube.com/watch?v=9hUlxyE2Ns8>, Jan. 10, 2013, 3 pages.
Joire Myriam, "Neonode N1m Review", available at <http://www.youtube.com/watch?v=Tj-KS2kflr0>, Jun. 29, 2007, 3 pages.
Karlson et al., "AppLens and LaunchTile: Two Designs for One-Handed Thumb Use on Small Devices", Powerpoint Presentation, CHI 2005, pp. 1-17.
Karlson et al., "AppLens and LaunchTile: Two Designs for One-Handed Thumb Use on Small Devices", CHI 2005, Papers: Small Devices 1, Apr. 2-7, 2005, pp. 201-210.
Khella et al., "Pocket PhotoMesa: A Zoomable Image Browser for PDAs", Proceedings of the 3rd International Conference on Mobile and Ubiquitous Multimedia, available at <http://delivery.acm.org/10.1145/1060000/1052384/p19-khella.pdf?key1=1052384&key2=2419987911&co1=GUIDE&d1=GUIDE&CFID=47073625&CFTOKEN=65767142>, Oct. 29, 2004, 2 pages.
Kinoma, "Kinoma Player 4 EX Documentation", Available at <http://replay.waybackmachine.org/20061101175306/http://www.kinoma.com/index/pd-player-4>, Nov. 1, 2006, 28 pages.
Kondo Daisuke, "Windows XP Tablet PC Edition Quick Review Challenging by Microsoft", PCfan No. 9, No. 28, Japan, Mainichi Communication, Oct. 15, 2002, pp. 12-17.
Laakko et al., "Adapting Web Content to Mobile User Agents", IEEE Internet Computing, vol. 9, No. 2, Mar./Apr. 2005, pp. 46-53.
Landragin Frédéric, "The Role of Gesture in Multimodal Referring Actions", Proceedings of the 4th IEEE International Conference on Multimodal Interfaces, available at <http://ieeexplore.iee.org/ie15/8346/26309/01166988pdf?arnumber=1166988>, 2002, 6 pages.
Lie Håkonw., "Cascading Style Sheets (chpt 8 CSS for small screens)", Online Available at <http://people.opera.com/howcome/2006/phd/css.pdf> University of Osloensis, MDCCCXI, pp. 243-247, Retrieved on Dec. 14, 2007, 2005, 8 pages.
Mac People, "Useful Technique for Web Browser", Ascii Media Works Inc., vol. 15, No. 6, Jun. 1, 2009, pp. 36-47.
Macworld, "First Look: Leopard first looks: Dashboard", Available at: <http://www.macworld.com/article/52297/2005/08/leodash.html>, Aug. 9, 2006, 3 pages.
Macworld, "Whip up a widget", Available at: <http://www.macworld.com/article/46622/2005/09/octgeekfactor.html>, Sep. 23, 2005, 6 pages.
McGuffin et al., "Acquisition of Expanding Targets", ACM, Apr. 20-25, 2002, 8 pages.
Mello, Jr J., "Tiger's Dashboard Brings Widgets to New Dimension", MacNewsWorld, Available at: <http://www.macnewsworld.com/story/42630.html>, Retrieved on Jun. 23, 2006, 3 pages.
Microsoft, "Working screenshot of Microsoft Office 2003", Aug. 19, 2003, 14 pages.
Microsoft Help and Support, "How to Arrange or Move Icons on the Desktop", http://support.microsoft.com/kb/289587, Mar. 29, 2007, 2 pages.
Microsoft Word, "Example of Scrolling Pages in Word 2003", 2003, 3 pages.
microsoft.com, "Right-Clicking with a Pen", microsoft. Available at: http://www.microsoft.com/windowsxp/using/tabletpc/learnmore/rightclick.mspx, Nov. 7, 2002, 3 pages.
Milic-Frayling et al., "SmartView: Enhanced Document Viewer for Mobile Devices", Microsoft Technical Report, available at <ftp://ftp.research.microsoft.com/pub/tr/tr-2002-114.pdf>, Nov. 15, 2002, 10 pages.
Milic-Frayling et al., "SmartView: Flexible Viewing of Web Page Contents", Proceedings of the Eleventh International World Wide Web Conference, available at http://www2002.org/CDROM/poster/172/, May 11, 2002, 4 pages.
Miller Matthew, "HTC Touch and Touch FLO Interface", 7:53 minutes video, available at <http://www.youtube.com/watch?v=6oUp4wOcUc4>, uploaded on Jun. 6, 2007, 2 pages.
Mobilissimo.Ro, "HTC Touch—Touch FLO Demo", Online Available at: >>https://www.youtube.com/watch?v=YQ8TQ9Rr_7E>, Jun. 5, 2007, 1 page.
Mountfocus Information Systems, "An Onscreen Virtual Keyboard: touchscreen, kiosk and Windows compatible", Available at: http://www.virtual-kevboard.com, Dec. 19, 2007, 3 pages.
Nakata Atsushi, "Tablet PC aiming at spread pen input by changing target user", Nikkei Windows for IT Professionals, Nikkei Business Publications, Inc. No. 69., Dec. 1, 2002, pp. 14-16.
Naver Blog, "iPhone iOS 4 folder management", Jun. 27, 2010, 2 pages.
Neonode Inc., "Welcome to the N1 Guide", available at <http://www.ebookspdf.com/gadget/2818/neonode-n1m-manual/>, Jul. 2004, pp. 1-42.
Nishida et al., "Drag-and-Guess: Drag-and-Drop with Prediction", INTERACT'07 Proceedings of the 11th IFIP TC 13 International Conference on Human-Computer interaction, Sep. 10, 2007, pp. 461-474.
NTT Docomo, "i-mode Compatible Pictograms", available at <http://www.nttdocomo.co.jp/english/service/imode/make/content/pictograph/index.html>, 2008, 2 pages.
O'Hara, "Absolute Beginner's Guide to Microsoft Window XP", Que Publishing, 2003, 1 page.
Oliver Dick, "Adding Multimedia to Your Web Site", Chapter 22, Web Publishing Professional Reference Edition, Available online at <http://www.ssuet.edu.pk/taimoor/books/1-57521-198-X/index.htm>, 1997, 14 pages.
Opera Software, "Download the Opera Mobile™ Browser", Available at <http://www.opera.com/products/mobile/products/>, retrieved on Oct. 19, 2006, 5 pages.
Opera Software, "Opera 7.60 for Series 60 Mobile", Available at <http://jp.opera.com/support/tutorials/s60/760/O760manual.pdf>, 2009, 14 pages.
Opera Software, "Opera 8.5 Beta 2 for Windows Mobile, Pocket PC", Available at <http://www.opera.com/products/mobile/products/winmobileppc>, retrieved on Apr. 5, 2006, 2 pages.
Opera Software, "Opera 8.5 for S60 Phones—Get the Full Internet Experience on Your Mobile Phone", Available at <http://www.symbian-freak.com/news/1105/opera.htm>, Oct. 14, 2005, 3 pages.
Opera Software, "Opera for Mobile, The Full Web Anytime, Anywhere", Available at <www.opera.com/mobile>, Jan. 2006, 7 pages.
Opera Software, "Opera for S60 Tutorial", Available at <http://www.xmarks.com/site/www.opera.com/support/tutorials/s60/>, retrieved on Apr. 5, 2006, 5 pages.

(56) References Cited

OTHER PUBLICATIONS

Opera Software, "Opera for Windows Mobile Smartphone 2003 Tutorial", Available at <http://www.opera.com/support/tutorials/winmobile>, retrieved on Apr. 5, 2005, 4 pages.
Opera Software, "The New Opera Browser for Series 60 Features Zoom and Password Manager", Press Releases Database, Available at <http://pressreleases.techwhack.com/1334/1411-opera-browser-features-zoom-and-password>, Nov. 14, 2005, 3 pages.
Opera Software, "Welcome to Widgetize", Copyright © 2006 Opera Software ASA, Available at: <http://widgets.opera.com/widgetize>, 2006, 1 page.
Palme et al., "MIME Encapsulation of Aggregate Documents, such as HTML", Network Working Group, 1999, 24 pages.
Palmone, "Your Mobile Manager", Chapter 2, LifeDrive™ User's Guide, available at <http://www.palm.com/us/support/handbooks/lifedrive/en/lifedrive_handbook.pdf>, 2005, 23 pages.
Park Will, "Apple iPhone v1.1.1 SpringBoard Hacked to Display Multiple Pages", available at <http://www.intomobile.com/2007/10/09/apple-iphone-v111-springboard-hacked-to-display-multiple-pages/>, Oct. 9, 2007, 5 pages.
Park Will, "Neonode N2 Unboxing Pics!", available at <http://www.intomobile.com/2007/07/18/neonode-n2-unboxing-pics/>, Jul. 18, 2007, 7 pages.
Pcfan, "Boot Camp Introduction/Data Transition/Operability/Ability Truth Derived from Gap Mac&Win Dual Boot Hard Verification", Daily Communications, vol. 13, No. 14, Jun. 15, 2006, 4 pages.
International Preliminary Report on Patentability received for PCT Patent Application No. PCT/US2006/062685, dated Jul. 1, 2008, 6 pages.
International Search Report and Written Opinion received for PCT Patent Application No. PCT/US2007/077638, dated Feb. 19, 2008, 9 pages.
International Preliminary Report on Patentability received for PCT Patent Application No. PCT/US2007/077639, dated Mar. 10, 2009, 6 pages.
International Search Report and Written Opinion received for PCT Patent Application No. PCT/US2007/077639, dated Jul. 8, 2008, 7 pages.
International Preliminary Report on Patentability received for PCT Patent Application No. PCT/US2007/077643, dated Mar. 10, 2009, 7 pages.
International Search Report and Written Opinion received for PCT Patent Application No. PCT/US2007/077643, dated May 8, 2008, 9 pages.
International Search Report and Written Opinion received for PCT Patent Application No. PCT/US2007/077644, dated May 30, 2008, 18 pages.
Invitation to pay additional fees received for PCT Patent Application No. PCT/US2007/077644, dated Jan. 23, 2008, 10 pages.
International Search Report and Written Opinion received for PCT Patent Application No. PCT/US2007/077773, dated Jan. 15, 2008, 8 pages.
International Search Report and Written Opinion received for PCT Patent Application No. PCT/US2007/088879, dated Jun. 30, 2008, 8 pages.
International Search Report and Written Opinion received for PCT Patent Application No. PCT/US2007/088893, dated Jul. 11, 2008, 10 pages.
International Preliminary Report on Patentability received for PCT Patent Application No. PCT/US2008/050430, dated Jul. 7, 2009, 10 pages.
International Search Report and Written Opinion received for PCT Patent Application No. PCT/US2008/050430, dated Sep. 1, 2008, 13 pages.
Invitation to Pay Additional Fees Received received for PCT Patent Application No. PCT/US2008/050430, dated Jun. 27, 2008, 7 pages.
International Preliminary Report on Patentability received for PCT Patent Application No. PCT/US2008/050431, dated Jul. 7, 2009, 8 pages.
International Search Report and Written Opinion received for PCT Patent Application No. PCT/US2008/050431, dated Jun. 17, 2008, 10 pages.
International Preliminary Report on Patentability received for PCT Patent Application No. PCT/US2008/074341, dated Mar. 9, 2010, 8 pages.
International Search Report and Written Opinion received for PCT Patent Application No. PCT/US2008/074341, dated Nov. 27, 2009, 12 pages.
International Preliminary Report on Patentability received for PCT Patent Application No. PCT/US2008/074625, dated Mar. 9, 2010, 6 pages.
International Search Report and Written Opinion received for PCT Patent Application No. PCT/US2008/074625, dated Jan. 8, 2009, 8 pages.
International Preliminary Report on Patentability received for PCT Patent Application No. PCT/US2009/030225, dated Jul. 15, 2010, 10 pages.
International Search Report and Written Opinion received for PCT Patent Application No. PCT/US2009/030225, dated Feb. 25, 2010, 15 pages.
Invitation to Pay Additional Fees Received received for PCT Patent Application No. PCT/US2009/030225, dated Nov. 16, 2009, 4 pages.
International Preliminary Report on Patentability received for PCT Patent Application No. PCT/US2010/050056, dated Oct. 18, 2012, 21 pages.
International Search Report and Written Opinion received for PCT Patent Application No. PCT/US2010/050056, dated May 13, 2011, 26 pages.
Invitation to Pay Additional Fees received for PCT Patent Application No. PCT/US2010/050056, dated Jan. 5, 2011, 5 pages.
International Preliminary Report on Patentability received for PCT Patent Application No. PCT/US2013/067634, dated May 12, 2016, 9 pages.
International Search Report and Written Opinion received for PCT Patent Application No. PCT/US2013/067634, dated Apr. 16, 2014, 11 pages.
International Preliminary Report on Patentability received for PCT Patent Application No. PCT/US2014/040414, dated Dec. 23, 2015, 10 pages.
International Search Report and Written Opinion received for PCT Patent Application No. PCT/US2014/040414, dated Sep. 16, 2014, 12 pages.
pocketgear.com, "Software Keyboards: Efzy-Japanese (Eng/Jp) 4.0", TimeSpacesystem Co. Ltd, available at <http://classic.pocketgear.com/softwaredetail.asp?id=9115>, updated on Sep. 23, 2008, 9 pages.
Potter, "Graffiti Smilies", Palminfocenter Forums, available at <http://www.palminfocenter.com/forum/viewtopic.php?t=11307>, Feb. 9, 2003, 5 pages.
Raman et al., "Application-Specific Workload Shaping in Multimedia-Enabled Personal Mobile Devices", CODES+ISSS, Oct. 22-25, 2006, pp. 4-9.
Realnetworks, "Transition Effects", RealNetworks Production Guide, Available at: <http://service.real.com/help/library/guides/productionguidepreview/HTML/htmflles/transit.htm>, 2001, 21 pages.
Ren et al., "The Adaptive Hybrid Cursor: A Pressure-Based Target Selection Technique for Pen-Based User interfaces", INTERACT '07, Proceedings of the 11th IFIP TC 13 International Conference on Human-Computer Interaction, Sep. 10, 2007, 14 pages.
Robie Jonathan, "What is the Document Object Model?", Texcel Research, available at <http://www.w3.org/TR-DOM/introduction.html>, 2006, 5 pages.
Rohrer Tim, "Metaphors We Compute by: Bringing Magic into Interface Design", Available online at <http://www.uoregon.edu/-uophil/metaphor/gui4web.htm>, retrieved on Jun. 13, 2006, 7 pages.
Roto et al., "Minimap—A Web Page Visualization Method for Mobile Phones", Proceedings of the SIGCHI Conference on Human Factors in Computing Systems, Apr. 22-27, 2006, pp. 35-44.

(56) References Cited

OTHER PUBLICATIONS

Sadun, "Erica's Documentation: Applications and Utilities for the iPhone and iPod Touch", Copyright 2007, Available at: <http://ericasadun.com/ftp/Deprecated/Documentation/Manual-0.04.pdf>, 2007, 22 pages.
Sadun Erica, "1.1.1 iPhone Multipage Springboard Hack", Available at: <http://www.tuaw.com/2007/10/09/1-1-1-iphone-multipage-springboard-hack/>, Oct. 9, 2007, 3 pages.
Sadun Erica, "Found Footage: Scrolling iPhone Dock Smashes Through 16-icon Home Screen Limit", The Unofficial Apple Weblog, available at <http://www.tuaw.com/2007/08/30/found-footage-scrolling-iphone-dock-smashes-through-16-icon-hom/>, Aug. 30, 2007, 3 pages.
Salmre I., "Characteristics of Mobile Applications", Chapter 2, Salmre_02.fm, Dec. 20, 2004, pp. 19-36.
Schreiner Tony, "High DPI in IE: Tip & Mystery Solved", Tony Schreiner's Blog, available at <http://blogs.msdn.com/tonyschr/archive/2004/05/05/126305.aspx>, May 2004, 2 pages.
Sharewareconnection, "Handy Animated Emoticons", available at <http://www.sharewareconnection.com/handy-animated-emoticons.htm>, Jul. 2007, 3 pages.
Shima et al., "Android Application-Development", From basics of development to mashup/hardwareinteraction, a road to "takumi" of Android application-development, Section I, difference from prior platforms, things which can be done with Android, SoftwareDesign, Japan, Gijutsu-Hyohron Co., Ltd., Issue vol. 287 (No. 221), Mar. 18, 2009, pp. 58-65.
Shiota Shinji, "Special Developer's Story", DOS / V magazine, vol. 13, No. 10, Jun. 1, 2004, 12 pages.
snapfiles.com, "Dexpot", Snapfiles, Oct. 10, 2007, 3 pages.
Stampfli Tracy, "Exploring Full-Screen Mode in Flash Player 9", Available online at <http://www.adobe.com/devnet/flashplayer/articles/full_screen_mode.html>, Nov. 14, 2006, 2 pages.
Stanek et al., "Video and Animation Plug-Ins", Chapter 9, Web Publishing Professional Reference Edition, available online at <http://www.ssuet.edu.pk/taimoor/books/1-57521-198-X/index.htm>, 1997, 18 pages.
Stinson Craig, "Windows 95 Official Manual, ASCII Ltd.", ver.1,, Mar. 1, 1996, 6 pages (Official copy only).
Surfin'Safari, "XUL", Available online at <http://weblogs.mozillazine.org/hyatt.archives/2003_10.html>, Oct. 2003, 7 pages.
Takahashi Masaaki, "Inside Macintosh, Mystery of File V, Mystery of Drag & Drop", NikkeiMAC, Nikkei Business Publications Inc., vol. 17, Aug. 15, 1994, 9 pages.
Thomas et al., "Applying Cartoon Animation Techniques to Graphical User Interfaces", ACM Transactions on Computer-Human Interaction, vol. 8, No. 3, Sep. 2001, pp. 198-222.
Tidwell Jenifer, "Animated Transition", Designing Interfaces, Patterns for effective Interaction Design, First Edition, Nov. 2005, 4 pages.
Tidwell Jenifer, "Designing Interfaces, Animated Transition", Archieved by Internet Wayback Machine, Available at <https://web.archive.org/web/20060205040223/http://designinginterfaces.com:80/Animated_Transition>, Retrieved on Mar. 20, 2018, 2005, 2 pages.
Tooeasytoforget, "iPhone—Demo of SummerBoard & Its Features", 5:05 minutes video, available at <http://www.youtube.com/watch?v=CJOb3ftQLac>, uploaded on Sep. 24, 2007, 2 pages.
tuaw.com, "1.1.1 iPhone Multi page Springboard Hack", Available at <http://www.tuaw.com/2007l0/09/l-l-l-iohone-multioaoe-sorinQ"board-hack/>, Oct. 9, 2007, 5 pages.
tuaw.com, "Springboard Scrolling", mostly unpopulated page, Available at: <http://www.tuaw.com/photos/springboard-scrolling/431349/>, Oct. 9, 2007, 3 pages.
tuaw.com, "Springboard Scrolling", mid-scroll, Available at: <http://www.tuaw.com/photos/springboard-scrolling/431348/>, Oct. 9, 2007, 3 pages.
tuaw.com, "Springboard Scrolling", new page dot feature, Available at: <http://www.tuaw.com/gallerv/soringboard-scrolling/431347/>, Oct. 9, 2007, 3 pages.
tuaw.com, "TUAW Hack: Mess with Your iPhone Settings", Available at: http://www/tuaw.com/tag/SpringBoard/, Dec. 18, 2007, 1 page.
Turetta Jonathan, "Steve Jobs iPhone 2007 Presentation (HD)", Retrieved from the Internet: URL: https://www.youtube.com/watch?v=vN4U5FqrOdQ&feature=youtu.be, May 13, 2013, 2 pages.
Versiontracker,"Photogather-7.2.6. Hi-res Image Viewer & Editor for Palm", Available online at <http://www.versiontracker.com/dyn/moreinfo/palm/4624>, retrieved on Jun. 12, 2006, 2006, 5 pages.
Vrba J., "iPhone Customizations and Applications", Ezine Articles, Available at: <http://ezinearticles.com/?iPhone-Customizations-and-Applications&id=815807&opt=print>, Nov. 2007, 2 pages.
"Playing Videos on the Web", Available online at <http://www.w3schools.com/media/media_browservideos.asp?out=print>, 2006, 3 pages.
"Multimedia Video Formats", Available online at <http://www.w3sschools.com/media/media_videoformats.asp?output=print>, 2006, 2 pages.
"Playing QuickTime Movies", Available online at <http://www.3schools.com/media/media_quicktime.asp?output-print>, 2006, 2 pages.
Warabino et al., "Video Transcoding Proxy for 3Gwireless Mobile Internet Access", IEEE Communications Magazine, vol. 38, No. 10, Oct. 2000, pp. 66-71.
Wave Technologies International Inc., "Certified Internet Webmaster Foundations Study Guide", A Thomson Learning Company, CIWF-SGMN-0101A, copyright 1988-2000, 88 pages.
Weblogs, "An Overview of WebCore", Chapter 2, WebCore Documentation, available at <http:lweblogs.mozillazine.org/hyatt/WebCore/chapter2.html>, 2006, 3 pages.
Weblogs, "Downloading and Building WebCore", Chapter 1, WebCore Documentation, available at <http://weblogs.mozillazine.org/hyatt/WebCore/chapter1.html>, 2006, 2 pages.
webmasterworld.com, "Page Zooming with IE-Hidden Feature!", Available at <http://www.webmasterworld.com/forum83/4179.htm>, Jul. 2004, 7 pages.
Widgipedia, "I Need a Blog and a Forum Please?", available at: <http://www.widgipedia.com/widgets/details/adni18/hyalo-weather_27.html>, retrieved on Oct. 19, 2006, 2 pages.
Wikipedia, "Comparison of Layout Engines", The free encyclopedia, available at <http://en.wikipedia.org/wiki/Comparison_of_layout_engines>, 2006, 3 pages.
Wikipedia, "History of YouTube", The Free Encyclopedia, available at <http://en.wikipedia.org/wiki/History_of_YouTube>, retrieved on Mar. 15, 2011, 4 pages.
Wikipedia, "KDE", The free encyclopedia, available at <http://en.wikipedia.org/wiki/KDE>, 2006, 9 pages.
Wikipedia, "KHTML", The free encyclopedia, available at <http://en.wikipedia.org/wiki/KHTML>, 2006, 3 pages.
Wikipedia, "List of Layout Engines", The Free Encyclopedia, available at <http://en.wikipedia.org/wiki/List_of_layout_engines>, 2006, 1 page.
Wildarya, "iDesksoft Desktop Icon Toy v2.9", Available at: <http://www.dl4all.com/2007/10/16/idesksoft_desktoo_icon_toy_v2.9.html>, Oct. 16, 2007, 4 pages.
Williams Martyn, "LG's Cell Phone Can Pause Live TV", PC World, Oct. 11, 2005, 2 pages.
Windows XP,"Enable or disable AutoArrange desktop icons in Windows XP", Windows Tutorials, http://www.freemailtutorials.com/microsoftWindows/autoArrangeIconsOnTheDesktop.php, Nov. 19, 2009, 3 pages.
Wobbrock et al., "WebThumb: Interaction Techniques for Small-Screen Browsers", UIST'02, Paris France, Oct. 27-30, 2002, pp. 205-208.
Wright Ben, "Palm OS PDA Application Mini-Reviews", Online Available at <http://library.indstate.edu/newsletter/feb04/palmmini.htm>, Feb. 3, 2015, 11 pages.
Xiao et al., "Slicing*—Tree Based Web Page Transformation for Small Displays", International Conference on Information and Knowledge Management, Oct. 31-Nov. 5, 2005, 2 pages.
Xie et al., "Efficient Browsing of Web Search Results on Mobile Devices Based on Block Importance Model", Microsoft Research Asia, 2005, 10 pages.

(56) References Cited

OTHER PUBLICATIONS

Yin et al., "Using Link Analysis to Improve Layout on Mobile Devices", Proceedings of the 13th international conference on World Wide Web, available at <http://www.iw3c2.org/WWW2004/docs/1p338.pdf>, May 17-22, 2004, pp. 338-344.
Youtube, "Broadcast Yourself", Available at <www.youtube.com>, Nov. 1, 2005, 2 pages.
Youtube, "Broadcasting Ourselves", The Official Youtube blog Available at <http://youtube-global.blogspot.in/2005_11_01_archive.html>, Nov. 15, 2005, 5 pages.
Zhang et al., "An Ergonomics Study of Menu-Operation on Mobile Phone Interface", In Proceedings of the workshop on Intelligent Information Technology Application., 2007, pp. 247-251.
Zytronic, "Touchscreen User Manual Zytronic X-Y Controller (Serial and USB)", XP007916436, Nov. 17, 2006, pp. 1-51.
Advisory Action received for U.S. Appl. No. 15/411,110, dated Jun. 29, 2021, 4 pages.
Applicant Initiated Interview Summary received for U.S. Appl. No. 16/737,372, dated Oct. 5, 2021, 2 pages.
Applicant-Initiated Interview Summary received for U.S. Appl. No. 15/421,865, dated Jun. 30, 2021, 6 pages.
Applicant-Initiated Interview Summary received for U.S. Appl. No. 16/832,285, dated Nov. 19, 2021, 19 pages.
Decision to Grant received for European Patent Application No. 12189764.9, dated Nov. 25, 2021, 2 pages.
Examiner's Pre-Review Report received for Japanese Patent Application No. 2019-024663, dated Aug. 31, 2021, 4 pages (2 pages of English Translation and 2 pages of Official Copy).
Intention to Grant received for European Patent Application No. 12189764.9, dated Sep. 28, 2021, 14 pages.
Non-Final Office Action received for U.S. Appl. No. 16/737,372, dated Jul. 27, 2021, 22 pages.
Non-Final Office Action received for U.S. Appl. No. 16/832,285, dated Jul. 26, 2021, 62 pages.
Non-Final Office Action received for U.S. Appl. No. 16/994,392, dated Jun. 9, 2021, 27 pages.
Non-Final Office Action received for U.S. Appl. No. 17/002,622, dated Jul. 6, 2021, 14 pages.
Non-Final Office Action received for U.S. Appl. No. 17/190,869, dated Sep. 27, 2021, 26 pages.
Notice of Allowance received for Chinese Patent Application No. 201780033973.7, dated Jul. 7, 2021, 5 pages (1 page of English Translation and 4 pages of Official Copy).
Notice of Allowance received for Japanese Patent Application No. 2018-121118, dated Sep. 27, 2021, 3 pages (1 page of English Translation and 2 pages of Official Copy).
Notice of Allowance received for U.S. Appl. No. 17/002,622, dated Nov. 22, 2021, 7 pages.
Notice of Allowance received for U.S. Appl. No. 17/019,062, dated Aug. 10, 2021, 22 pages.
Notice of Allowance received for U.S. Appl. No. 17/019,062, dated Nov. 24, 2021, 20 pages.
Office Action received for Australian Patent Application No. 2020239774, dated Jun. 28, 2021, 8 pages.
Office Action received for Australian Patent Application No. 2020239774, dated Oct. 5, 2021, 3 pages.
Office Action received for Chinese Patent Application No. 201780033621.1, dated May 24, 2021, 18 pages (7 pages of English Translation and 11 pages of Official Copy).
Office Action received for European Patent Application No. 09170697.8, dated Jul. 6, 2021, 3 pages.
Office Action received for European Patent Application No. 17810723.1, dated Jul. 9, 2021, 8 pages.
Office Action received for European Patent Application No. 17813879.8, dated Oct. 20, 2021, 7 pages.
Office Action received for Japanese Patent Application No. 2019-144763, dated Jul. 2, 2021, 6 pages (3 pages of English Translation and 3 pages of Official Copy).
Office Action received for Japanese Patent Application No. 2020-123882, dated Sep. 3, 2021, 8 pages (4 pages of English Translation and 4 pages of Official Copy).
Summons to Attend Oral Proceedings received for European Patent Application No. 14734674.6, mailed on Nov. 23, 2021, 7 pages.
Office Action received for Australian Patent Application No. 2021201687, dated Mar. 16, 2022, 5 pages.
Applicant-Initiated Interview Summary received for U.S. Appl. No. 15/421,865, dated Feb. 28, 2022, 5 pages.
Applicant-Initiated Interview Summary received for U.S. Appl. No. 16/737,372, dated Mar. 1, 2022, 2 pages.
Applicant-Initiated Interview Summary received for U.S. Appl. No. 16/994,392, dated Dec. 3, 2021, 2 pages.
Applicant-Initiated Interview Summary received for U.S. Appl. No. 17/190,869, dated Dec. 10, 2021, 2 pages.
Corrected Notice of Allowance received for U.S. Appl. No. 17/002,622, dated Dec. 13, 2021, 2 pages.
Corrected Notice of Allowance received for U.S. Appl. No. 17/002,622, dated Feb. 16, 2022, 2 pages.
Corrected Notice of Allowance received for U.S. Appl. No. 17/002,622, dated Jan. 25, 2022, 2 pages.
Corrected Notice of Allowance received for U.S. Appl. No. 17/019,062, dated Dec. 8, 2021, 2 pages.
Examiner's Answer to Appeal Brief received for U.S. Appl. No. 15/411,110, dated Feb. 1, 2022, 9 pages.
Final Office Action received for U.S. Appl. No. 16/737,372, dated Jan. 28, 2022, 20 pages.
Final Office Action received for U.S. Appl. No. 16/832,285, dated Jan. 19, 2022, 66 pages.
Final Office Action received for U.S. Appl. No. 16/994,392, dated Jan. 18, 2022, 12 pages.
Intention to Grant received for European Patent Application No. 08829660.3, dated Dec. 17, 2021, 8 pages.
Intention to Grant received for European Patent Application No. 09170697.8, dated Dec. 16, 2021, 8 pages.
Non-Final Office Action received for U.S. Appl. No. 15/421,865, dated Dec. 29, 2021, 23 pages.
Notice of Acceptance received for Australian Patent Application No. 2020239774, dated Jan. 5, 2022, 3 pages.
Notice of Allowance received for Japanese Patent Application No. 2019-144763, dated Nov. 29, 2021, 4 pages (1 page of English Translation and 3 pages of Official Copy).
Notice of Allowance received for U.S. Appl. No. 17/190,869, dated Jan. 10, 2022, 10 pages.
Office Action received for Canadian Patent Application No. 3,109,701, dated Feb. 7, 2022, 4 pages.
Office Action received for Chinese Patent Application No. 201780033621.1, dated Dec. 14, 2021, 8 pages (4 pages of English Translation and 4 pages of Official Copy).
Office Action received for European Patent Application No. 19176224.4, dated Jan. 18, 2022, 6 pages.
Office Action received for Japanese Patent Application No. 2019-24663, dated Feb. 10, 2022, 4 pages (2 pages of English Translation and 2 pages of Official Copy).
Office Action received for Japanese Patent Application No. 2020-046707, dated Jan. 7, 2022, 10 pages (5 pages of English Translation and 5 pages of Official Copy).
Applicant-Initiated Interview Summary received for U.S. Appl. No. 16/994,392, dated Mar. 10, 2022, 2 pages.
Non-Final Office Action received for U.S. Appl. No. 17/130,674, dated Mar. 3, 2022, 8 pages.
Notice of Allowance received for Chinese Patent Application No. 201780033621.1, dated Mar. 10, 2022, 2 pages (1 page of English Translation and 1 page of Official Copy).
Notice of Allowance received for Korean Patent Application No. 10-2020-7018655, dated Feb. 25, 2022, 4 pages (1 page of English Translation and 3 pages of Official Copy).
Office Action received for European Patent Application No. 20203888.1, dated Mar. 10, 2022, 6 pages.
Decision to Grant received for European Patent No. 08829660.3 dated May 6, 2022, 2 pages.
Decision to Grant received for European Patent No. 09170697.8 dated Apr. 29, 2022, 2 pages.

(56) References Cited

OTHER PUBLICATIONS

Non-Final Office Action received for U.S. Appl. No. 16/737,372, dated Apr. 29, 2022, 19 pages.
Notice of Acceptance received for Australian Patent Application No. 2021201687, dated Jun. 8, 2022, 3 pages.
Notice of Allowance received for U.S. Appl. No. 17/130,674, dated Jun. 15, 2022, 9 pages.
Result of Consultation received for European Patent Application No. 14734674.6, dated May 27, 2022, 3 pages.
Minutes of the Oral Proceedings received for European Patent Application No. 14734674.6, mailed on Jun. 13, 2022, 9 pages.

PORTABLE MULTIFUNCTION DEVICE, METHOD, AND GRAPHICAL USER INTERFACE SUPPORTING USER NAVIGATIONS OF GRAPHICAL OBJECTS ON A TOUCH SCREEN DISPLAY

RELATED APPLICATIONS

This application is a continuation of U.S. application Ser. No. 16/926,530, filed Jul. 10, 2020, entitled "Portable Multifunction device. Method, and Graphical User Interface Supporting User Navigations of Graphical Objects on a Touch Screen Display" which is a continuation of Ser. No. 16/378,291, filed Apr. 8, 2019, entitled "Portable Multifunction device, Method, and Graphical User Interface Supporting User Navigations of Graphical Objects on a Touch Screen Display." which claims priority to U.S. application Ser. No. 15/153,617, filed May 12, 2016, now U.S. Pat. No. 10,254,949, entitled "Portable Multifunction device, Method, and Graphical User Interface Supporting User Navigations of Graphical Objects on a Touch Screen Display," which claims priority to U.S. application Ser. No. 14/011,639, filed Aug. 27, 2013, now U.S. Pat. No. 9,367,232, entitled "Portable Multifunction device, Method, and Graphical User Interface Supporting User Navigations of Graphical Objects on a Touch Screen Display," which claims priority to U.S. application Ser. No. 11/969,809, filed Jan. 4, 2008, now U.S. Pat. No. 8,519,964, which claims priority to U.S. Provisional Patent Application Nos. 60/937,993, entitled "Portable Multifunction Device," filed Jun. 29, 2007; 60/937,990, entitled "Portable Multifunction Device, Method, and Graphical User Interface Supporting User Navigations of Graphical Objects on a Touch Screen Display," filed Jun. 29, 2007; 60/879,469, entitled "Portable Multifunction Device," filed Jan. 8, 2007; and 60/879,253, entitled "Portable Multifunction Device," filed Jan. 7, 2007. All of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. Provisional Patent Application No. 60/824,769, "Portable Multifunction Device," filed Sep. 6, 2006. All of these applications are incorporated by reference herein in their entirety.

TECHNICAL FIELD

The disclosed embodiments relate generally to portable electronic devices, and more particularly, to portable devices that support user navigations of graphical objects on a touch screen display.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

On the other hand, a touch-sensitive screen supports more user-friendly and intuitive means for a user to interact with graphical objects on the screen, such as dragging and dropping an object from one position to another using fingertip.

Accordingly, there is a need for portable multifunction devices with more transparent and intuitive user interfaces supporting user navigation of graphical objects on a touch screen display, e.g., swapping two objects, which are easy to use, configure, and/or adapt. Such interfaces increase the effectiveness, efficiency and user satisfaction with portable multifunction devices.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

One aspect of the invention involves a computer-implemented method performed by a portable multifunction device with a touch screen display. In response to a finger-down event on the touch screen display, the device identifies a first user interface object at which the finger-down event occurs. In response to one or more finger-dragging events on the touch screen display, the device then moves the first user interface object on the touch screen display in accordance with the finger-dragging events. In response to a finger-up event on the touch screen display, the device identifies a second user interface object at which the finger-up event occurs and visually replaces the second user interface object with the first user interface object.

Another aspect of the invention involves a computer-implemented method performed by a portable multifunction device with a touch screen display. The device displays a first user interface object and a second user interface object on the touch screen display. In response to a finger-down event at the first user interface object and one or more finger-dragging events on the touch screen display, the device moves the first user interface object on the touch screen display along a path determined by the finger-dragging events until the first user interface object at least in part overlaps the second user interface object. In response to a finger-up event at the second user interface object, the device visually replaces the second user interface object with the first user interface object.

Another aspect of the invention involves a portable electronic device with a touch screen display for displaying a plurality of user interface objects. The device includes one or more processors, memory, and a program stored in the memory and configured to be executed by the one or more processors. The program includes: instructions for displaying a first user interface object and a second user interface object on the touch screen display; instructions for detecting a finger-down event at the first user interface object; instructions for detecting one or more finger-dragging events on the touch screen display; instructions for moving the first user interface object on the touch screen display along a path determined by the finger-dragging events until the first user interface object at least in part overlaps the second user interface object; instructions for detecting a finger-up event at the second user interface object; and instructions for visually replacing the second user interface object with the first user interface object.

Another aspect of the invention involves a computer readable storage medium that stores one or more programs. The one or more programs include instructions, which when executed by the device, cause the device to: display a first user interface object and a second user interface object on the touch screen display; detect a finger-down event at the first user interface object; detect one or more finger-dragging events on the touch screen display; move the first user interface object on the touch screen display along a path determined by the finger-dragging events until the first user interface object at least in part overlaps the second user interface object; detect a finger-up event at the second user interface object; and visually replace the second user interface object with the first user interface object.

Another aspect of the invention involves a portable electronic device with a touch screen display with a plurality of user interface objects. The device includes: means for displaying a first user interface object and a second user interface object on the touch screen display; means for detecting a finger-down event at the first user interface object; means for detecting one or more finger-dragging events on the touch screen display; means for moving the first user interface object on the touch screen display along a path determined by the finger-dragging events until the first user interface object at least in part overlaps the second user interface object; means for detecting a finger-up event at the second user interface object; and means for visually replacing the second user interface object with the first user interface object.

Another aspect of the invention involves a computer-implemented method performed by a portable multifunction device with a touch screen display. The device displays a series of ratings indicia on the touch screen display. The series of ratings indicia include a lowest rating indicia and one or more progressively higher rating indicia. In response to a finger gesture by a user on one or more of the ratings indicia, the device determines a last rating indicia contacted by the finger gesture immediately prior to the finger breaking contact with the touch screen display. A rating corresponding to the last rating indicia contacted by the finger gesture is used as input to a function or application in the device.

Another aspect of the invention involves a graphical user interface on a portable electronic device with a touch screen display. The graphical user interface includes a series of ratings indicia on the touch screen display. The ratings indicia include a lowest rating indicia and one or more progressively higher rating indicia. In response to a finger gesture on one or more of the ratings indicia, the graphical user interface displays on the touch screen a graphical object using as input the last rating indicia contacted by the finger gesture before the finger gesture breaks contact with the touch screen display.

Another aspect of the invention involves a portable electronic device with a touch screen display. The device includes one or more processors, memory, and one or more programs stored in the memory and configured to be executed by the processors. The programs include: instructions for displaying a series of ratings indicia on the touch screen display, wherein the ratings indicia comprise a lowest rating indicia and one or more progressively higher rating indicia; instructions for detecting a finger gesture by a user on one or more of the ratings indicia, wherein the finger gesture contacts a last rating indicia immediately prior to breaking contact with the touch screen display; and instructions for using a rating corresponding to the last rating indicia contacted by the finger gesture as input to a function or application in the device.

Another aspect of the invention involves a computer readable storage medium that stores one or more programs. The one or more programs include instructions, which when executed by a portable multifunction device with a touch screen display, cause the device to: display a series of ratings indicia on the touch screen display, wherein the ratings indicia comprise a lowest rating indicia and one or more progressively higher rating indicia; detect a finger gesture by a user on one or more of the ratings indicia, wherein the finger gesture contacts a last rating indicia immediately prior to breaking contact with the touch screen display; and use a rating corresponding to the last rating indicia contacted by the finger gesture as input to a function or application in the device.

Another aspect of the invention involves a portable electronic device with a touch screen display. The device includes: means for displaying a series of ratings indicia on the touch screen display, wherein the ratings indicia comprise a lowest rating indicia and one or more progressively higher rating indicia: means for detecting a finger gesture by a user on one or more of the ratings indicia, wherein the finger gesture contacts a last rating indicia immediately prior to breaking contact with the touch screen display: and means for using a rating corresponding to the last rating indicia contacted by the finger gesture as input to a function or application in the device.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
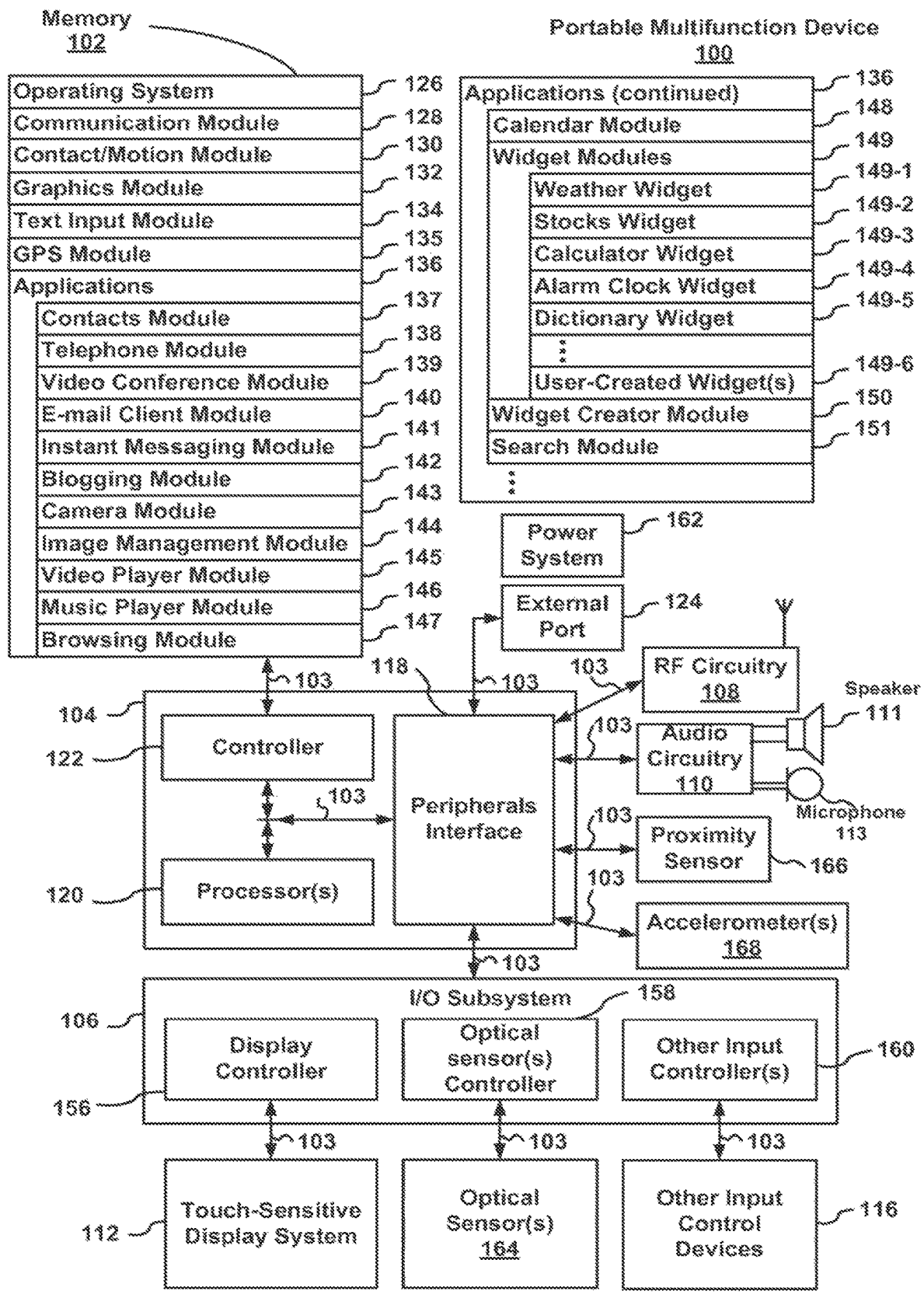
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
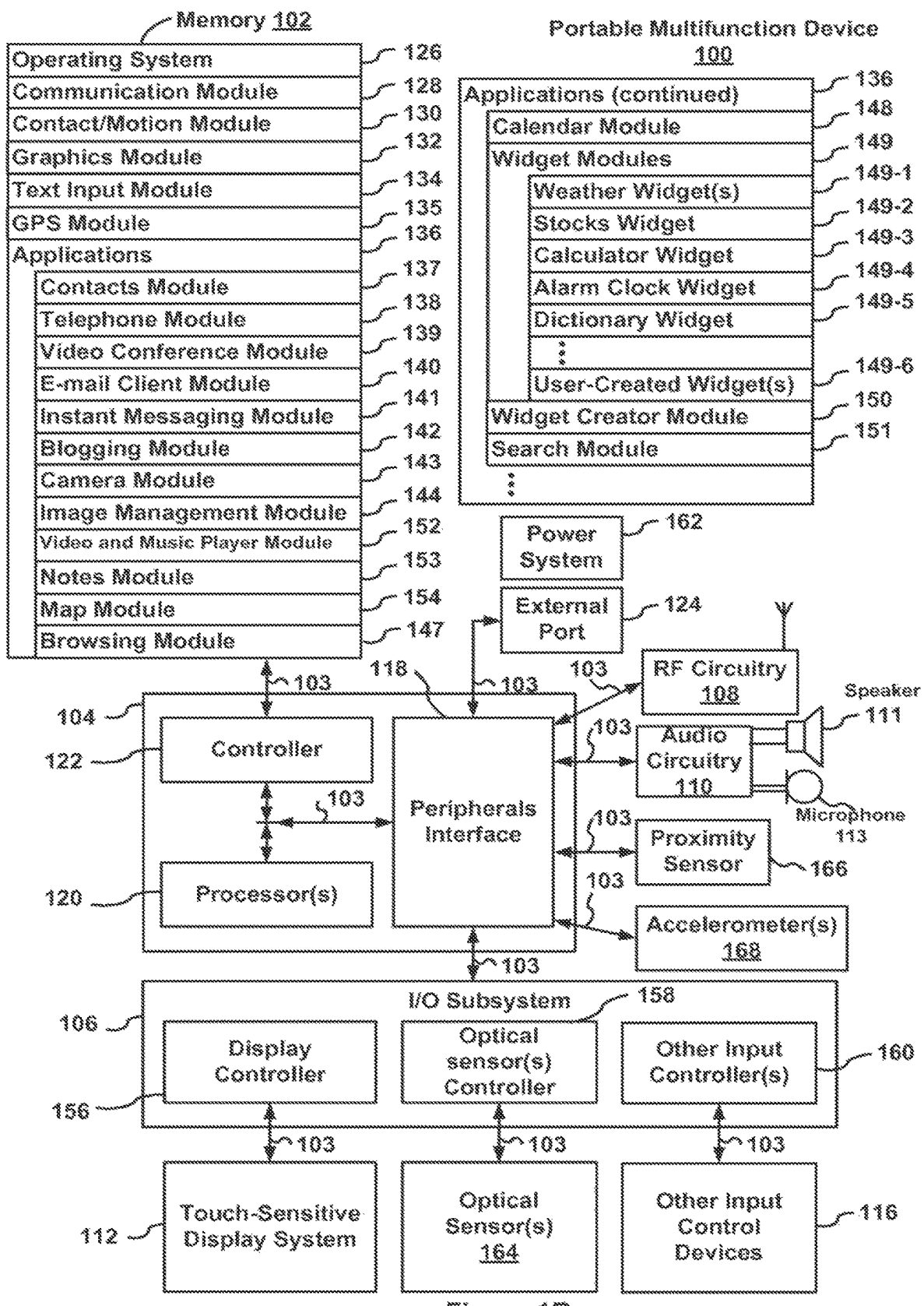

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112 The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005: and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, Proximity Detector In Handheld Device,' filed Sep. 30, 2005; U.S. patent application Ser. No. 11/240,788, 'Proximity Detector In Handheld Device,' filed Sep. 30, 2005; U.S. patent application Ser. No. 11/620,702 number to be determined, 'Using Ambient Light Sensor To Augment Proximity Sensor Output,' filed Jan. 7, 2007. U.S. patent application Ser. No. 11/586,862, 'Automated Response To And Sensing Of User Activity in Portable Devices,' filed Oct. 24, 2006, U.S. patent application Ser. No. 11/638,251, 'Methods And Systems For Automatic Configuration Of Peripherals,' filed Dec. 12, 2006, which are hereby incorporated by reference in their entirety. in some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. Figures 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated herein by reference in their entirety. In some embodiments, information is displayed on the touch screen display in a portrait view or a landscape view based on an analysis of data received from the one or more accelerometers.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated herein by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Embodiments of user interfaces and associated processes using online video module 155 are described further below.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise rearranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
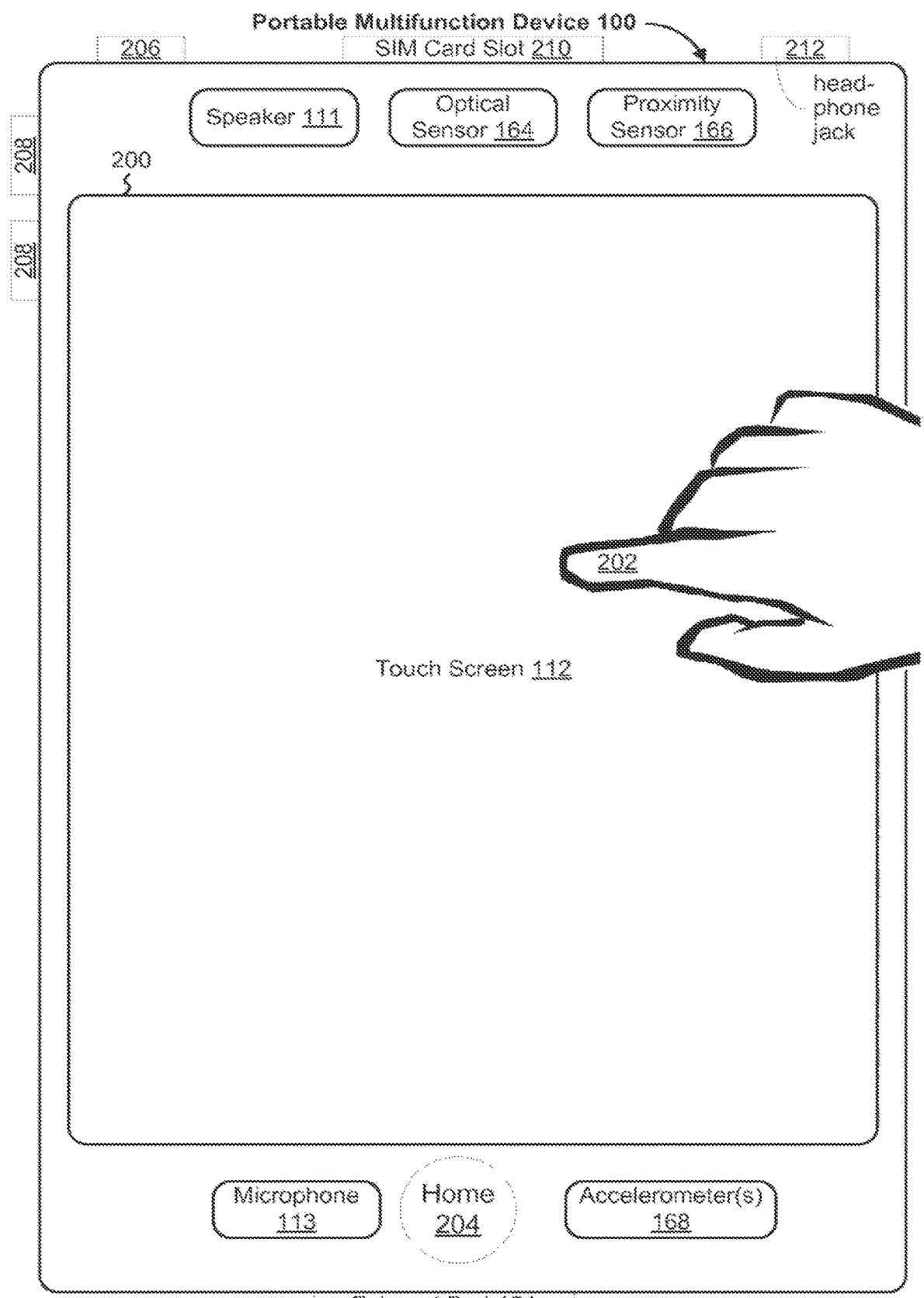
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
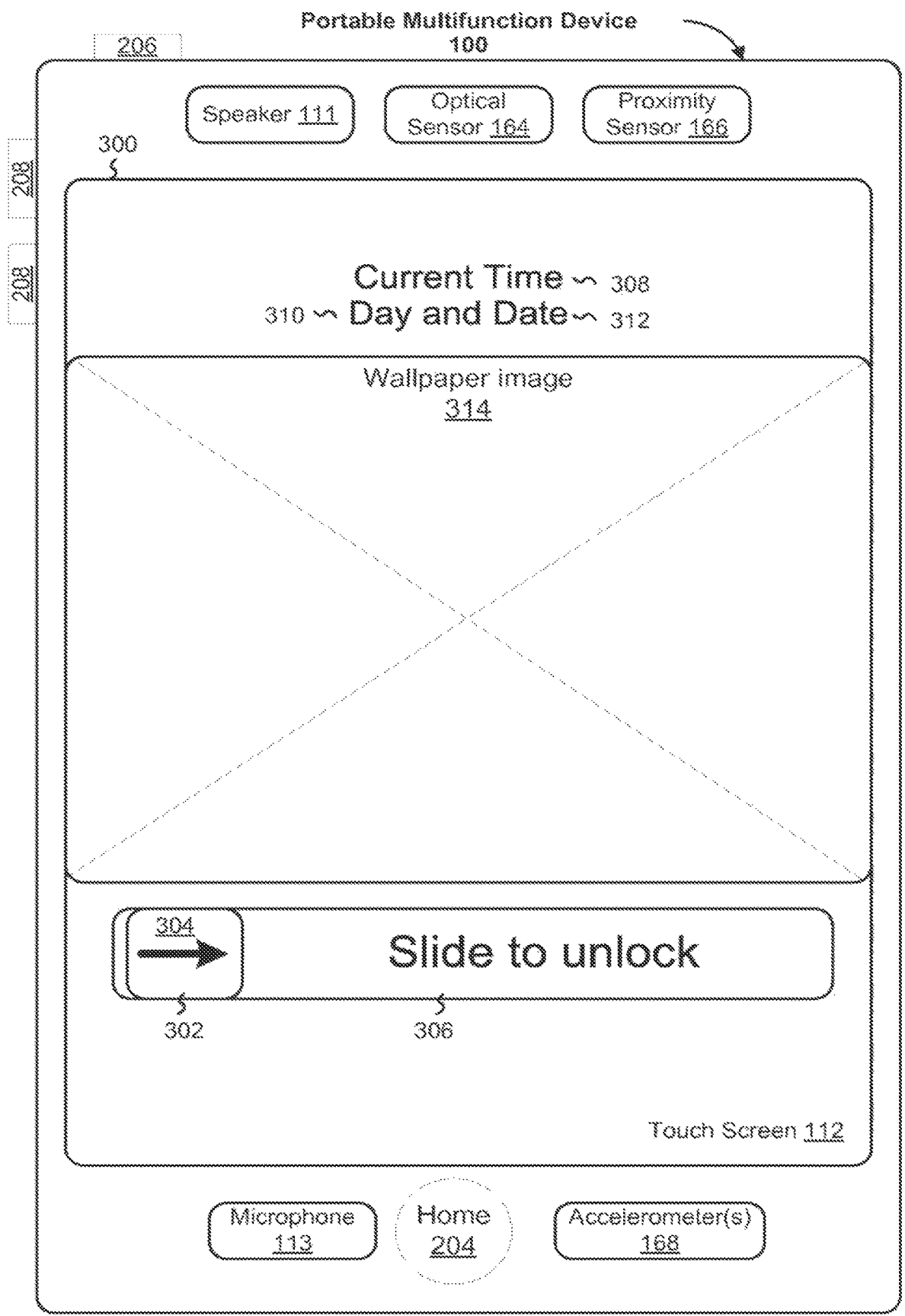
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

- Unlock image 302 that is moved with a finger gesture to unlock the device;
- Arrow 304 that provides a visual cue to the unlock gesture;
- Channel 306 that provides additional cues to the unlock gesture;
- Time 308;
- Day 310;
- Date 312; and
- Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock image," filed Dec. 23, 2005, and Ser. No. 11/322,550. "Indication Of Progress Towards Satisfaction Of A User Input Condition," filed Dec. 23, 2005, which are hereby incorporated by reference in their entirety.

Figure 4A:
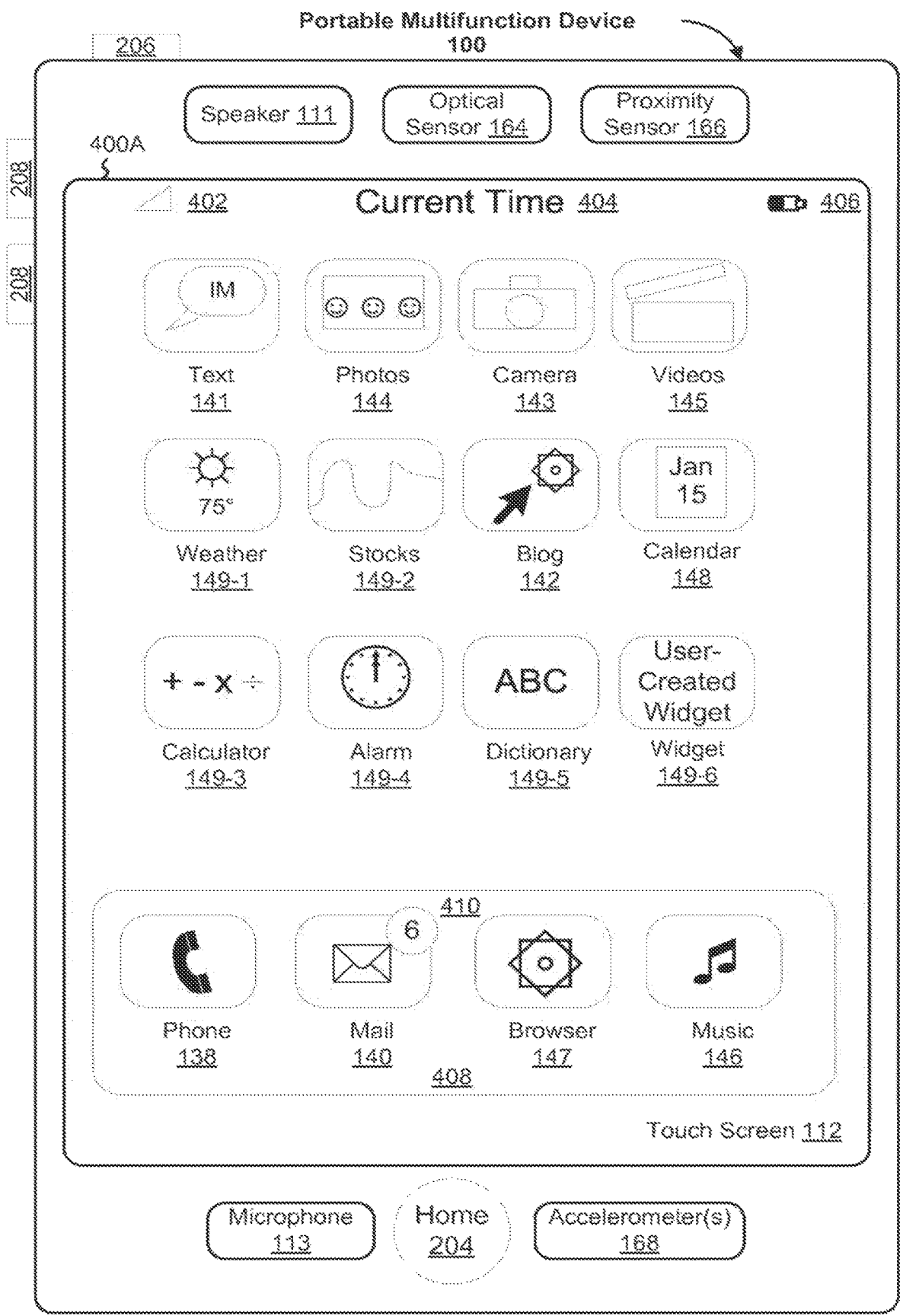
FIGS. 4A and 4B illustrate exemplary user interfaces for a menu of applications on a portable multifunction device in accordance with some embodiments.
Figure 4B:
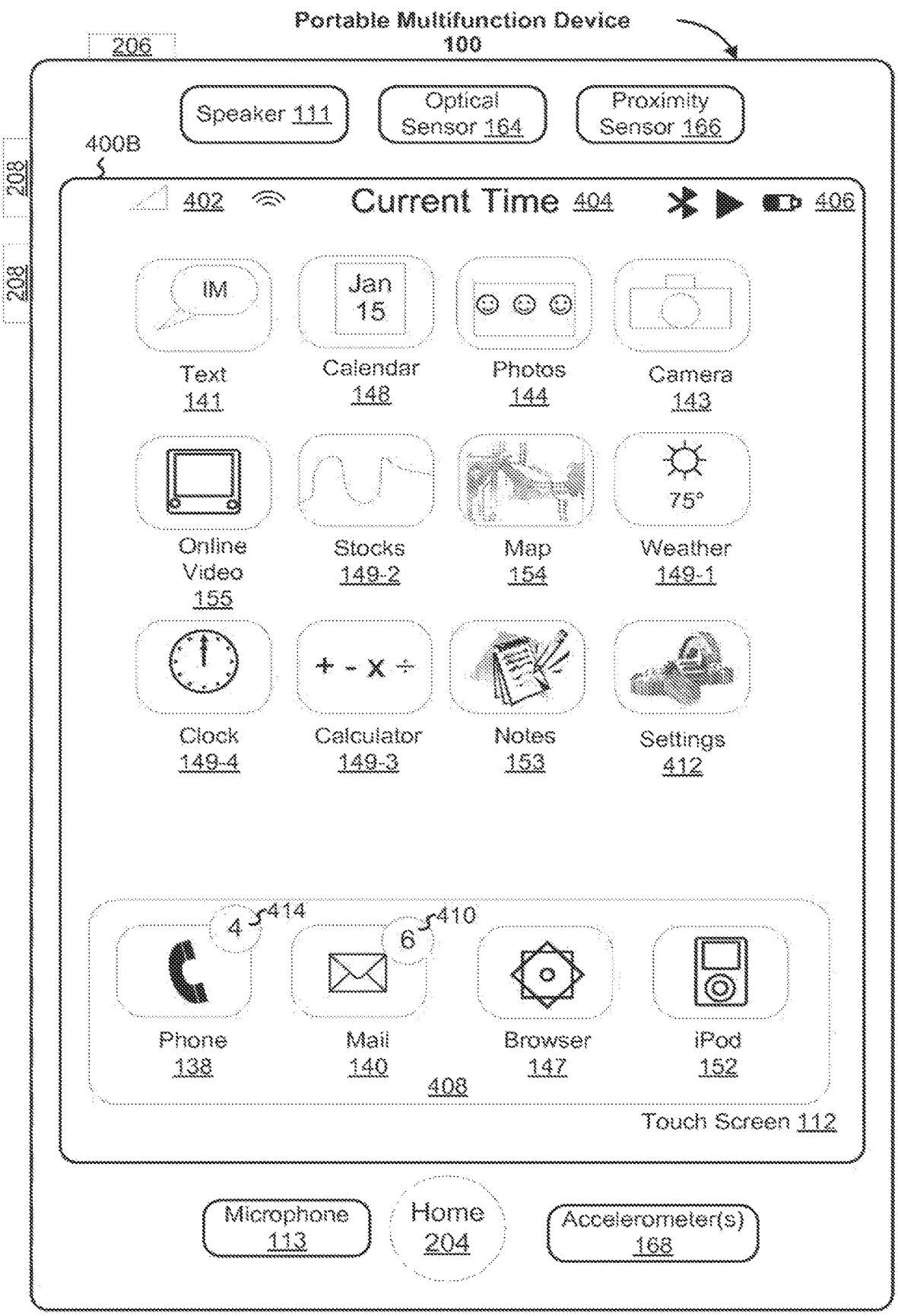

FIGS. 4A and 4B illustrate exemplary user interfaces for a menu of applications on a portable multifunction device in accordance with some embodiments. In some embodiments, user interface 400A includes the following elements, or a subset or superset thereof:

- Signal strength indicator(s) 402 for wireless communication(s), such as cellular and Wi-Fi signals;
- Time 404;
- Battery status indicator 406;
- Tray 408 with icons for frequently used applications, such as one or more of the following:
  - Phone 138, which may include an indicator 414 of the number of missed calls or voicemail messages;
  - E-mail client 140, which may include an indicator 410 of the number of unread e-mails,
  - Browser 147; and
  - Music player 146; and
- Icons for other applications, such as one or more of the following:
  - IM 141;
  - Image management 144;
  - Camera 143:
  - Video player 145;
  - Weather 149-1;
  - Stocks 149-2;
  - Blog 142;
  - Calendar 148;
  - Calculator 149-3;
  - Alarm clock 149-4;
  - Dictionary 149-5; and
  - User-created widget 149-6.

In some embodiments, user interface 400B includes the following elements, or a subset or superset thereof:

- 402, 404, 406, 141, 148, 144, 143, 149-3, 149-2, 149-1, 149-4, 410, 414, 138, 140, and 147, as described above;
- Map 154;
- Notes 153;
- Settings 412, which provides access to settings for the device 100 and its various applications 136;
- Video and music player module 152, also referred to as iPod (trademark of Apple Computer, Inc.) module 152; and
- Online video module 155, also referred to as YouTube (trademark of Google, Inc.) module 155.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

As noted in the background section, many user-friendly GUI features cannot be implemented because of the limitations with the conventional graphical user interfaces. But these limitations can be overcome by a portable device with a touch screen display as described in the present application. For example, it is possible to use finger gestures to drag and drop a user interface object such as an icon from one position to another position on the touch screen display for swapping two objects. It is also possible for a user to rank information or services rendered by the portable device using such finger gestures.

The term "user interface object" (which is interchangeable with "graphical object") generally refers to a graphical icon on the touch screen display, which may be associated with an entertainment item, an application configuration option, an email message, a photo, a data file, or the like depending on the specific application that employs the schemes.

FIGS. 8A through 8I illustrate exemplary user interfaces for a music and video player in accordance with some embodiments. Note that these user interfaces are only examples illustrating the processes mentioned above. One skilled in the art may apply these user navigation schemes to other applications that provide or require similar user experience.

Figure 8A:
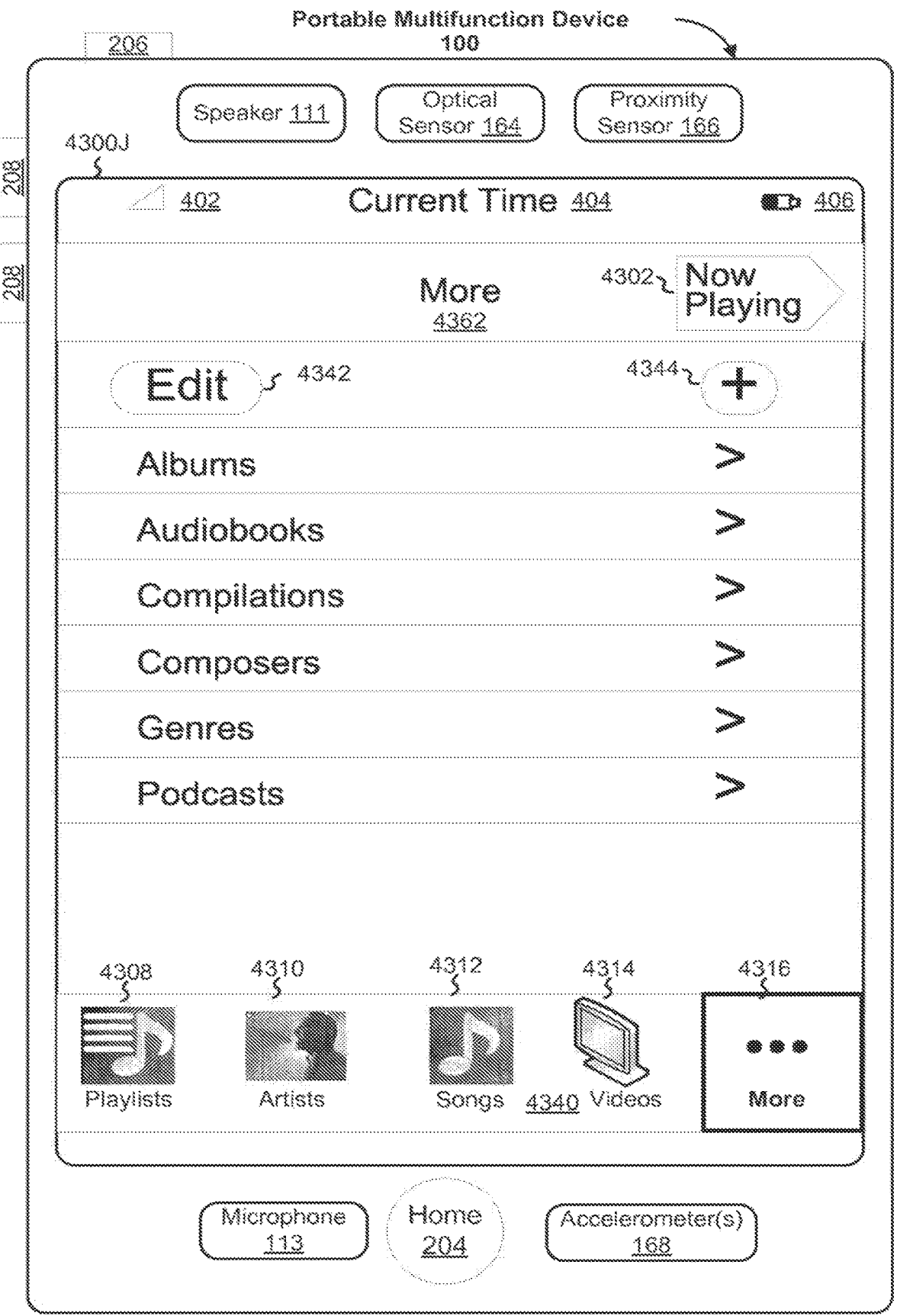
FIGS. 8A through 8I illustrate exemplary user interfaces for a music and video player in accordance with some embodiments.

In some embodiments, icons for major content categories (e.g., playlists 4308, artists 4310, songs 4312, and video 4314, FIG. 8A) are displayed in a first area of the display (e.g., 4340, FIG. 8A). In some embodiments, the first area also includes an icon (e.g., more icon 4316) that when activated (e.g., by a finger tap on the icon) leads to additional content categories (e.g., albums, audiobooks, compilations, composers, genres, and podcasts in FIG. 8A).

In some embodiments, the major content categories that are displayed in the first area 4340 of the display can be rearranged by a user to correspond to the user's preferred (favorite) categories (e.g., as illustrated in FIGS. 8A-8G). In some embodiments, activation of add category icon 4344 (e.g., by a finger tap on the icon) initiates display of a UI with a soft keyboard for adding user specified categories (not shown). In some embodiments, activation of edit icon 4342 in FIG. 8A (e.g., by a finger tap on the icon) initiates display of UI 4300K (FIG. 8B) with delete icons 4348 (which operate like delete icons 702, FIG. 7, as described above) and moving affordance icons 4360. As described below, moving affordance icons 4360 may be used as control icons that assist in rearranging categories or other UI objects.

Figure 5:
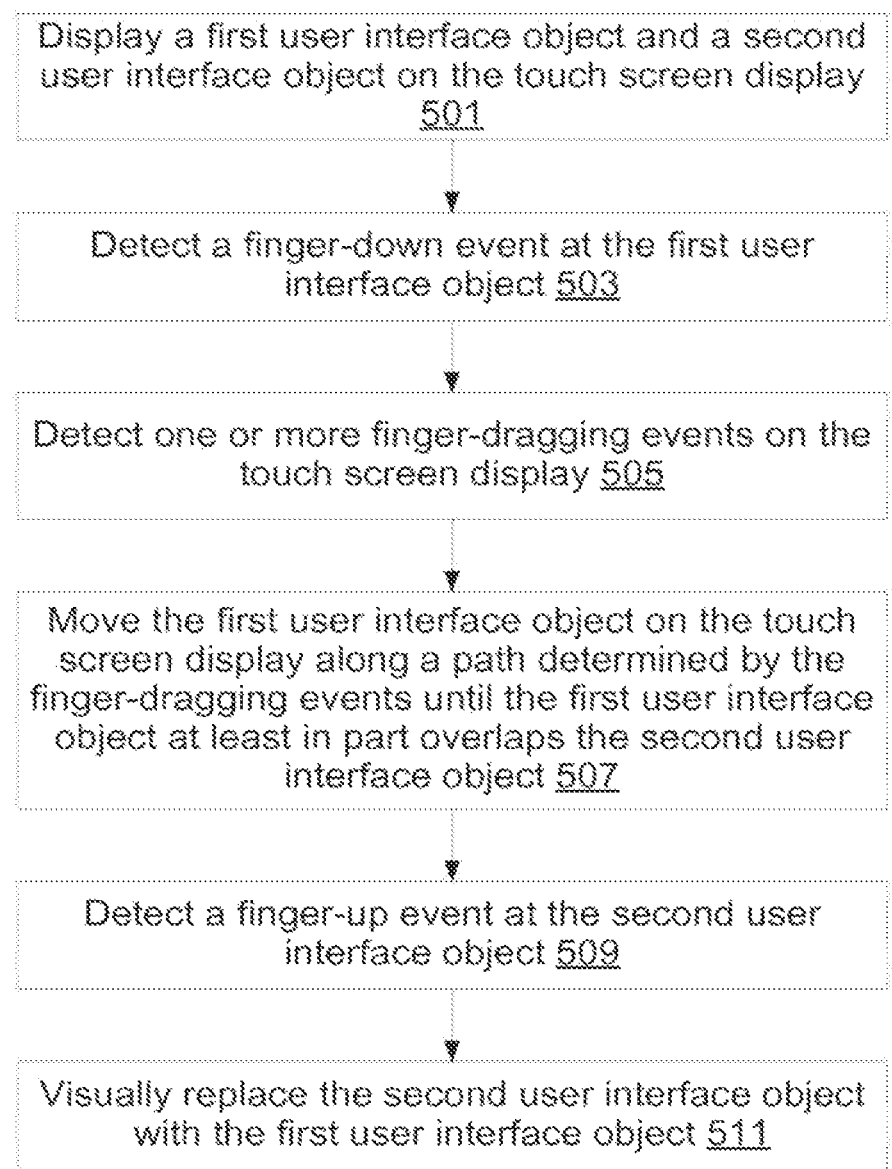
FIG. 5 is a flow diagram illustrating a first process for swapping first and second user interface objects in accordance with some embodiments.

FIG. 5 is a flow diagram illustrating a first process for swapping first and second user interface objects in accordance with some embodiments. In some embodiments, a portable multifunction device with a touch screen display with a plurality of user interface objects displays a first user interface object (e.g., genres icon 4350, FIG. 8B) and a second user interface object (e.g., artists icon 4310, FIG. 8B) on the touch screen display (501). In some embodiments, the first user interface object is one of a group of candidate icons (e.g., icons in the more list 4362, FIG. 8B, which are candidates for rearrangement) and the second user interface object is one of a group of user favorite icons (e.g., icons in area 4340).

Figure 8B:
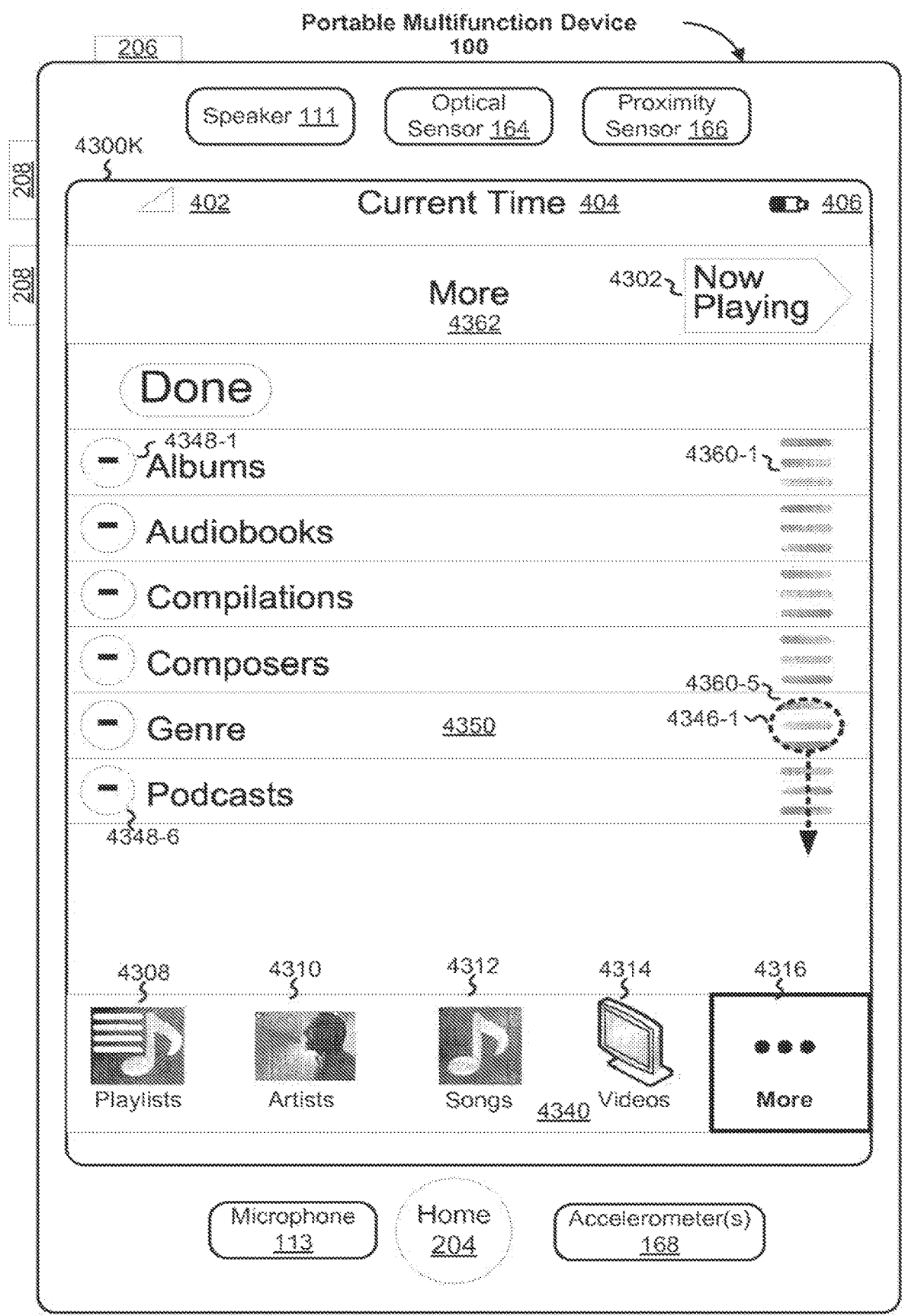

A finger-down event is detected at the first user interface object (503) (e.g., contact 4346-1, FIG. 8B). In some embodiments, the first user interface object includes a control icon (e.g., the horizontal bars comprising a moving affordance icon 4360 in genres icon 4350) and the finger-down event occurs at or near the control icon.

One or more finger-dragging events are detected on the touch screen display (505) (e.g., the finger drag from 4346-1 (FIG. 8B) to 4346-2 (FIG. 8C) to 4346-3 via 4365 (FIG. 8C)).

The first user interface object is moved on the touch screen display along a path determined by the finger-dragging events until the first user interface object at least in part overlaps the second user interface object (507).

Figure 8C:
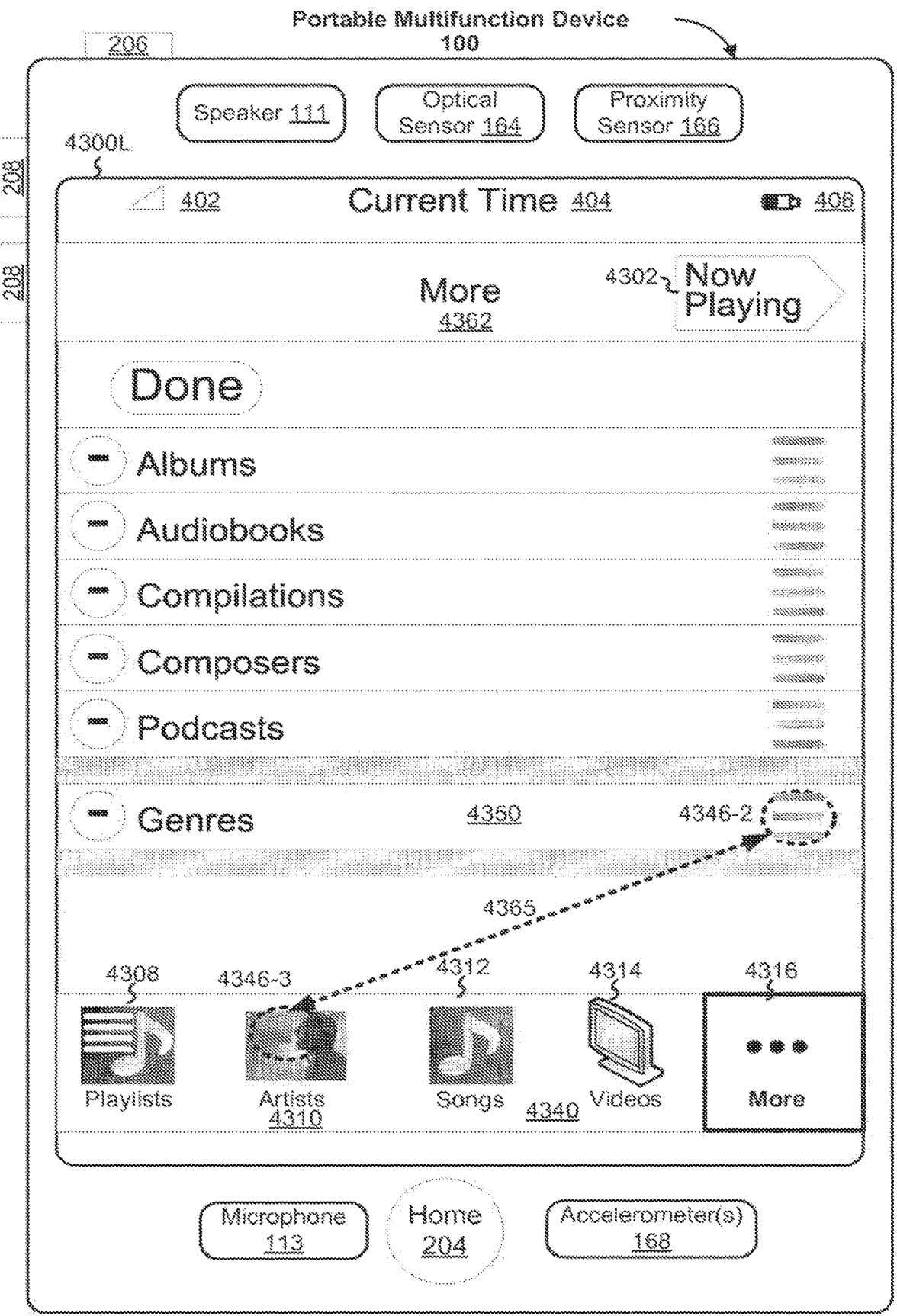

In some embodiments, while moving the first user interface object on the touch screen display, the first user interface object is displayed in a manner visually distinguishable from other user interface objects on the touch screen display (e.g., the shading around genres icon 4350 in FIG. 8C).

A finger-up event is detected at the second user interface object (509) (e.g., ending contact at 4346-3, FIG. 8C). The second user interface object (e.g., artists icon 4310, FIG. 8C) is visually replaced with the first user interface object (511) (e.g., genres icon 4350, FIG. 8D).

Figure 8D:
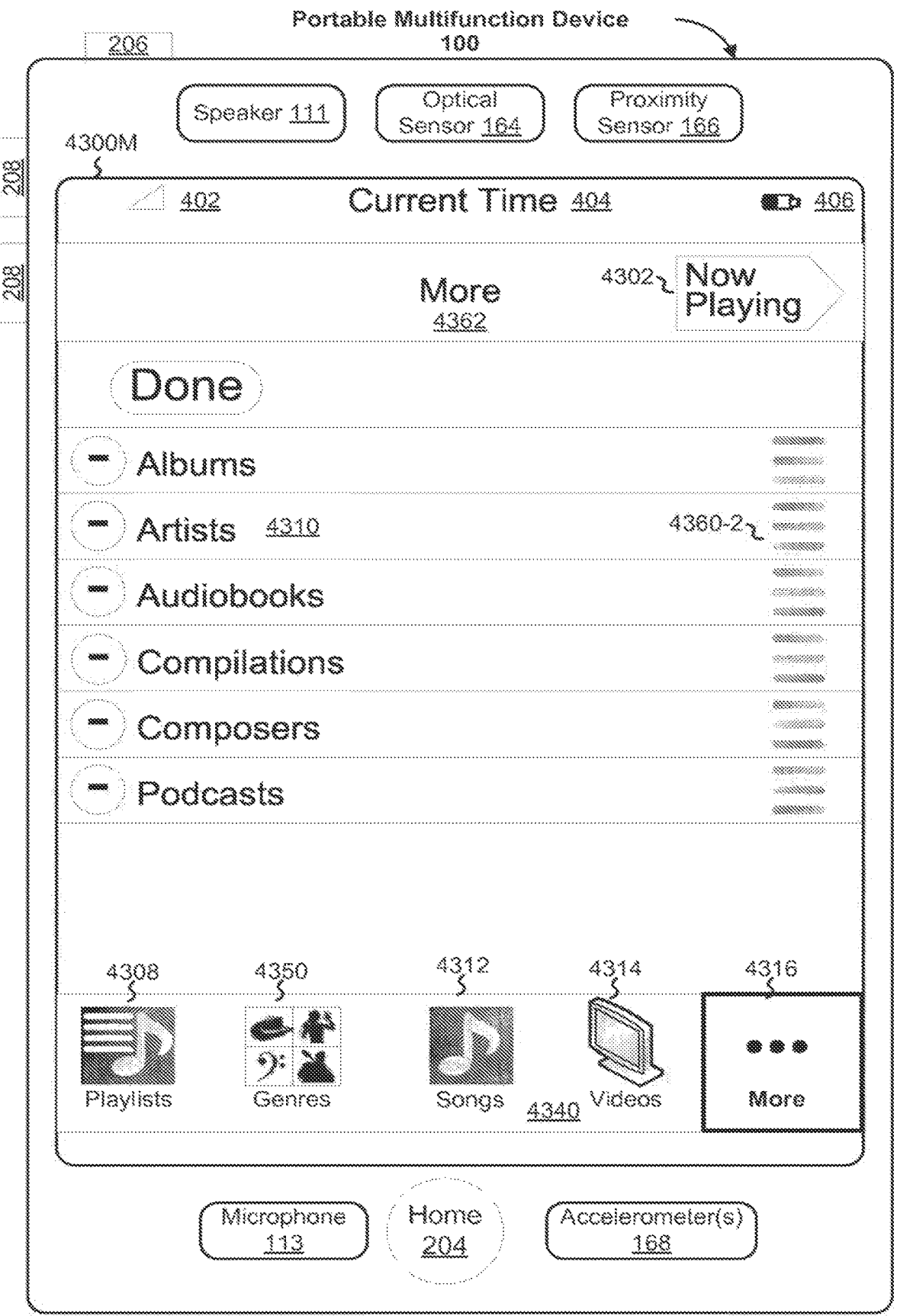

In some embodiments, in response to the finger-up event, the first user interface object is displayed at a location formerly occupied by the second user interface object, and a movement of the second user interface object to a location formerly occupied by the first user interface object is animated (e.g., in FIG. 8D, artists 4310 is now part of the list that used to include genres 4350).

In some embodiments, the first user interface object is displayed in a first form before the finger-up event and in a second form after the finger-up event, and the second form is visually different from the first form. In some embodiments, the first form is a row including characters and at least one control icon (e.g., 4350, FIG. 8B) and the second form is an image or other graphic (e.g., 4350, FIG. 8D).

In some embodiments, the second user interface object is displayed in a first form before the finger-up event and in a second form after the finger-up event, and the second form is visually different from the first form. In some embodiments, the first form is an image or other graphic (e.g., 4310, FIG. 8B) and the second form is a row (e.g., 4310, FIG. 8D) including characters associated with at least one control icon (e.g., 4360-2, FIG. 8D). In some embodiments, the second form is a row including characters near, or within a predefined distance, corresponding to a hit region for the control icon.

In some embodiments, the first user interface object is one of a group of candidate icons and the second user interface object is one of a group of user favorite icons. In some embodiments, the remaining group of candidate icons is rearranged after moving the first user interface object away from its original location. The remaining group of candidate icons is the group of candidate icons excluding the first user interface object. Upon detecting the finger-up event, the first user interface object is displayed at a location formerly occupied by the second user interface object and a movement of the second user interface object to a location formerly occupied by one of the remaining group of candidate icons is animated.

Figure 6:
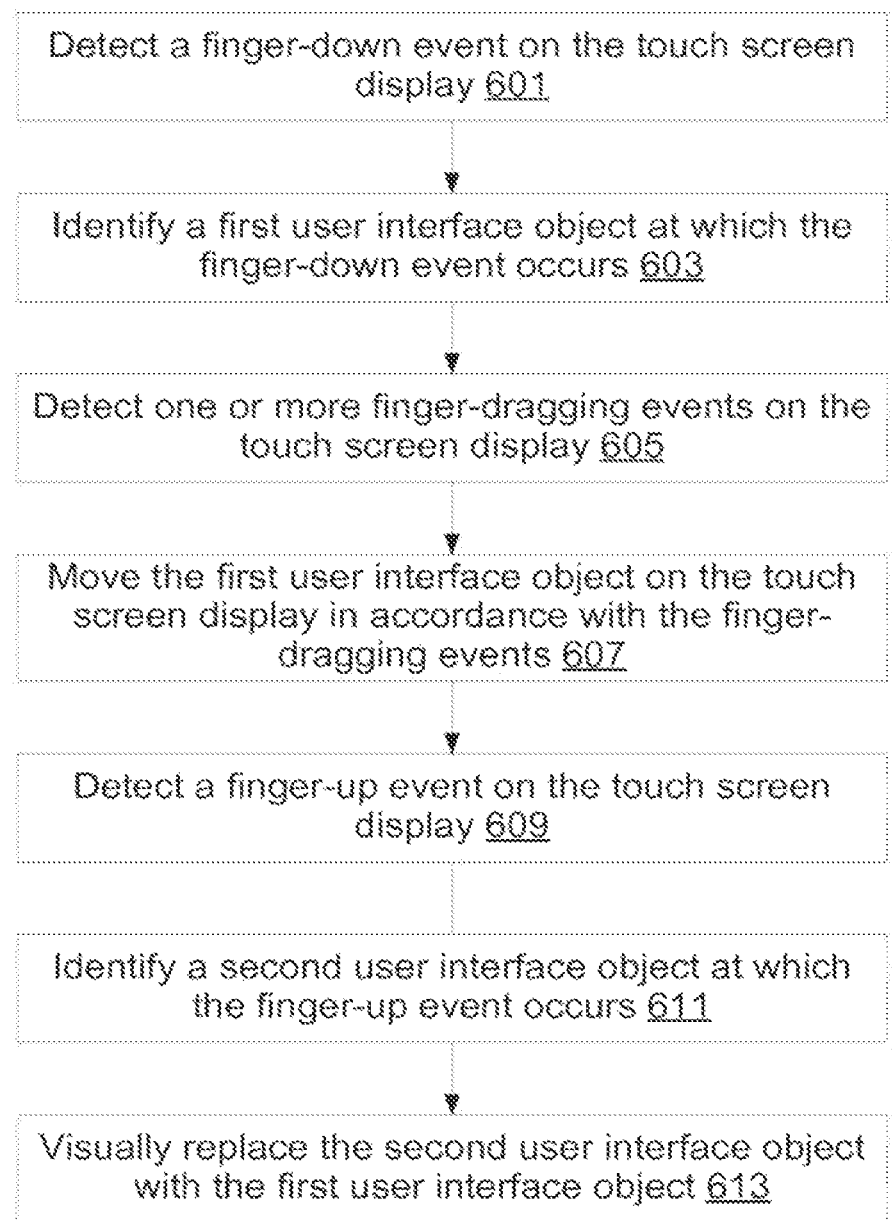
FIG. 6 is a flow diagram illustrating a second process for swapping first and second user interface objects in accordance with some embodiments.
Figure 8E:
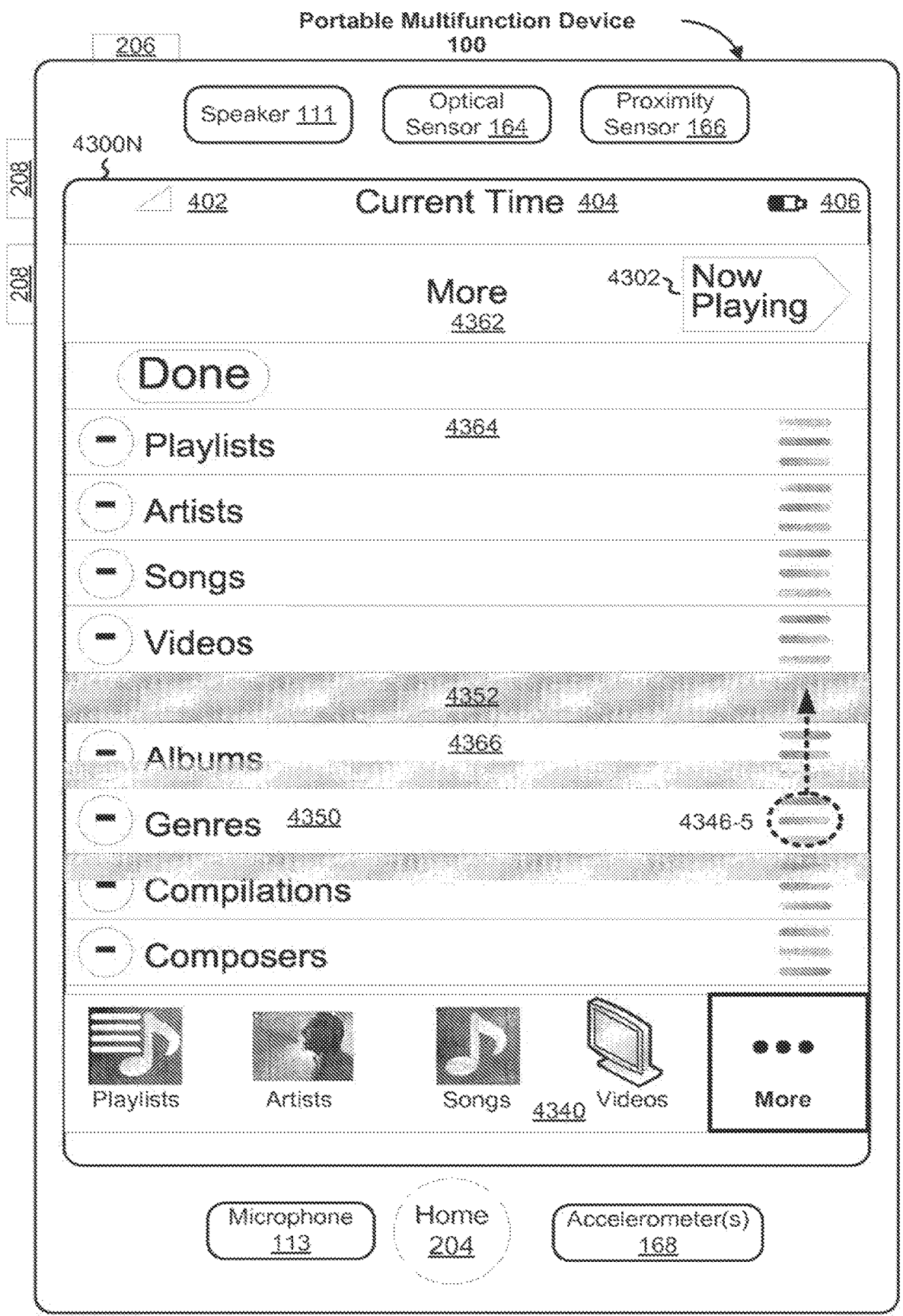
Figure 8F:
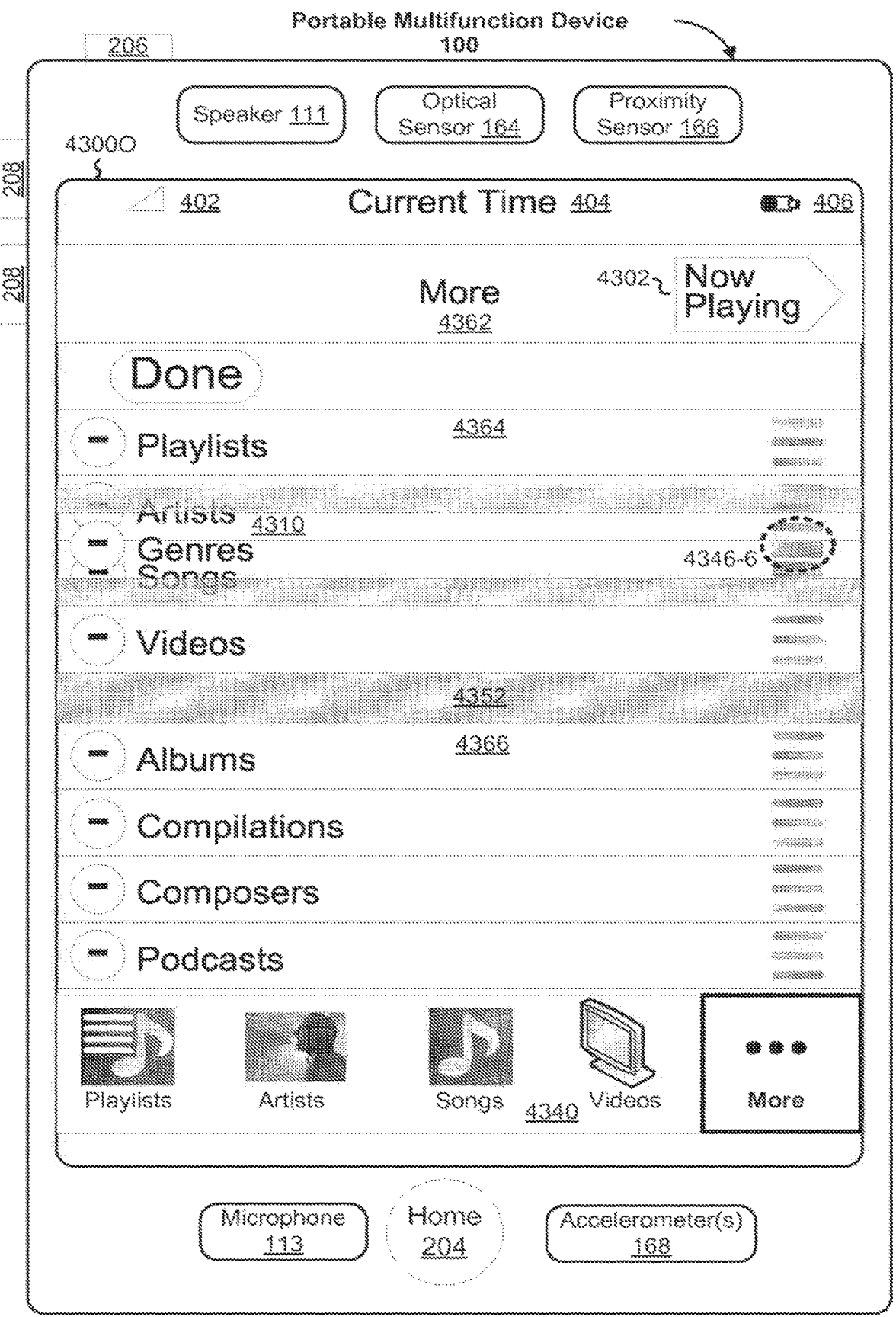
Figure 8G:
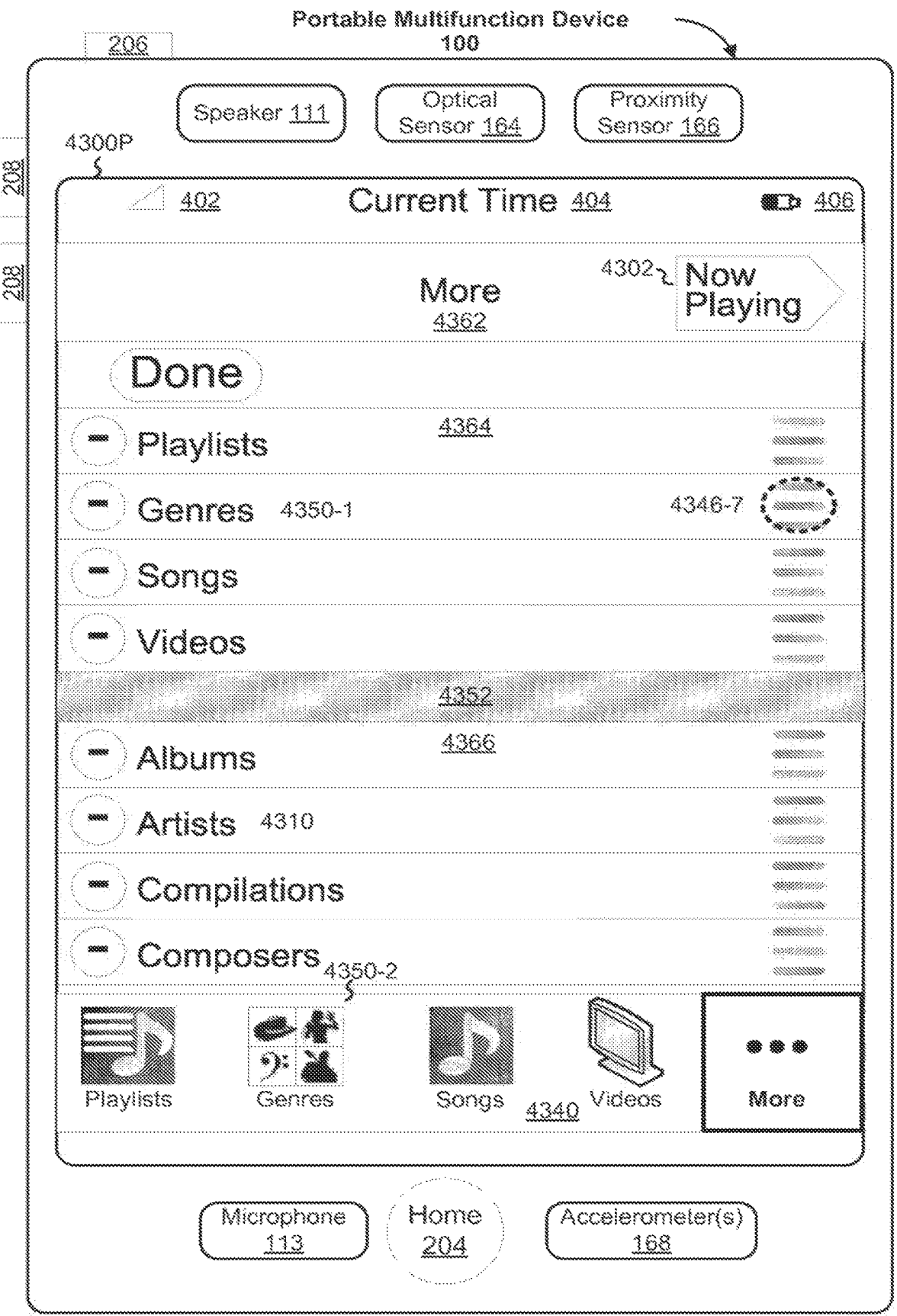

FIG. 6 is a flow diagram illustrating a second process for swapping first and second user interface objects in accordance with some embodiments. FIGS. 8E through 8G illustrate another way the major content categories that are displayed in the first area 4340 of the display can be rearranged by a user to correspond to the user's preferred (favorite) categories. The categories that are included in area 4340 may also be listed in a first list area 4364 in the more list 4362 (e.g., above separator 4352 in the more list 4362), with the candidate categories listed in a second list area 4366 in the more list 4362 (e.g., below separator 4352 in the more list 4362). Upon detection of a finger down event (601) (e.g., 4346-5, FIG. 8E), a first user interface object is identified at which the finger-down event occurs (603) (e.g., genres icon 4350). In response to one or more finger dragging events (605) (e.g., from 4346-5 to 4346-6 (FIG. 8F) to 4346-7 (FIG. 8G)), the first user interface object is moved on the touch screen display in accordance with the finger-dragging event (607). Upon detecting a finger up event (609) (e.g., at 4346-7), the portable device identifies a second user interface object at which the finger-up event occurs (611) and then visually replaces the second user interface object with the first user interface object (613) (e.g., artists icon 4310) in both the first list area 4364 and in area 4340 (e.g., 4350-1 and 4350-2, FIG. 8G), with the second user interface object moving to the second list area 4366 (e.g., 4310, FIG. 8G).

In some embodiments, a portable multifunction device displays a first group of user interface objects on the touch screen display (e.g., icons in the more list 4362, FIG. 8B, which are candidates for rearrangement). A second group of user interface objects is displayed on the touch screen display (e.g., icons in area 4340). A finger-down event is detected on the touch screen display (e.g., contact 4346-1, FIG. 8B). A first user interface object (e.g., genres icon 4350, FIG. 8B) in the first group at which the finger-down event occurs is identified. One or more finger-dragging events are detected on the touch screen display (e.g., the finger drag from 4346-1 (FIG. 8B) to 4346-2 (FIG. 8C) to 4346-3 via 4365 (FIG. 8C)). The first user interface object on the touch screen display is moved in accordance with the finger-dragging events. A finger-up event is detected on the touch screen display (e.g., ending contact at 4346-3, FIG. 8C). A second user interface object (e.g., artists icon 4310, FIG. 8B) in the second group at which the finger-up event occurs is identified. The second user interface object is visually replaced with the first user interface object (e.g., artists icon 4310 in FIG. 8C is visually replaced with genres icon 4350 in FIG. 8D).

Figure 7:
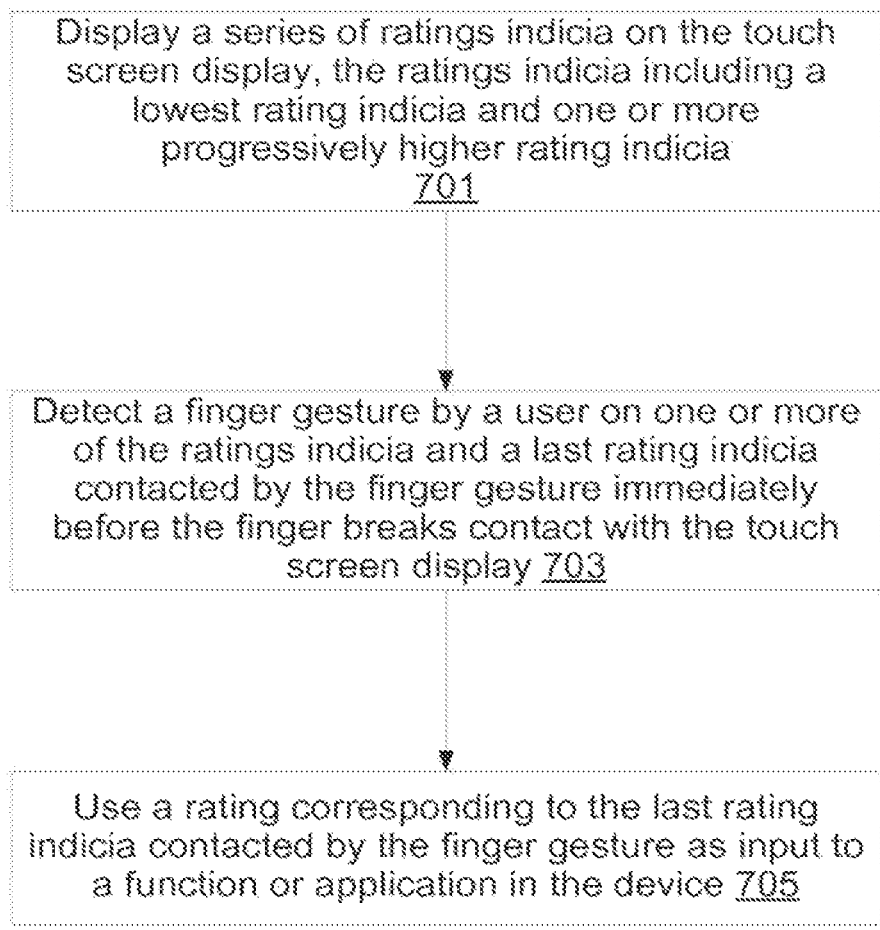
FIG. 7 is a flow diagram illustrating a third process for displaying a ratings icon using as input a finger swipe gesture on the touch screen display in accordance with some embodiments.
Figure 8H:
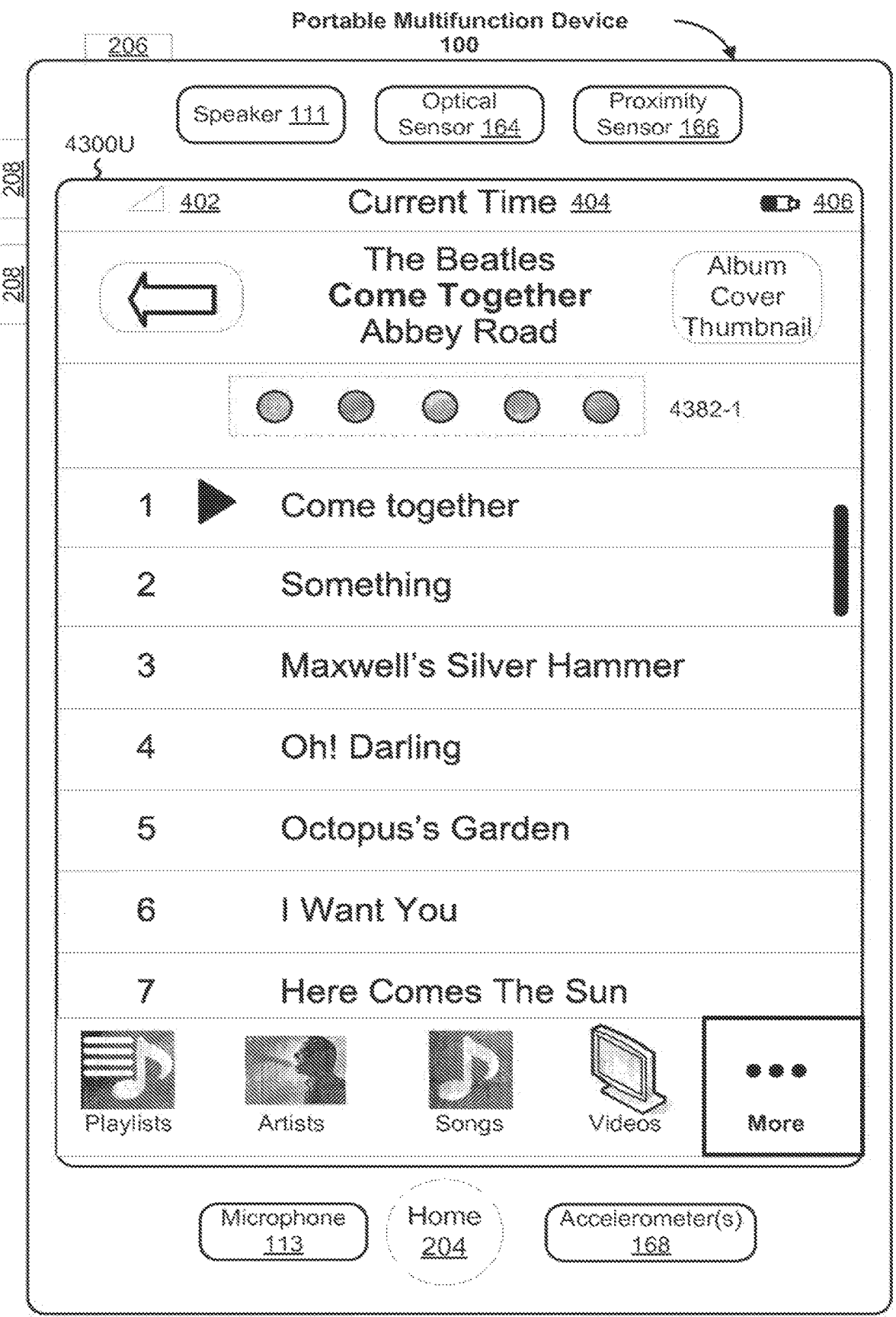
Figure 8I:
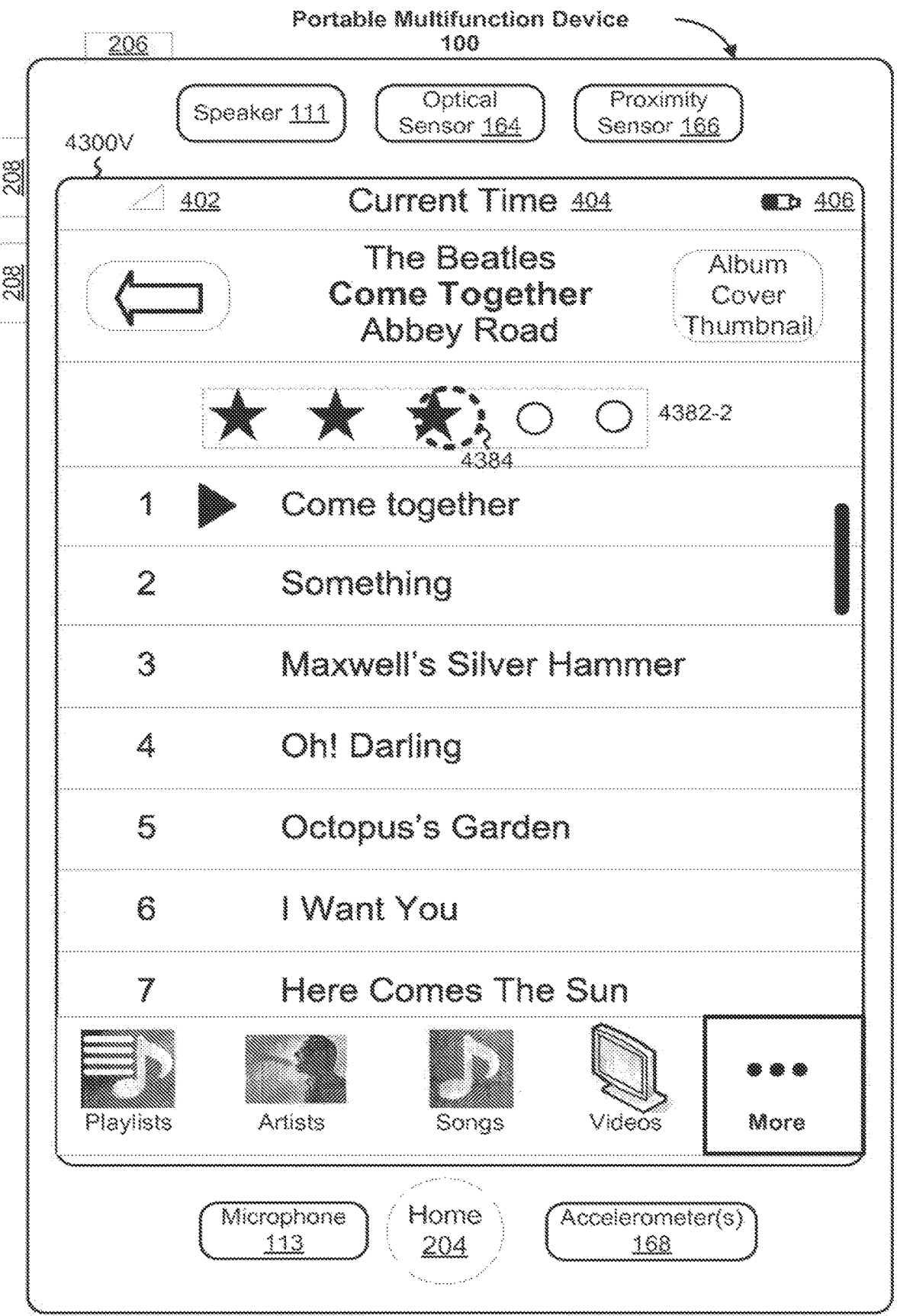

In some embodiments, the set of finger movements described above can be employed to represent a user's feedback on information or services provided by the portable device. FIG. 7 is a flow diagram illustrating a third process for displaying a ratings icon using as input a finger swipe gesture on the touch screen display in accordance with some embodiments. As illustrated in FIG. 8H and FIG. 8I, a user rating may be applied to an item of content with a finger gesture.

In some embodiments, a portable multifunction device displays a series of ratings indicia (e.g., 4382, FIGS. 8H and 8I) on a touch screen display (701). The ratings indicia comprise a lowest rating indicia and one or more progressively higher rating indicia. In some embodiments, the ratings indicia comprise stars (e.g., 4382-2, FIG. 8I). In some embodiments, the series of ratings indicia consists of five stars.

A finger gesture (e.g., 4384, FIG. 8I) by a user is detected on one or more of the ratings indicia (703). The finger gesture contacts a last rating indicia immediately prior to breaking contact with the touch screen display (e.g., the third rating indicia in FIG. 8I). In some embodiments, the finger gesture contacts the lowest rating indicia prior to contacting one or more of the progressively higher rating indicia. In some embodiments, the finger gesture is a swipe gesture.

A rating corresponding to the last rating indicia contacted by the finger gesture is used as input to a function or application in the device (705). For example, the three-star rating for the song "Come Together" in FIG. 8I may be used to sort this content versus other content in the device and/or to determine how often this content is heard when content is played in a random order.

In some embodiments, the rating corresponding to the last rating indicia contacted by the finger gesture is used to give a rating for an item of content that is playable with a content player application on the device. In some embodiments, the item of content is an item of music and the content player application is a music player application. In some embodiments, the item of content is a video and the content player application is a video player application.

In some embodiments, the rating corresponding to the last rating indicia contacted by the finger gesture is used to give a rating for content on a web page that is viewable with a browser application on the device.

A graphical user interface on a portable multifunction device with a touch screen display comprises a series of ratings indicia 4382 on the touch screen display. The ratings indicia comprise a lowest rating indicia and one or more progressively higher rating indicia. In response to detecting a finger gesture by a user on one or more of the ratings indicia, wherein the finger gesture contacts a last rating indicia immediately prior to breaking contact with the touch screen display, a rating corresponding to the last rating indicia contacted by the finger gesture is used as input to a function or an application in the device.

Figure 9A:
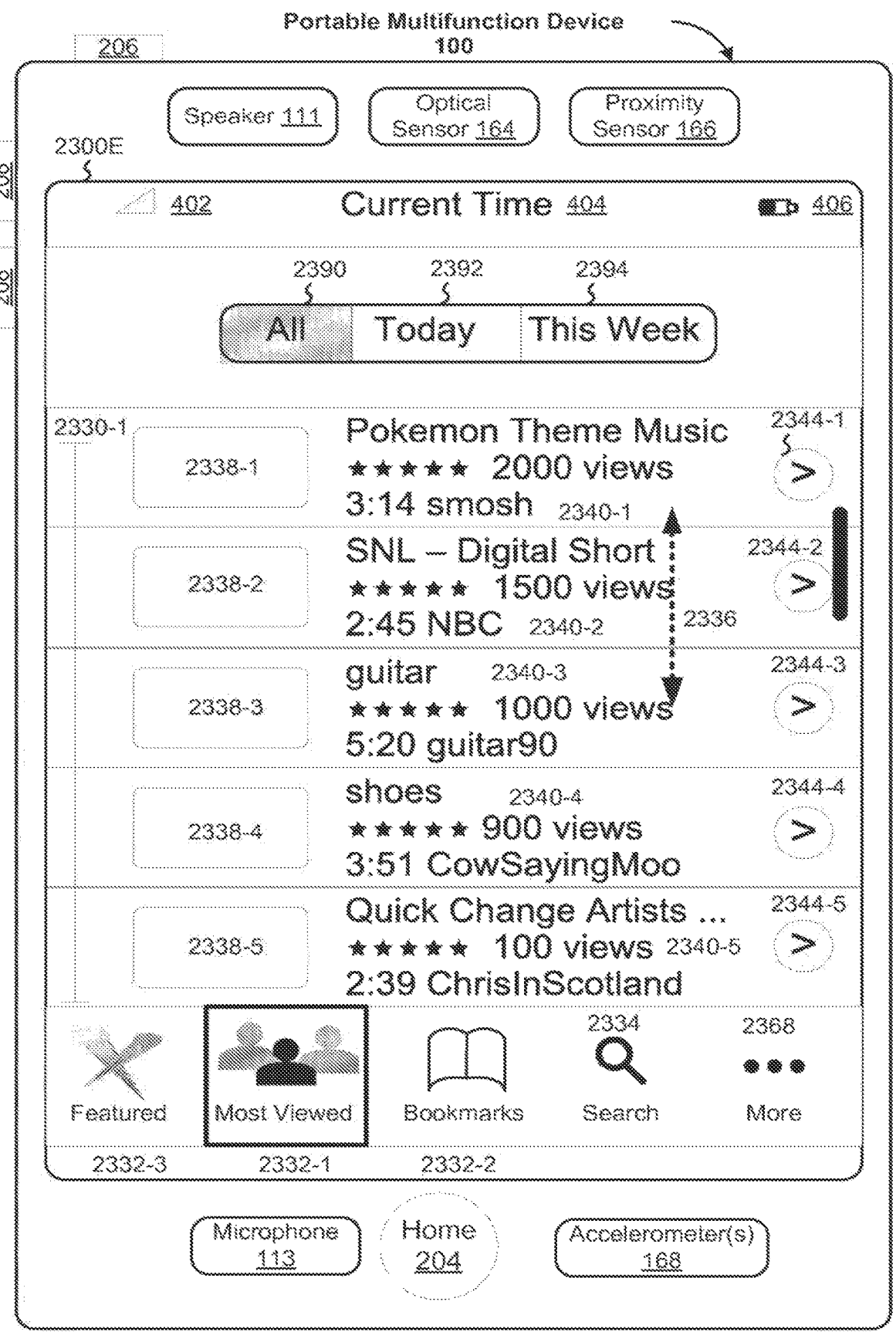
FIGS. 9A-9P illustrate exemplary user interfaces for an online video application for a portable multifunction device in accordance with some embodiments.
Figure 9B:
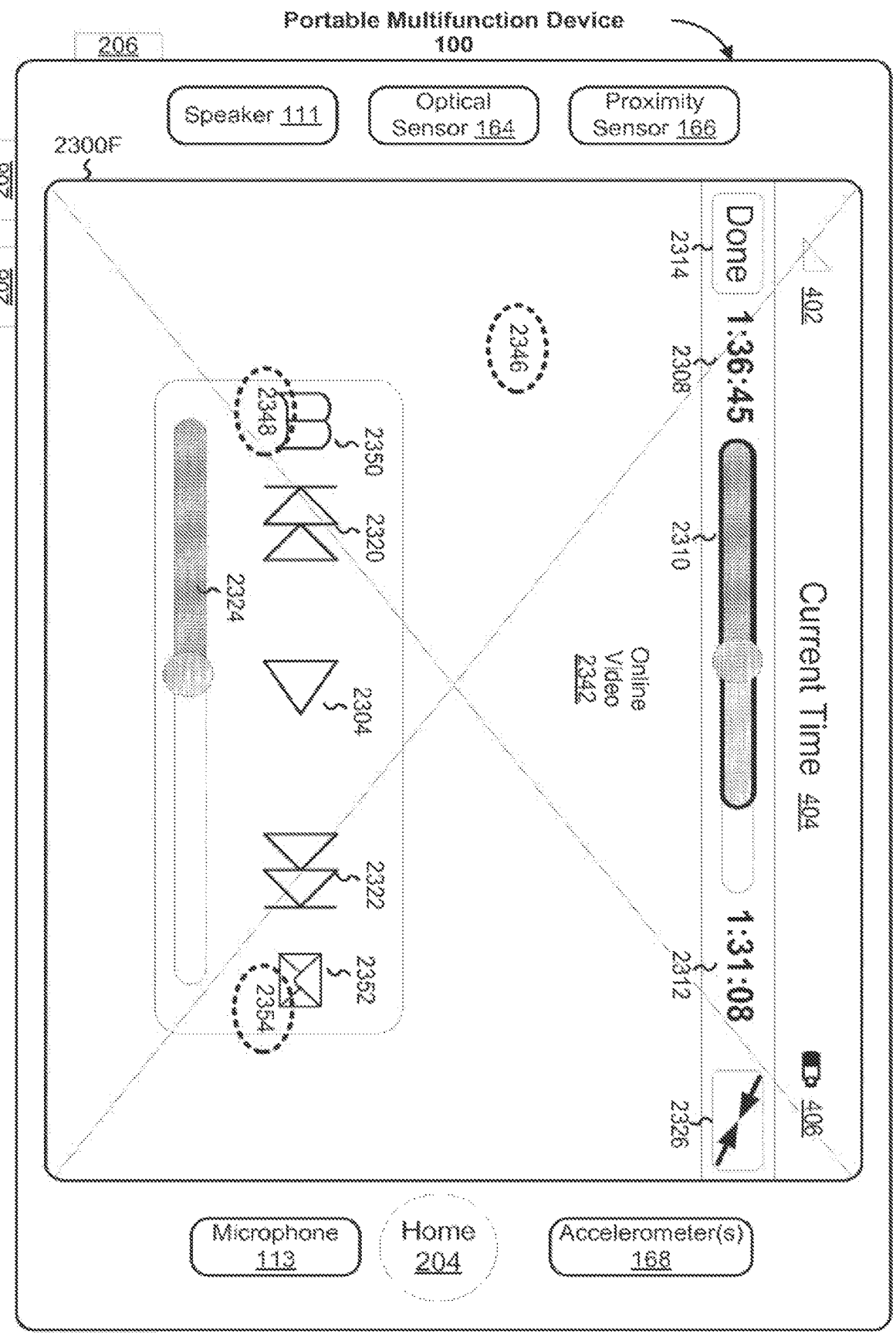
Figure 9C:
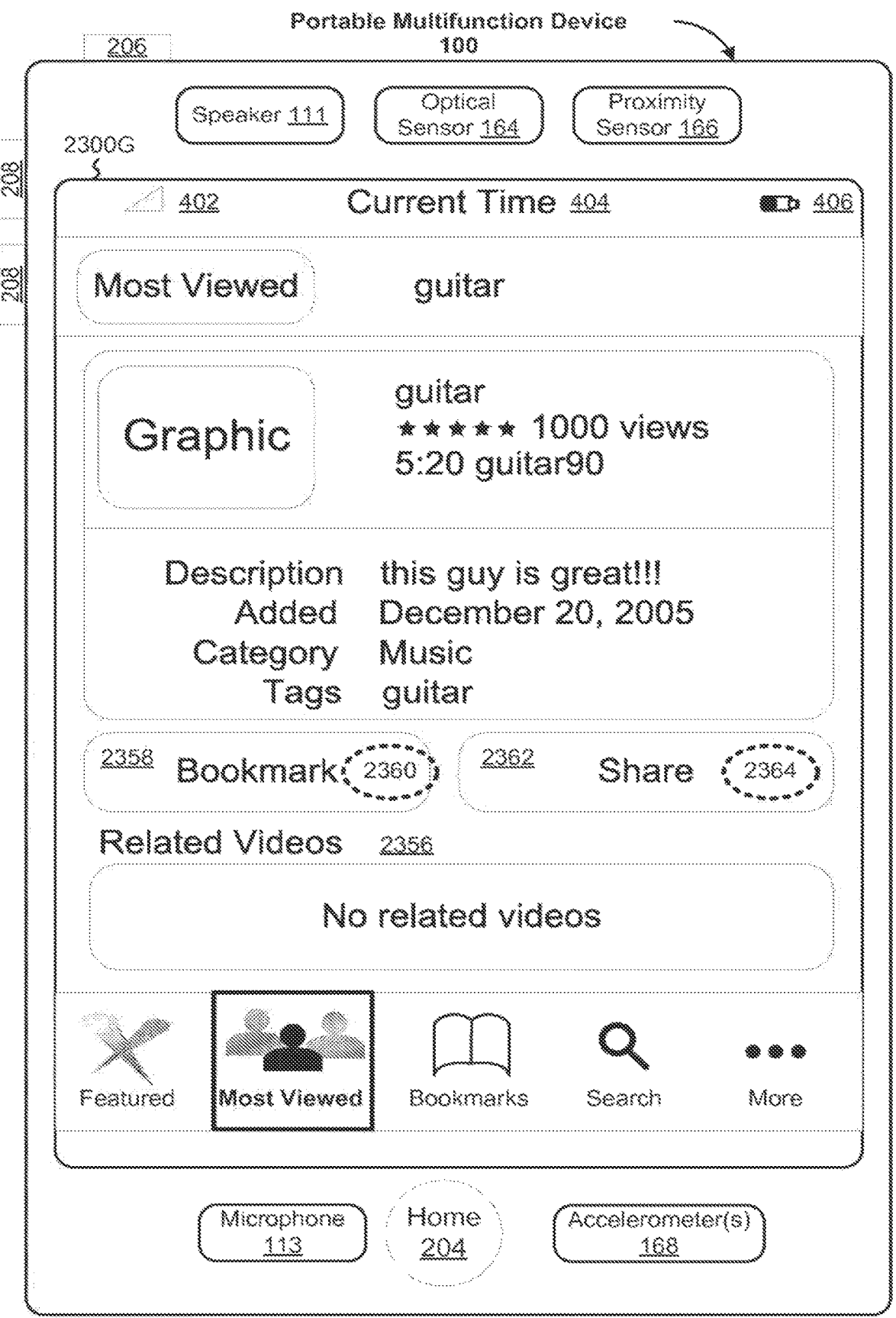
Figure 9D:
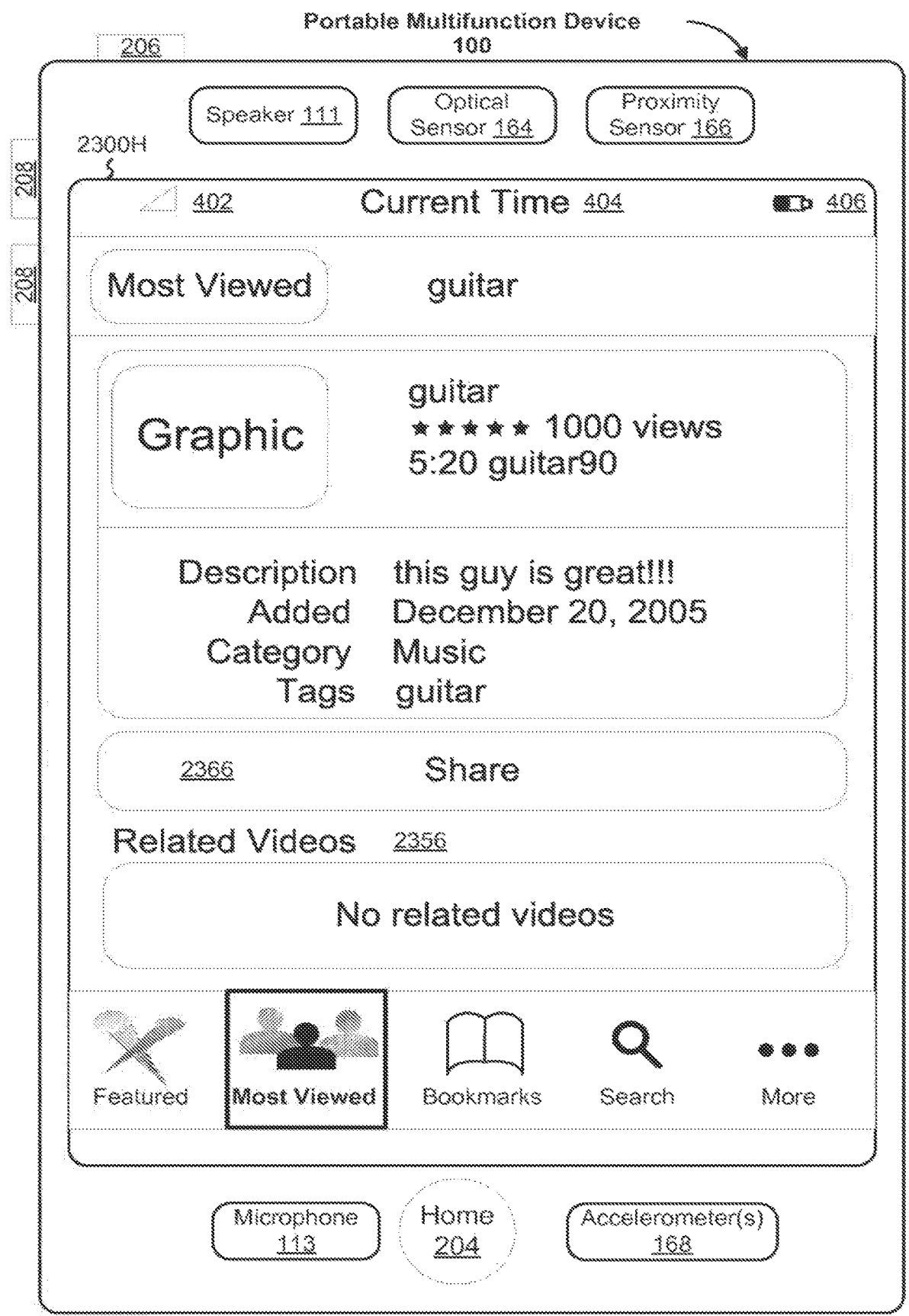
Figure 9E:
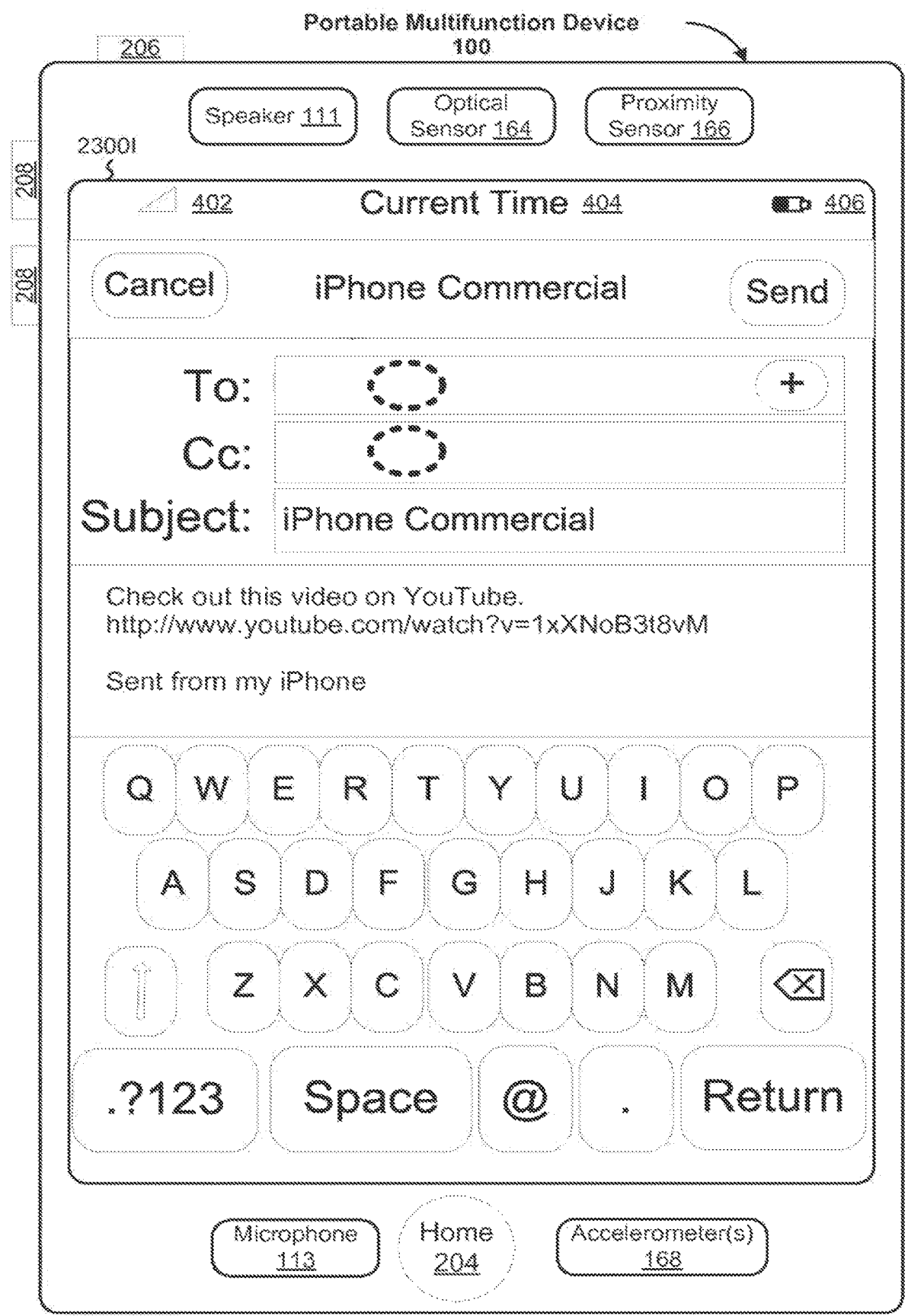
Figure 9F:
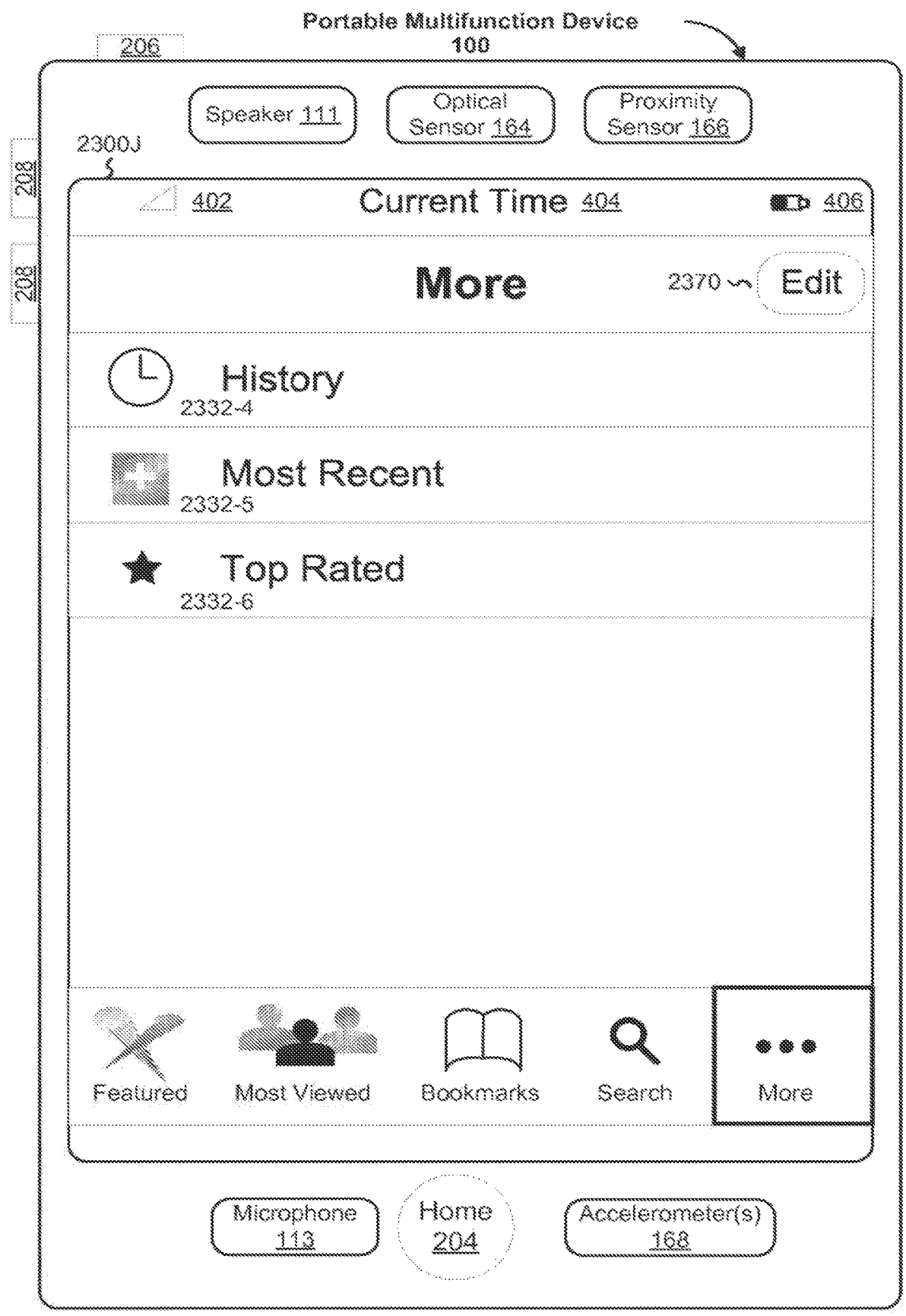
Figure 9G:
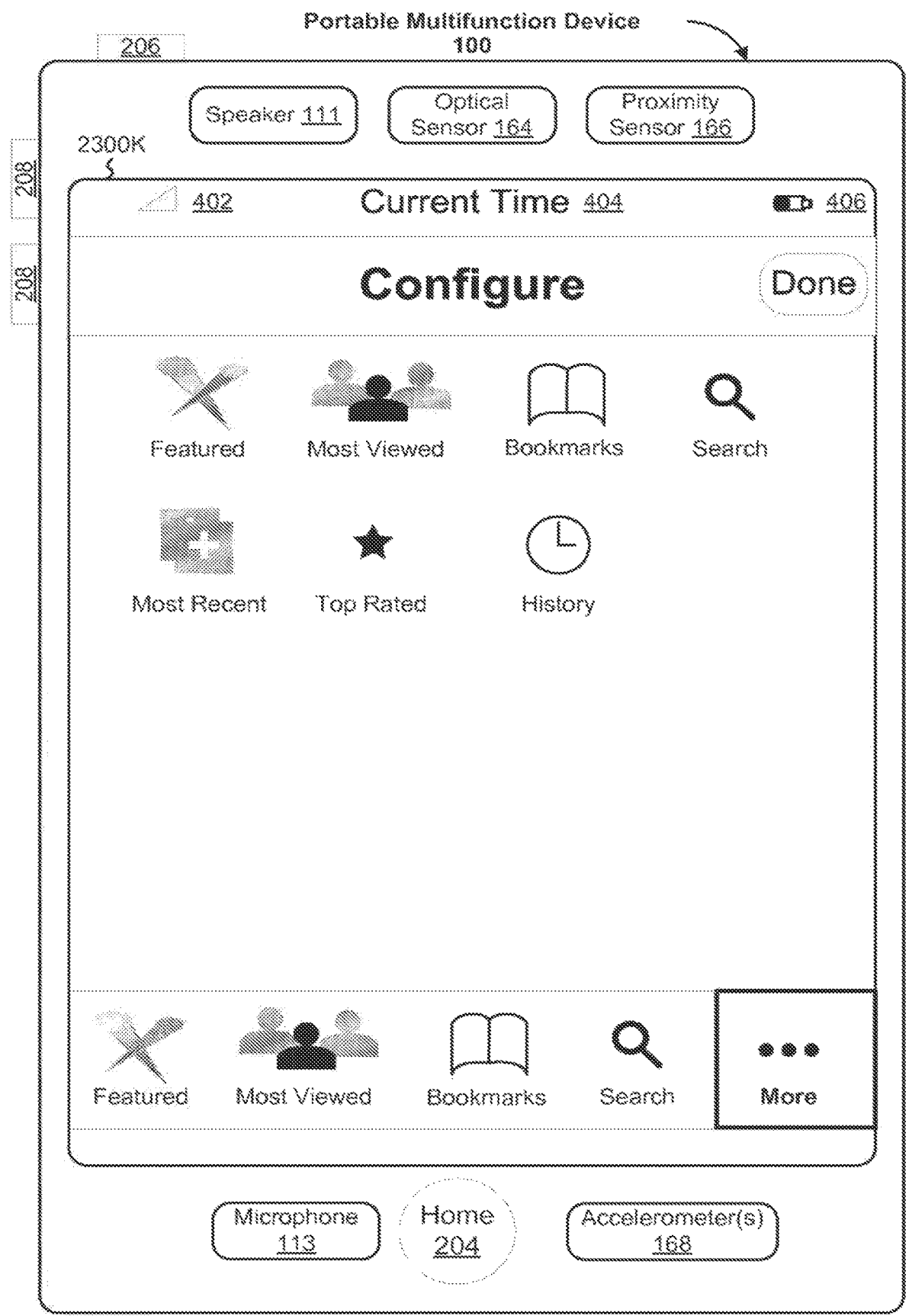
Figure 9H:
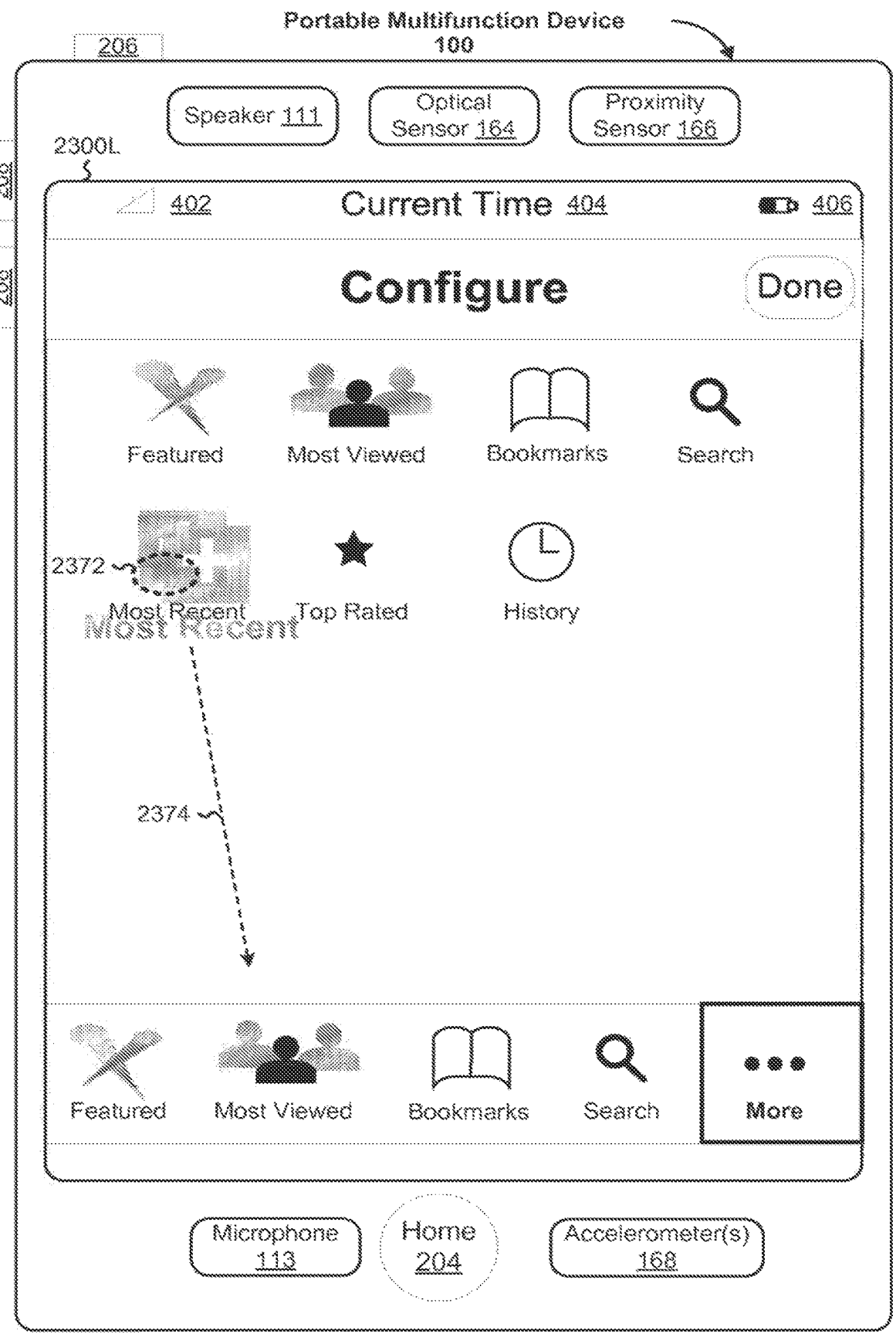
Figure 9I:
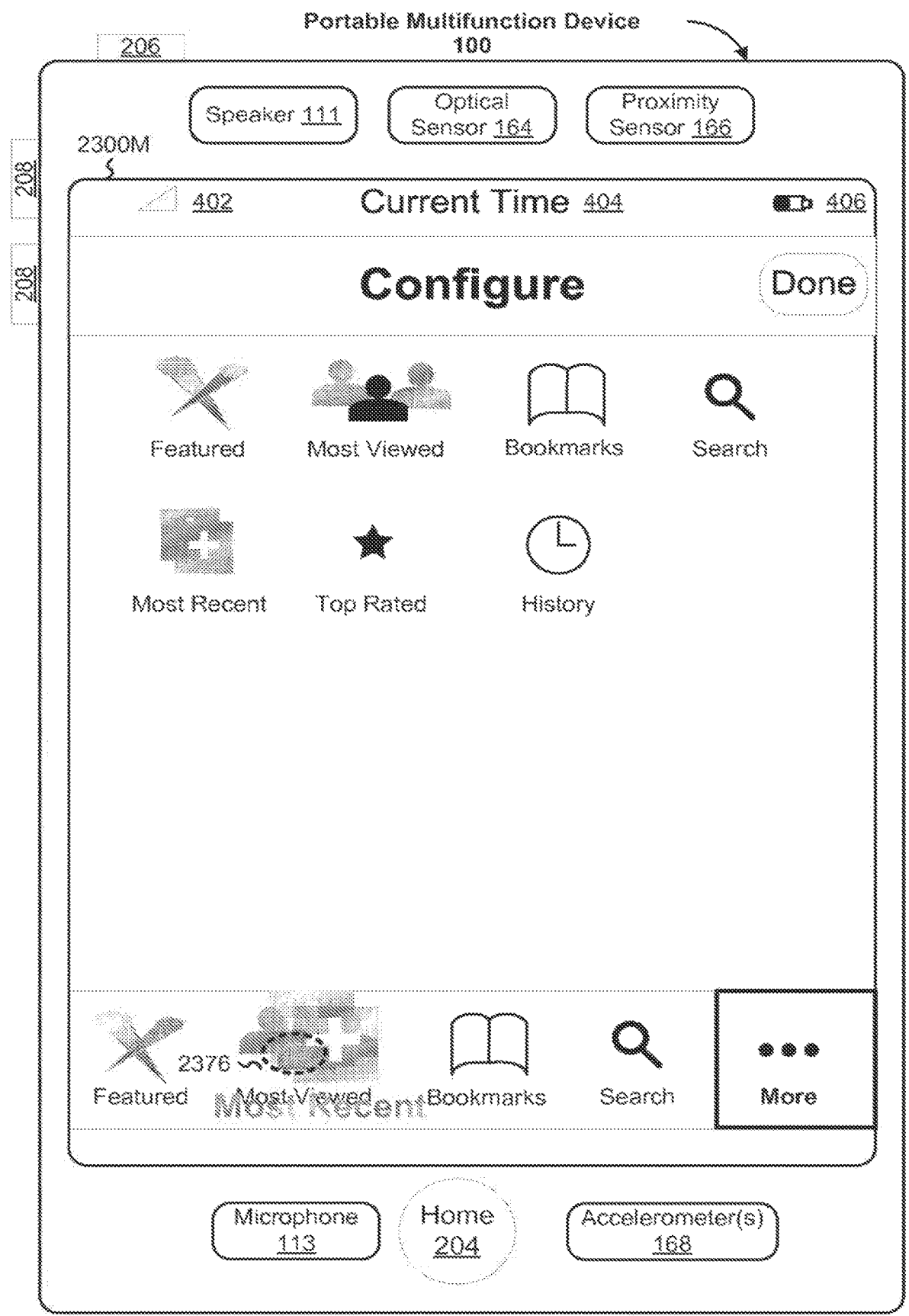
Figure 9J:
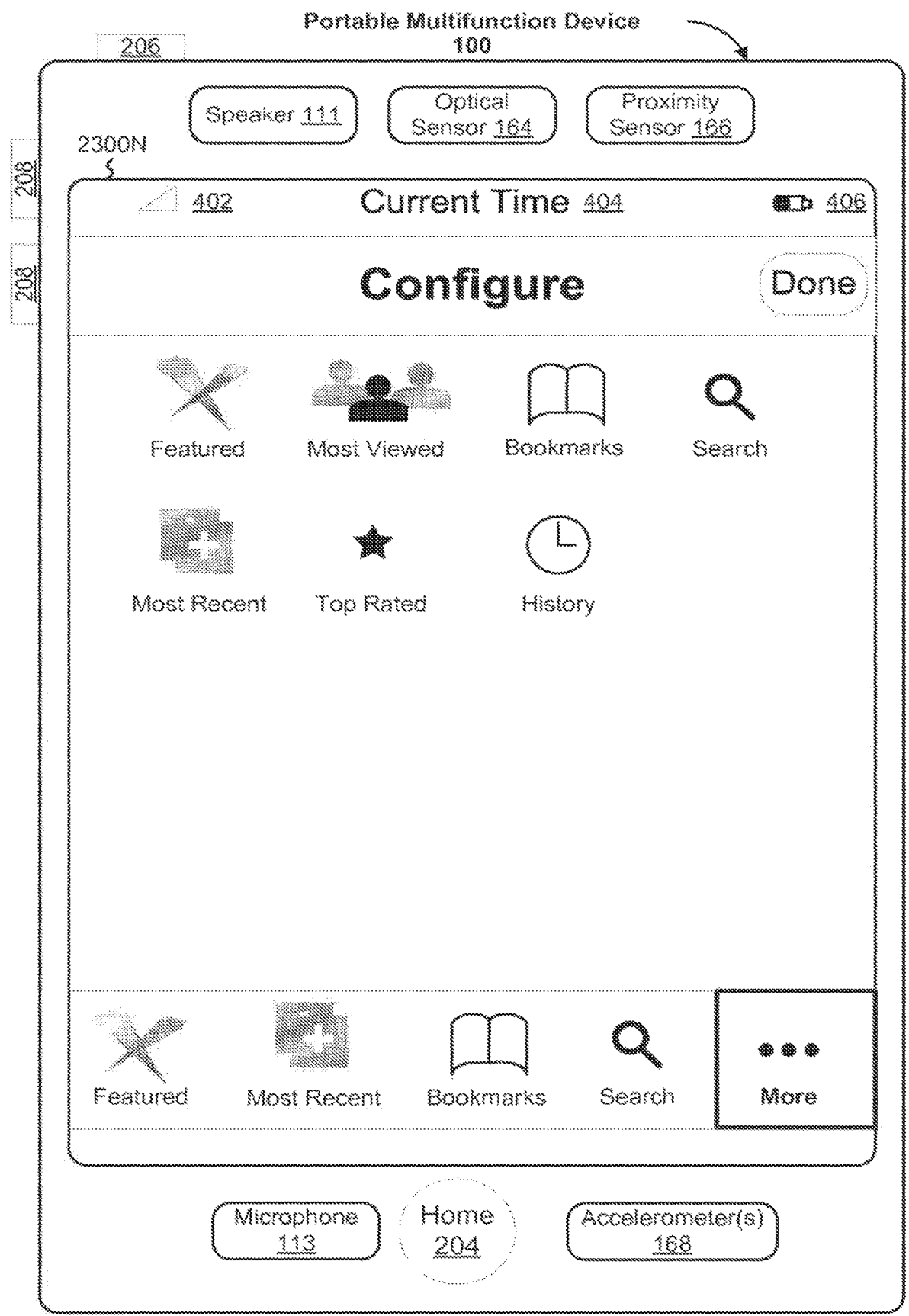
Figure 9K:
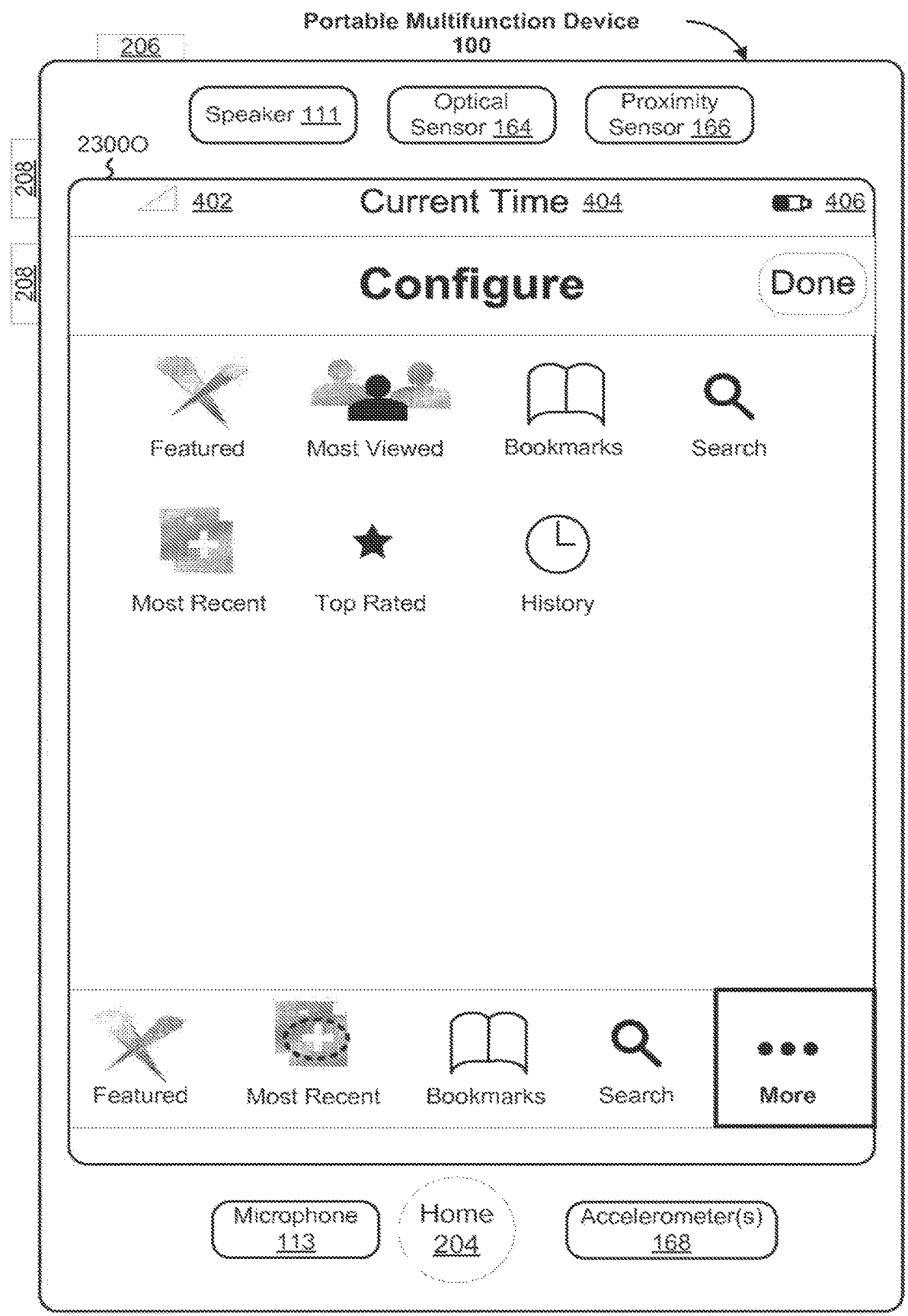
Figure 9L:
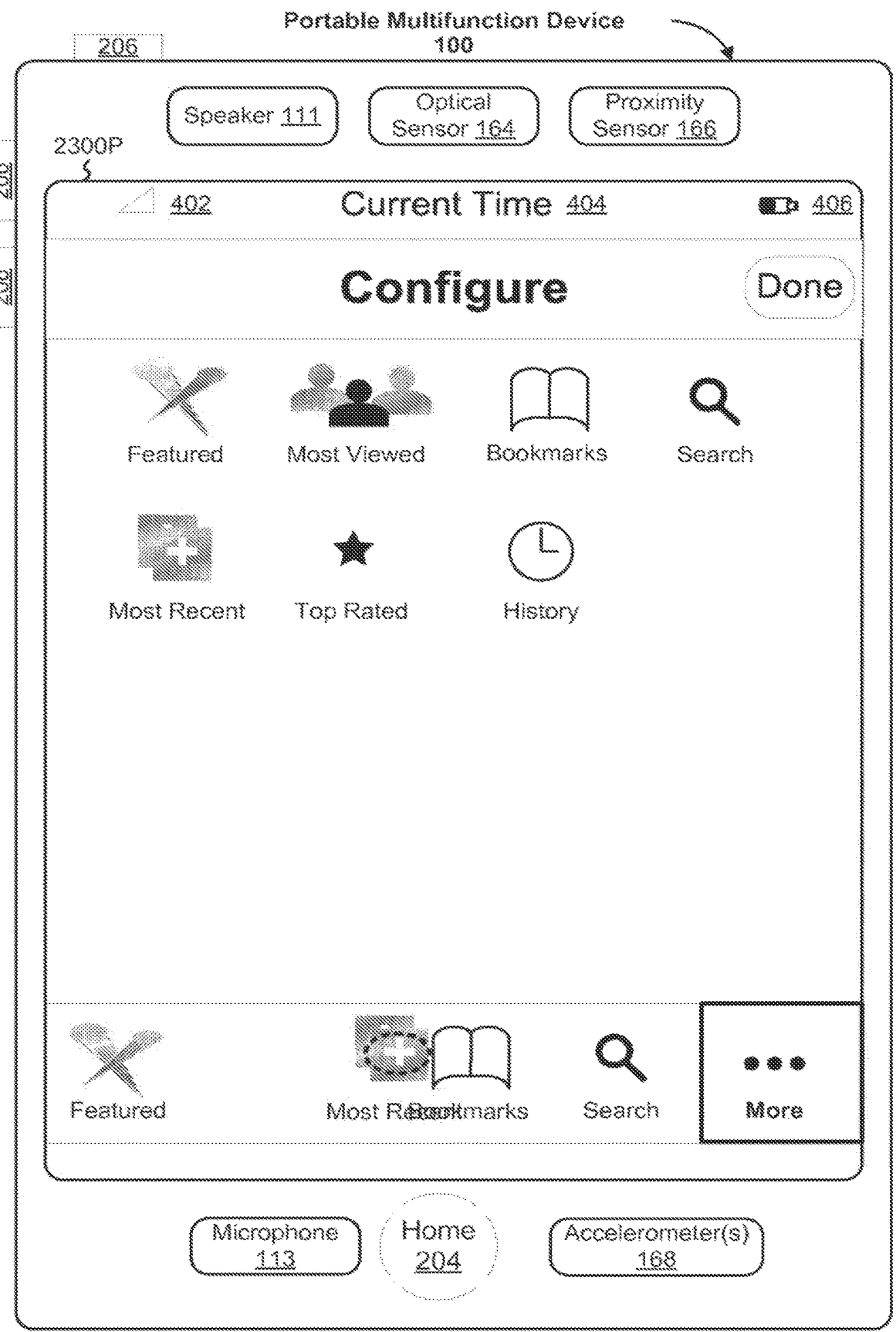
Figure 9M:
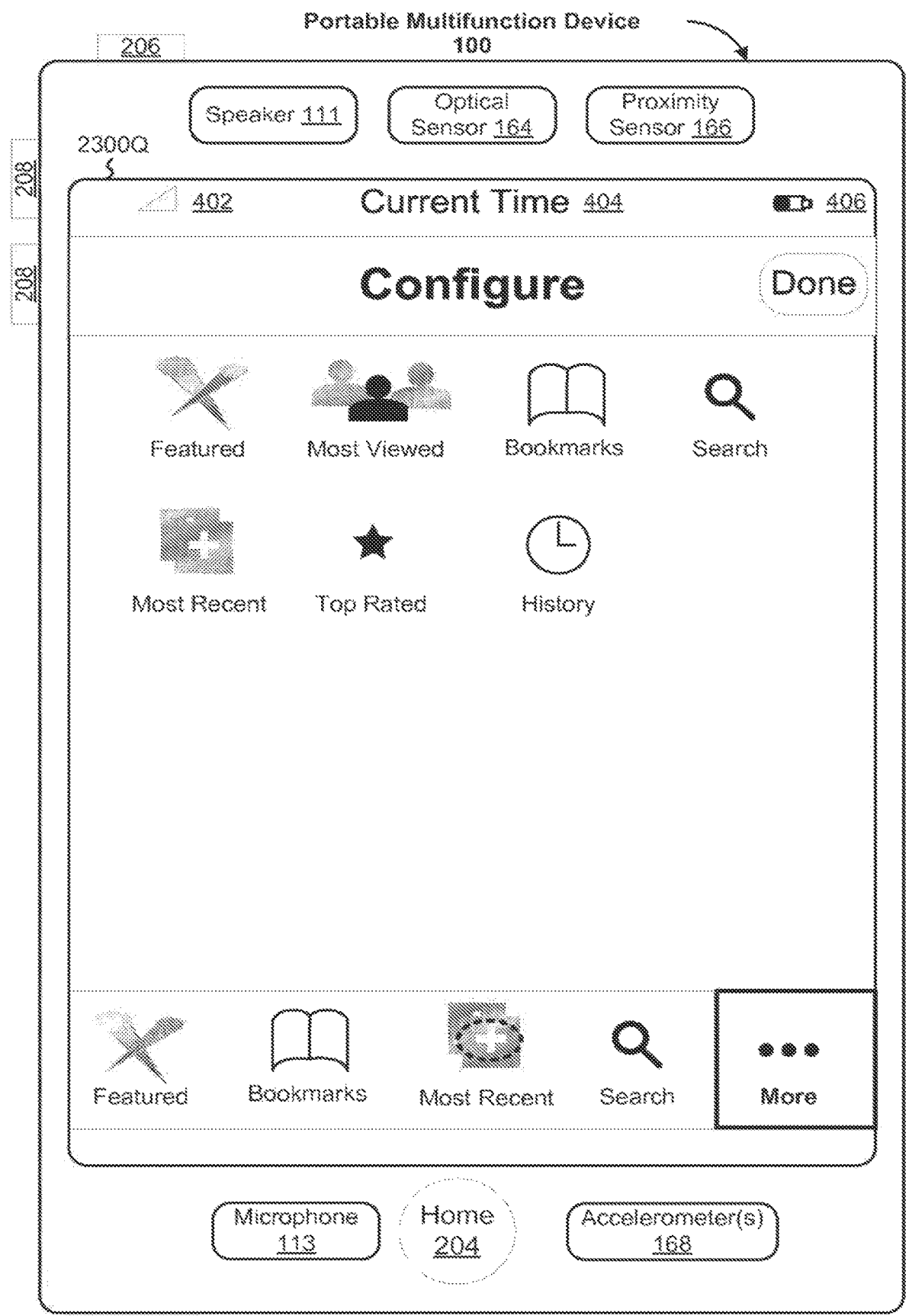
Figure 9N:
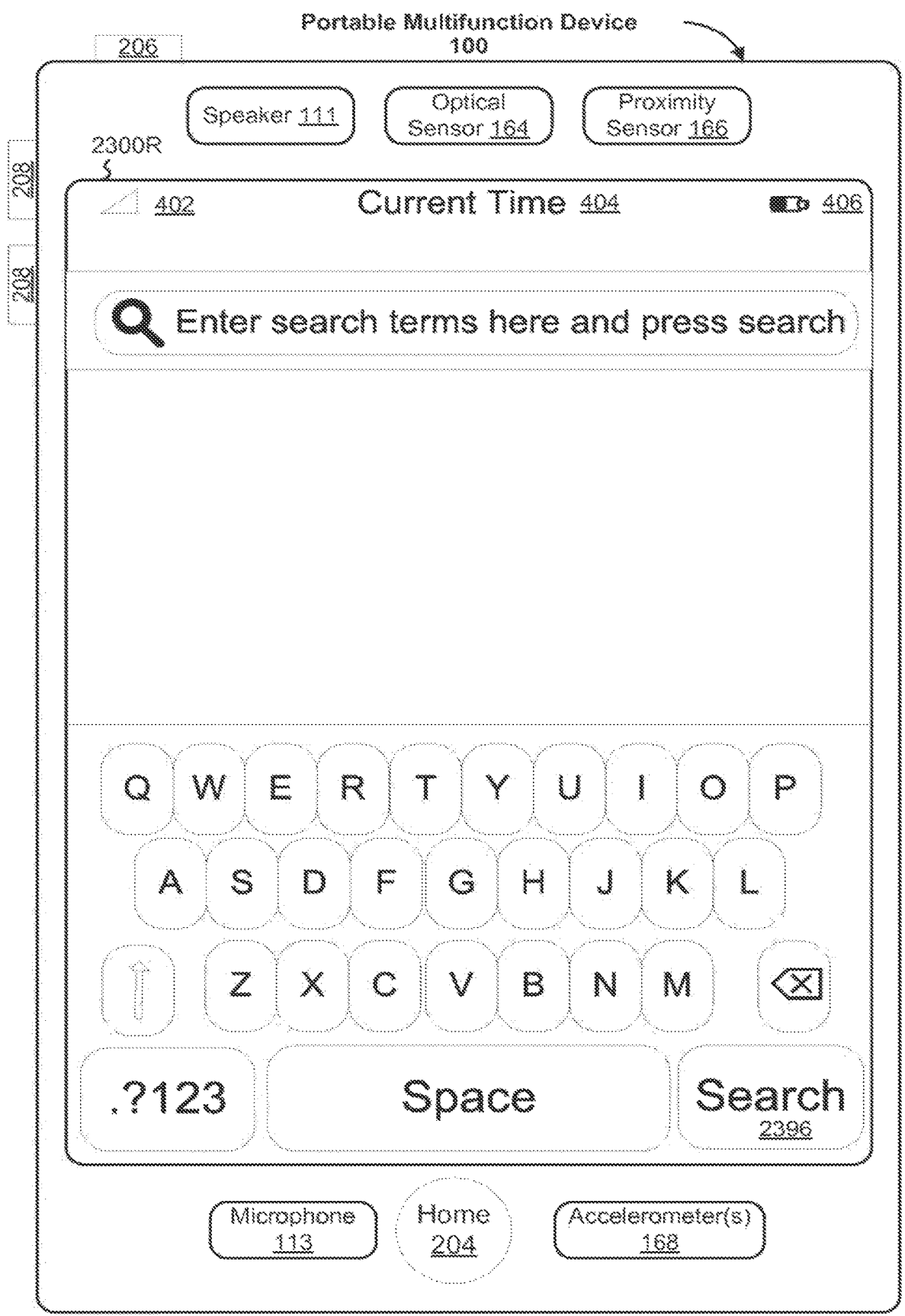
Figure 9O:
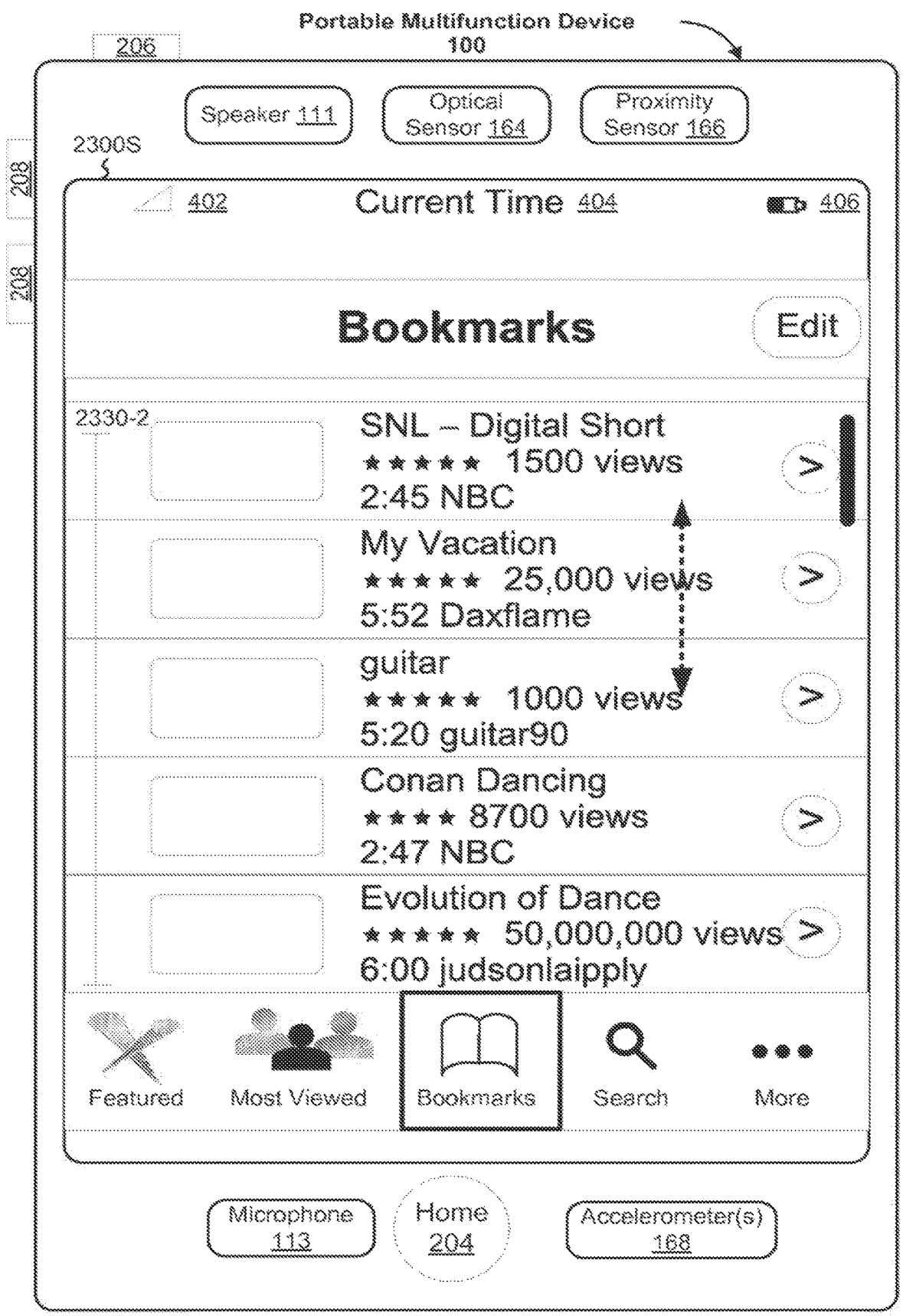
Figure 9P:
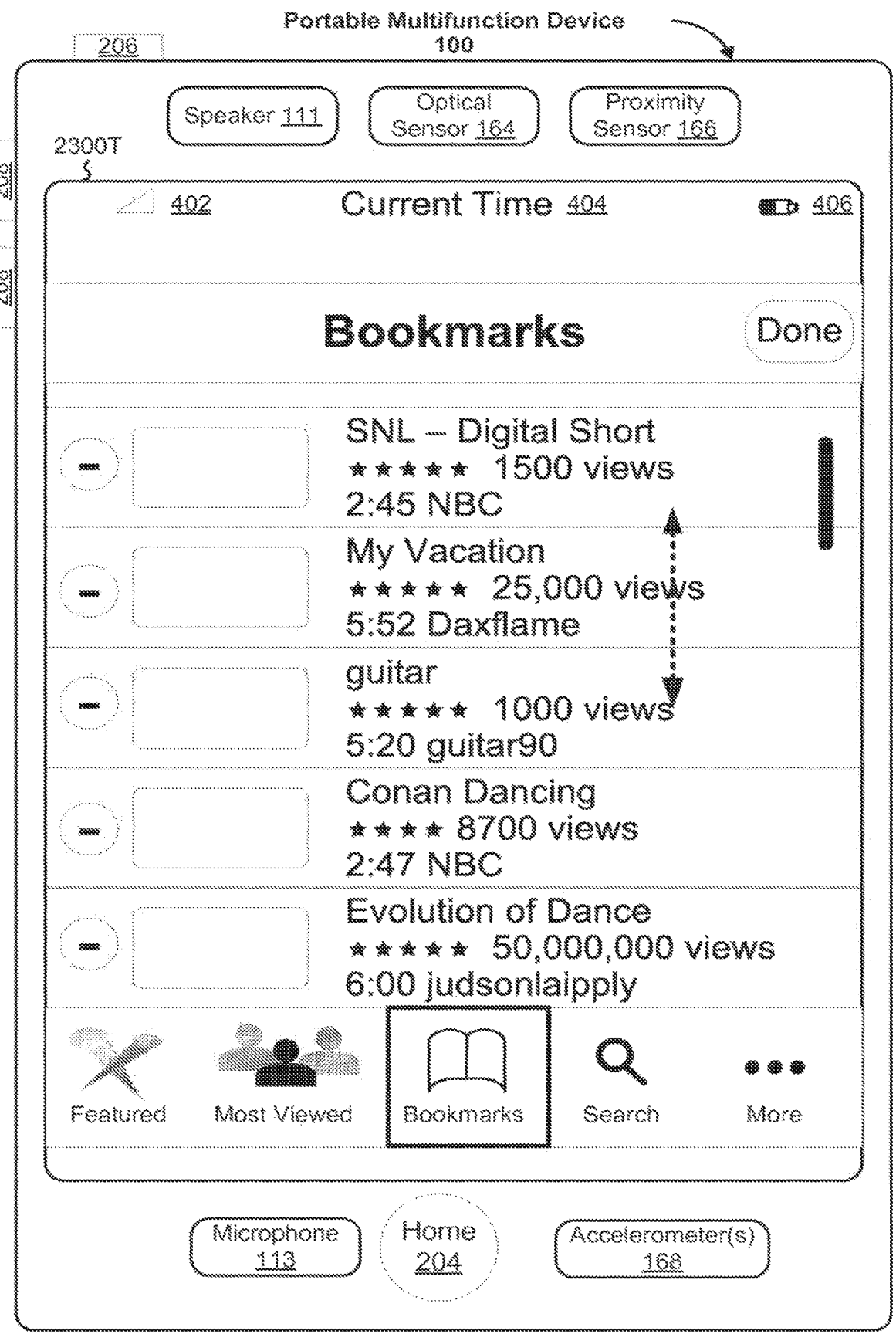

FIGS. 9A-9P illustrate exemplary user interfaces for an online video application for a portable multifunction device in accordance with some embodiments.

In some embodiments, a computer-implemented method is performed at a portable electronic device (e.g., 100) with a touch screen display 112.

The device displays a first list 2330-1 (FIG. 9A) of information about online video items in a plurality of lists 2330 of information about online video items. In some embodiments, the plurality of lists of information about online video items include at least two of: a list of information about featured content items (e.g., videos featured by the online video website), a list of information about most recently added content items (e.g., videos most recently added to the online video website), a list of information about most viewed content items (e.g., videos most viewed by other users of the online video website, 2330-1, FIG. 9A), a list of information about top rated content items (e.g., videos rated by other users of the online video website), a list of information about content items bookmarked by a user of the computing device (e.g., bookmark list 2330-2, FIG. 9O), and a list of information about content items viewed by a user of the computing device (e.g., a list with a history of the video played by the user). In some embodiments, a respective list 2330 of information about online video items is displayed in a portrait orientation of the touch screen display. In some embodiments, in response to activation of a time window icon (e.g., all 2390, today 2392, or this week 2394 icons in FIG. 9A) a respective list may be chosen to correspond to a specific time period.

The device displays a plurality of icons (e.g., 2332-1, 2332-2, and 2332-3, FIG. 9A) corresponding to at least some of the plurality of lists of information about online video items. The plurality of icons are displayed at the same time as a list of information about online video items (e.g., list 2330-1, FIG. 9A).

In some embodiments, the device displays a search icon 2334 that when activated initiates the display of a user interface 2300R (FIG. 9N) for searching for online video items.

In response to detecting a moving finger gesture 2336 on the first list of information about content items, the device scrolls the first list of information about content items.

In response to detecting a stationary finger contact on a first portion 2338 of a row 2340 in the first list of information about online video items, wherein the row contains information about a particular online video item, the device: initiates a request for the particular online video item 2342 from a remote computer (e.g., an online video server for a web site such as www.youtube.com), receives the particular online video item 2342, and plays the particular online video item 2342 (FIG. 9B). In some embodiments, the first portion 2338 of a row includes anywhere in the row except a second portion of the row, such as additional information icon 2344.

In some embodiments, the row 2340 has a width, the touch screen 112 has a width and the width of the row is substantially the same as the width of the touch screen display (e.g., at least 90% of the width of the touch screen display). In some embodiments, the touch screen display 112 has an area and the particular online video item 2342 uses substantially all (e.g., at least 90%) of the touch screen display area when the particular online video item is played. In some embodiments, the particular online video item 2342 is played in a landscape orientation of the touch screen display (FIG. 9B).

In some embodiments, in response to detecting a finger contact 2346 (FIG. 9B) on the touch screen display while the particular online video item 2342 is playing, the device displays one or more playback controls. In some embodiments, the one or more playback controls comprise a play icon 2304, a pause icon (not shown, which may toggle with the play icon 2304), a sound volume icon 2324, and/or a playback progress bar icon 2310. In some embodiments, displaying one or more playback controls comprises displaying one or more playback controls on top of the particular online video item 2342 (e.g., a semi-transparent "heads-up display", as illustrated in FIG. 9B).

In some embodiments, while playing the particular online video item 2342, the device ceases to display the one or more playback controls. In some embodiments, ceasing to display the one or more playback controls comprises fading out the one or more playback controls. In some embodiments, the display of the one or more playback controls is ceased after a predetermined time. In some embodiments, the display of the one or more playback controls is ceased after no contact is detected with the touch screen display for a predetermined time.

In some embodiments, in response to detecting a finger contact 2346 on the touch screen display while the particular online video item is playing, the device displays a bookmark icon 2350 that, if activated by another finger contact 2348, bookmarks the particular online video item 2342 (or initiates a process for creating a bookmark for the item).

In some embodiments, in response to detecting a finger contact 2346 on the touch screen display while the particular online video item is playing, the device displays a sharing icon 2352 that, if activated by another finger contact 2354, initiates creation of an electronic message to another user that includes a link to the particular online video item. In some embodiments, in response to detecting a finger contact 2346 on the touch screen display while the particular online video item is playing, the device displays a sharing icon 2352 that, if activated by another finger contact 2354, initiates creation of an electronic message to another user that includes an online address (e.g., a URL such as "http://www.youtube.com/watch?v=IxXNoB3t8vM" in FIG. 9E) for the particular online video item. In some embodiments, the electronic message is an email (FIG. 9E). In some embodiments, the electronic message is an instant message, such as an SMS message.

In response to detecting a finger contact on a respective icon (e.g., icon 2332-1, FIG. 9A or 2332-2, FIG. 9A) in the plurality of icons, the device displays a corresponding list (e.g., 2330-1, FIG. 9A or 2330-2, FIG. 9O, respectively) of information about online video items.

In some embodiments, in response to detecting a finger contact on a second portion of the row in the first list of information about online video items (e.g., a contact on icon 2344-3, FIG. 9A), the device displays additional information about the particular online video item (e.g., UI 2300G, FIG. 9C). The second portion (e.g., icon 2344) of the row is different from the first portion 2338 of the row (e.g., anywhere else in the row 2340 besides icon 2344). In some embodiments, the additional information about the particular online video item includes information about related online video items 2356. In some embodiments, in response to detecting a finger contact on the second portion of the row, the device displays a bookmark icon 2358 that, if activated by another finger contact 2360, bookmarks the particular online video item (or initiates a process for creating a bookmark). In some embodiments, in response to detecting a finger contact on the second portion of the row, the device displays a sharing icon 2362 that, if activated by another finger contact 2364, initiates creation of an electronic message to another user that includes a link to (or an online address for) the particular online video item (FIG. 9E). In some embodiments, in response to detecting a finger contact on the second portion of the row, the device: (a) displays a bookmark icon 2358 and a sharing icon 2362 if the particular online video item is not bookmarked (FIG. 9C), and (b) displays an enlarged sharing icon 2366 (FIG. 9D) without the bookmark icon if the particular online video item is already bookmarked (FIG. 9D).

In some embodiments, the device displays an icon 2368 that when activated initiates the display of: (a) icons corresponding to at least some of the plurality of lists of information about online video items (e.g., 23324, 2332-5, 2332-6, FIG. 9F), and (b) a configuration icon (e.g., Edit icon 2370, FIG. 9F) that when activated initiates the display of a user interface 2300K (FIG. 9G) for configuring which icons corresponding to at least some of the plurality of lists are displayed with the first list of information. In some embodiments, after detecting a gesture on the configuration icon 2370, the device: detects a finger-down event 2372 at a first icon in a plurality of icons; detects one or more finger-dragging events 2374 on the touch screen display; moves the first icon on the touch screen display along a path determined by the finger-dragging events until the first icon at least in part overlaps a second icon in the plurality of icons (e.g., in FIG. 9I, "Most Recent" icon partially overlaps "Most Viewed" icon); detects a finger-up event 2376 at the second icon; and visually replaces the second icon with the first icon (e.g., in FIG. 9J, "Most Recent" icon visually replaces the "Most Viewed" icon in FIG. 9I). In some embodiments, while moving the first icon on the touch screen display, the device displays the first icon in a manner visually distinguishable from other icons on the touch screen display (e.g., the "Most Recent" icon is enlarged in FIG. 9I). As shown in FIGS. 9K-9M, an analogous finger down, finger drag, and finger up process may be used to rearrange the icons 2332 (and 2334) that are displayed with the first list of information (e.g., exchanging the positions of the "Most Recent" icon and the "Bookmarks" icon).

In some embodiments, in response to detecting a finger contact on a playback completion icon 2314 (FIG. 9B), the device ceases to play the particular online video item 2342, and displays again the first list of information 2330-1 (FIG. 9A). In some embodiments, the finger contact detected on the playback completion icon comprises a tap gesture.

A graphical user interface 2300E on a portable electronic device 100 with a touch screen display 112 includes: a first list 2330-1 of information about online video items in a plurality of lists of information about online video items; and a plurality of icons 2332 corresponding to at least some of the plurality of lists of information about online video items. In response to detecting a finger contact on a first portion 2338 of a row 2340 in the first list 2330-1 of information about online video items, wherein the row contains information about a particular online video item: a request is initiated for the particular online video item 2342 from a remote computer, the particular online video item 2342 is received, and the particular online video item 2342 is played. In some embodiments, in response to detecting a finger contact on a second portion of the row (e.g., additional information icon 2344) in the first list of information about online video items, wherein the second portion of the row is different from the first portion of the row, additional information is displayed about the particular online video item (e.g., in UI 2300G, FIG. 9C). In response to detecting a finger contact on a respective icon 2332 in the plurality of icons, a corresponding list 2330 of information about online video items is displayed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a touch screen display;
one or more processors; and
memory storing one or more programs configured to be executed by the one or more processors, the one or more programs including instructions for:
   displaying a plurality of interface objects on the touch screen display, including a first interface object at a first location and a second interface object at a second location;
   while displaying the plurality of interface objects, detecting activation of an edit affordance;
   in response to activation of the edit affordance, concurrently displaying:
      an operation affordance in a first portion of the first interface object, wherein the operation affordance has a first form corresponding to the operation affordance being activated; and
      a move affordance in a second portion of the first interface object;
   detecting contact with the touch screen display on the first interface object; and
   in response to detecting the contact with the touch screen display:
      in accordance with a determination that the detected contact on the first interface object corresponds to a location at the operation affordance in the first portion, displaying the operation affordance in a second form visually distinct from the first form, wherein the second form corresponds to the operation affordance being deactivated; and
      in accordance with a determination that the detected contact with the touch screen display corresponds to a location at the move affordance in the second portion and the detected contact includes movement from the first location to the second location, moving the first interface object from the first location to the second location on the touch screen display.

2. The electronic device of claim 1, wherein moving the first interface object from the first location to the second location on the touch screen display includes at least partially overlapping the second interface object at the second location.

3. The electronic device of claim 1, the one or more programs including instructions for:
   while displaying the first interface object at the second location on the touch screen display, detecting a break in contact with the touch screen display; and
   in response to detecting the break in contact with the touch screen display, displaying the first interface object at the second location on the touch screen display and displaying the second interface object at a third location on the touch screen display, wherein the third location is adjacent to the second location.

4. The electronic device of claim 1, further in response to activation of the edit affordance:
   ceasing to display the edit affordance; and
   displaying a done affordance.

5. The electronic device of claim 4, the one or more programs including instructions for:
   detecting activation of the done affordance;
   in response to detecting activation of the done affordance:
      ceasing to display the done affordance;
      in accordance with a determination that the operation affordance is displayed in the first form, maintaining to display the first interface object among the plurality of interface objects and ceasing to display the operation affordance and the move affordance; and
      in accordance with a determination that the operation affordance is displayed in the second form, ceasing to display the first interface object among the plurality of interface objects.

6. A non-transitory computer-readable storage medium storing one or more programs configured to be executed by one or more processors of an electronic device with a touch screen display, the one or more programs including instructions for:
   displaying a plurality of interface objects on the touch screen display, including a first interface object at a first location and a second interface object at a second location;
   while displaying the plurality of interface objects, detecting activation of an edit affordance;
   in response to activation of the edit affordance, concurrently displaying:
      an operation affordance in a first portion of the first interface object, wherein the operation affordance has a first form corresponding to the operation affordance being activated; and
      a move affordance in a second portion of the first interface object;
   detecting contact with the touch screen display on the first interface object; and
   in response to detecting the contact with the touch screen display:
      in accordance with a determination that the detected contact on the first interface object corresponds to a location at the operation affordance in the first portion, displaying the operation affordance in a second form visually distinct from the first form, wherein the second form corresponds to the operation affordance being deactivated; and
      in accordance with a determination that the detected contact with the touch screen display corresponds to a location at the move affordance in the second portion and the detected contact includes movement from the first location to the second location, moving the first interface object from the first location to the second location on the touch screen display.

7. The non-transitory computer-readable storage medium of claim 6, wherein moving the first interface object from the first location to the second location on the touch screen display includes at least partially overlapping the second interface object at the second location.

8. The non-transitory computer-readable storage medium of claim 6, the one or more programs including instructions for:
while displaying the first interface object at, the second location on the touch screen display, detecting a break in contact with the touch screen display; and
in response to detecting the break in contact with the touch screen display, displaying the first interface object at the second location on the touch screen display and displaying the second interface object at a third location on the touch screen display, wherein the third location is adjacent to the second location.

9. The non-transitory computer-readable storage medium of claim 6, further in response to activation of the edit affordance:
ceasing to display the edit affordance; and
displaying a done affordance.

10. The non-transitory computer-readable storage medium of claim 9, the one or more programs including instructions for:
detecting activation of the done affordance;
in response to detecting activation of the done affordance:
ceasing to display of the done affordance;
in accordance with a determination that the operation affordance is displayed in the first form, maintaining to display the first interface object among the plurality of interface objects and ceasing to display the operation affordance and the move affordance; and
in accordance with a determination that the operation affordance is displayed in the second form, ceasing to display the first interface object among the plurality of interface objects.

11. A method, comprising:
at an electronic device with a touch screen display:
displaying a plurality of interface objects on the touch screen display, including a first interface object at a first location and a second interface object at a second location;
while displaying the plurality of interface objects, detecting activation of an edit affordance;
in response to activation of the edit affordance, concurrently displaying:
an operation affordance in a first portion of the first interface object, wherein the operation affordance has a first form corresponding to the operation affordance being activated; and
a move affordance in a second portion of the first interface object;
detecting contact with the touch screen display on the first interface object; and
in response to detecting the contact with the touch screen display:
in accordance with a determination that the detected contact on the first interface object corresponds to a location at the operation affordance in the first portion, displaying the operation affordance in a second form visually distinct from the first form, wherein the second form corresponds to the operation affordance being deactivated; and
in accordance with a determination that the detected contact with the touch screen display corresponds to a location at the move affordance in the second portion and the detected contact includes movement from the first location to the second location, moving the first interface object from the first location to the second location on the touch screen display.

12. The method of claim 11, wherein moving the first interface object from the first location to the second location on the touch screen display includes at least partially overlapping the second interface object at the second location.

13. The method of claim 11, further comprising:
while displaying the first interface object at the second location on the touch screen display, detecting a break in contact with the touch screen display; and
in response to detecting the break in contact with the touch screen display, displaying the first interface object at the second location on the touch screen display and displaying the second interface object at a third location on the touch screen display, wherein the third location is adjacent to the second location.

14. The method of claim 11, further in response to activation of the edit affordance:
ceasing to display the edit affordance; and
displaying a done affordance.

15. The method of claim 14, further comprising:
detecting activation of the done affordance;
in response to detecting activation of the done affordance:
ceasing to display of the done affordance;
in accordance with a determination that the operation affordance is displayed in the first form, maintaining to display the first interface object among the plurality of interface objects and ceasing to display the operation affordance and the move affordance; and
in accordance with a determination that the operation affordance is displayed in the second form, ceasing to display the first interface object among the plurality of interface objects.

\* \* \* \* \*

UNITED STATES PATENT AND TRADEMARK OFFICE
CERTIFICATE OF CORRECTION

PATENT NO. : 11,586,348 B2
APPLICATION NO. : 17/521768
DATED : February 21, 2023
INVENTOR(S) : Andrew Emilio Platzer et al.

It is certified that error appears in the above-identified patent and that said Letters Patent is hereby corrected as shown below:

In the Claims

Column 27, Line 13, delete "at," and add -- at --.

Signed and Sealed this
Eighteenth Day of June, 2024

Katherine Kelly Vidal
*Director of the United States Patent and Trademark Office*